(12) United States Patent
Alduaiji

(10) Patent No.: US 10,543,984 B1
(45) Date of Patent: Jan. 28, 2020

(54) MULTIPURPOSE ROBOTIC SYSTEM

(71) Applicant: MRN Systems, Inc., San Jose, CA (US)

(72) Inventor: Maan Alduaiji, San Jose, CA (US)

( * ) Notice: Subject to any disclaimer, the term of this patent is extended or adjusted under 35 U.S.C. 154(b) by 110 days.

(21) Appl. No.: 15/615,720

(22) Filed: Jun. 6, 2017

Related U.S. Application Data

(63) Continuation-in-part of application No. 15/345,934, filed on Nov. 8, 2016, now abandoned, and a continuation-in-part of application No. 15/345,912, filed on Nov. 8, 2016, now abandoned.

(60) Provisional application No. 62/346,424, filed on Jun. 6, 2016, provisional application No. 62/253,571, filed on Nov. 10, 2015.

(51) Int. Cl.

| | |
|---|---|
| *B65G 1/137* | (2006.01) |
| *B25J 9/16* | (2006.01) |
| *G06Q 10/08* | (2012.01) |
| *B64D 1/08* | (2006.01) |
| *B65G 1/06* | (2006.01) |
| *B65G 1/10* | (2006.01) |
| *B65G 65/00* | (2006.01) |
| *B65G 67/04* | (2006.01) |
| *B08B 1/04* | (2006.01) |
| *B64C 39/02* | (2006.01) |
| *G05D 1/10* | (2006.01) |
| *G05D 1/00* | (2006.01) |
| *B65G 67/00* | (2006.01) |

(52) U.S. Cl.
CPC .............. *B65G 1/1373* (2013.01); *B08B 1/04* (2013.01); *B25J 9/1615* (2013.01); *B25J 9/1679* (2013.01); *B64C 39/024* (2013.01); *B64D 1/08* (2013.01); *B65G 1/06* (2013.01); *B65G 1/10* (2013.01); *B65G 65/005* (2013.01); *B65G 67/04* (2013.01); *G05D 1/0088* (2013.01); *G05D 1/104* (2013.01); *G06Q 10/08* (2013.01); *B64C 39/02* (2013.01); *B64C 2201/12* (2013.01); *B64C 2201/128* (2013.01); *B65G 1/137* (2013.01); *B65G 67/00* (2013.01); *G05B 2219/39251* (2013.01); *G05D 2201/0216* (2013.01)

(58) Field of Classification Search
CPC ...... B25J 13/006; B25J 11/008; B25J 9/1679; B25J 9/1602; B25J 9/1669; B25J 9/08; B25J 9/1656; B64C 39/024; B64C 2201/128; B64C 2201/12; B64C 39/02; G05D 1/0088; G05D 1/104; G05D 2201/0216; B64D 1/08; G06Q 10/08; B08B 1/04; G05B 2219/39251
USPC .......................................................... 700/245
See application file for complete search history.

(56) References Cited

U.S. PATENT DOCUMENTS

| | | | | |
|---|---|---|---|---|
| 5,774,053 | A * | 6/1998 | Porter .................. | A47G 29/141 |
| | | | | 232/19 |
| 9,384,668 | B2 * | 7/2016 | Raptopoulos ........ | G08G 5/0069 |
| 9,393,699 | B1 * | 7/2016 | Jules ..................... | B25J 13/006 |
| 9,494,937 | B2 * | 11/2016 | Siegel ................. | G05D 1/0027 |
| 9,573,684 | B2 * | 2/2017 | Kimchi ................ | B64C 39/024 |

(Continued)

*Primary Examiner* — Jaime Figueroa
(74) *Attorney, Agent, or Firm* — Minisandram Law Firm; Raghunath S. Minisandram

(57) ABSTRACT

A robotic system is disclosed. The robotic system includes a robot. A module is coupled to the robot. An item is disposed within the module. The module includes a release door configured to be selectively opened and closed. When the release door is selectively opened, the item is dropped from the module.

17 Claims, 64 Drawing Sheets

(56) References Cited

U.S. PATENT DOCUMENTS

| | | | |
|---|---|---|---|
| 9,839,267 B1* | 12/2017 | Gharabegian | A45B 25/16 |
| 9,915,956 B2* | 3/2018 | Bokeno | B64C 39/024 |
| 9,926,078 B2* | 3/2018 | Bonazzoli | B64D 1/08 |
| 10,126,746 B2* | 11/2018 | O'Brien | G05D 1/0088 |
| 10,163,177 B2* | 12/2018 | Farris | G01C 21/00 |
| 2014/0254896 A1* | 9/2014 | Zhou | B25J 9/0006 |
| | | | 382/124 |
| 2015/0120094 A1* | 4/2015 | Kimchi | B64C 39/024 |
| | | | 701/3 |
| 2015/0370251 A1* | 12/2015 | Siegel | G05D 1/0027 |
| | | | 701/2 |
| 2016/0033966 A1* | 2/2016 | Farris | G01C 21/00 |
| | | | 701/15 |
| 2016/0129594 A1* | 5/2016 | Telling | B25J 9/1676 |
| | | | 700/255 |
| 2016/0200438 A1* | 7/2016 | Bokeno | B64C 39/024 |
| | | | 244/2 |
| 2016/0364989 A1* | 12/2016 | Speasl | G08G 5/0034 |
| 2016/0376004 A1* | 12/2016 | Claridge | B64C 19/00 |
| | | | 701/3 |
| 2017/0038780 A1* | 2/2017 | Fandetti | G05D 1/104 |
| 2017/0121021 A1* | 5/2017 | Bonazzoli | B64D 1/08 |
| 2017/0132562 A1* | 5/2017 | High | B64C 39/024 |
| 2017/0228692 A1* | 8/2017 | Pargoe | G06Q 10/0836 |
| 2017/0253335 A1* | 9/2017 | Thompson | B64C 39/024 |
| 2017/0313421 A1* | 11/2017 | Gil | H04W 4/70 |
| 2018/0157258 A1* | 6/2018 | O'Brien | G05D 1/0088 |
| 2018/0186433 A1* | 7/2018 | Gharabegian | B63B 17/02 |

\* cited by examiner

MULTIPURPOSE ROBOTIC SYSTEM

CROSS-REFERENCE TO RELATED APPLICATIONS

This application is a continuation-in-part application of application Ser. No. 15/345,934 filed on Nov. 8, 2016, which claimed priority to provisional application 62/253,071 filed on Nov. 10, 2015 and provisional application 62/346,424 filed on Jun. 6, 2016. This application is also a continuation-in-part application of application Ser. No. 15/345,912 filed on Nov. 8, 2016, which claimed priority to provisional application 62/253,071 filed on Nov. 10, 2015 and provisional application 62/346,424 filed on Jun. 6, 2016. This application is a non-provisional application of provisional application 62/346,424 filed on Jun. 6, 2016. Application Ser. No. 15/345,934 filed on Nov. 8, 2016 is incorporated herein by reference in its entirety. Application Ser. No. 15/345,912 filed on Nov. 8, 2016 is incorporated herein by reference in its entirety. Application No. 62/346,424 filed on Jun. 6, 2016 is incorporated herein by reference, in its entirety. Application No. 62/253,071 filed on Nov. 10, 2015 is incorporated herein by reference, in its entirety. Application No. 62/346,424 filed on Jun. 6, 2016.

BACKGROUND

Mobile robots can be implemented as vehicles that freely roam on a surface using, for example, wheels, track treads, and so on. Mobile robots can also be implemented as vehicles that travel on tracks that are laid out on the ground or suspended overhead. Mobile robots can also be implemented as drones that are able to move around using propeller or jet propulsion. Mobile robots also be can be implemented as other types of robots, including, for example, those that travel in water.

DETAILED DESCRIPTION

Figure 1:
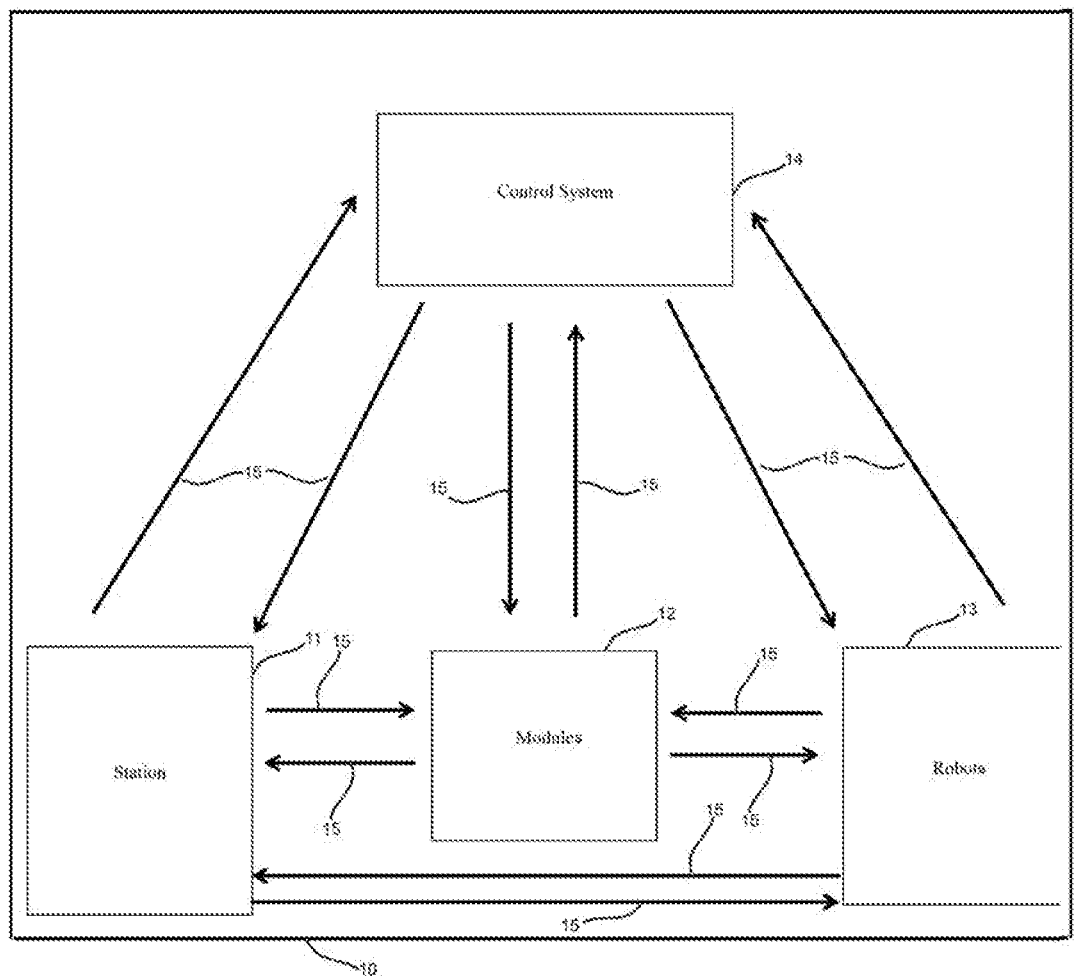
FIG. 1 is a simplified block diagram for the multipurpose robotic system in accordance with an implementation.

FIG. 1 shows a multipurpose robotic system 10 that includes a control system 14, stations 11, robots 13 and extension modules 12. Stations 11 include housing for robots 13 and extension modules 12. There may be one or more stations 11, robots 13 and extension modules 12.

Each of extension modules 12 may be configured to perform one or more tasks. For example, an extension module can be configured as a cleaning module used to clean a vehicle or perform some other cleaning service. For example, a cleaning module can be used for snow removal or to vacuum dirt, leaves and so on. For example, an extension module can also be configured as a sales module to provide information to and receive orders from a customer. Alternatively, an extension module can be configured as a vacuum module, a dirt sensor module, or some other type of extension module.

Control system 14 includes the hardware and the software that manages, controls, and monitors the requests and tracks the progress of the services provided by robots 13 with extension modules 12 and without extension modules 12 and stations 11. In addition, control system 14 manages the safety of multipurpose robotic system 10 and checks all parts of multipurpose robotic system 10 and provides component status. Each part of multipurpose robotic system 10 periodically sends its status to control system 14. As represented by arrows 15, stations 11, robots 13 and extension modules 12 each may have a direct communication link with control system 14 and with each Control system 14 receives service requests from customers. For example, the customer uses a computing device such as a personal computer, laptop computer, smart phone or tablet to make a service request from control system 14. For example, the service request is a request to schedule a service to be performed for the customer.

Control system 14 initiates and runs tasks and requests. The services are performed by one or more of robots 13 and one or more of extension modules 12. Control system 14 communicates with stations 11, robots 13 and extension modules 12. communicate with control system 14 through connections to the robots 13. Each of robots 13 relay notifications and messages to any extension module connected to the robot. Alternatively, extension modules 12 can be in direct communication with control system 14. Such direct communication, for example, allows functionality like displays on a display screen of an extension to be controlled directly by an extension module without the necessity of going through a robot.

Figure 2:
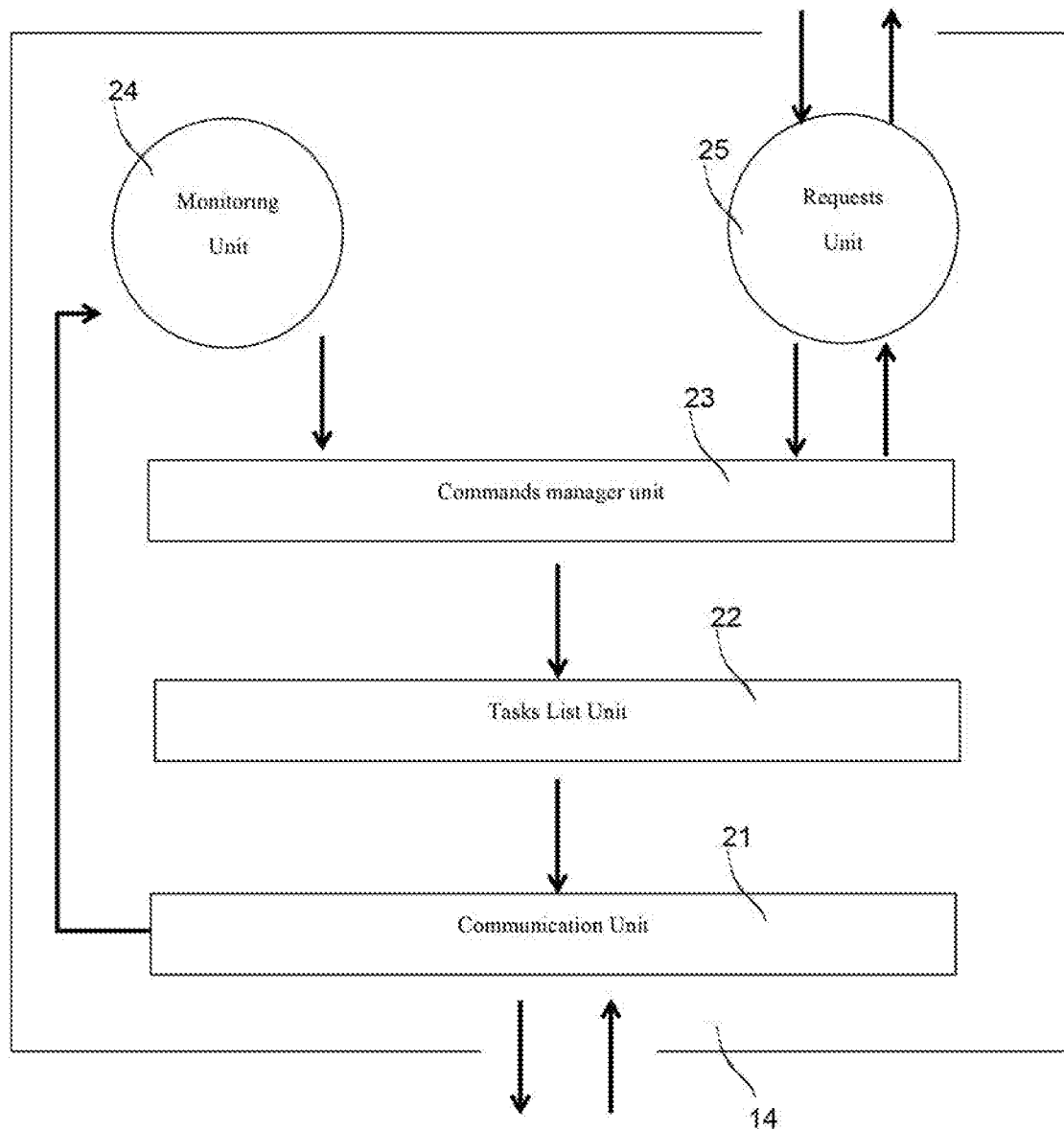
FIG. 2 is a simplified diagram for the control system in accordance with an implementation.

FIG. 2 shows control system 14 including a monitoring unit 24, a request unit 25, a commands manager unit 23, a tasks list unit 22 and a communication unit 231. This configuration of units within control system 14 may vary based on application, as in some applications a different mix of units with varying functionality may be used to implement control system 14.

Managing unit 24 is responsible for collecting periodically the data that comes from the components of multipurpose robotic system 14. The collected data is presented to commands manager unit 23. Commands manager unit 23 is responsible for analyzing and creating sub tasks and commands to the system parts. A task list unit 22 is responsible for listing and queuing all tasks that come from commands manager unit 23. Commands manager unit 23 prioritizes tasks according to system needs, system interruptions, emergency, or safety concerns. Communication unit 21 is responsible for receiving data from components of multipurpose robotic system 10 and sending tasks and commands to robots 13 and where allowed, to extension modules 12. Requests unit 25 communicates with the customers. The communications include reception of requests and sending notifications and messages.

Robots 13 are implemented, for example, as unmanned aerial vehicles (UAVs, i.e., drones), unmanned ground vehicles (UGVs) or as unmanned aerial system (UASs). Other types of robots may also be used.

Figure 3:
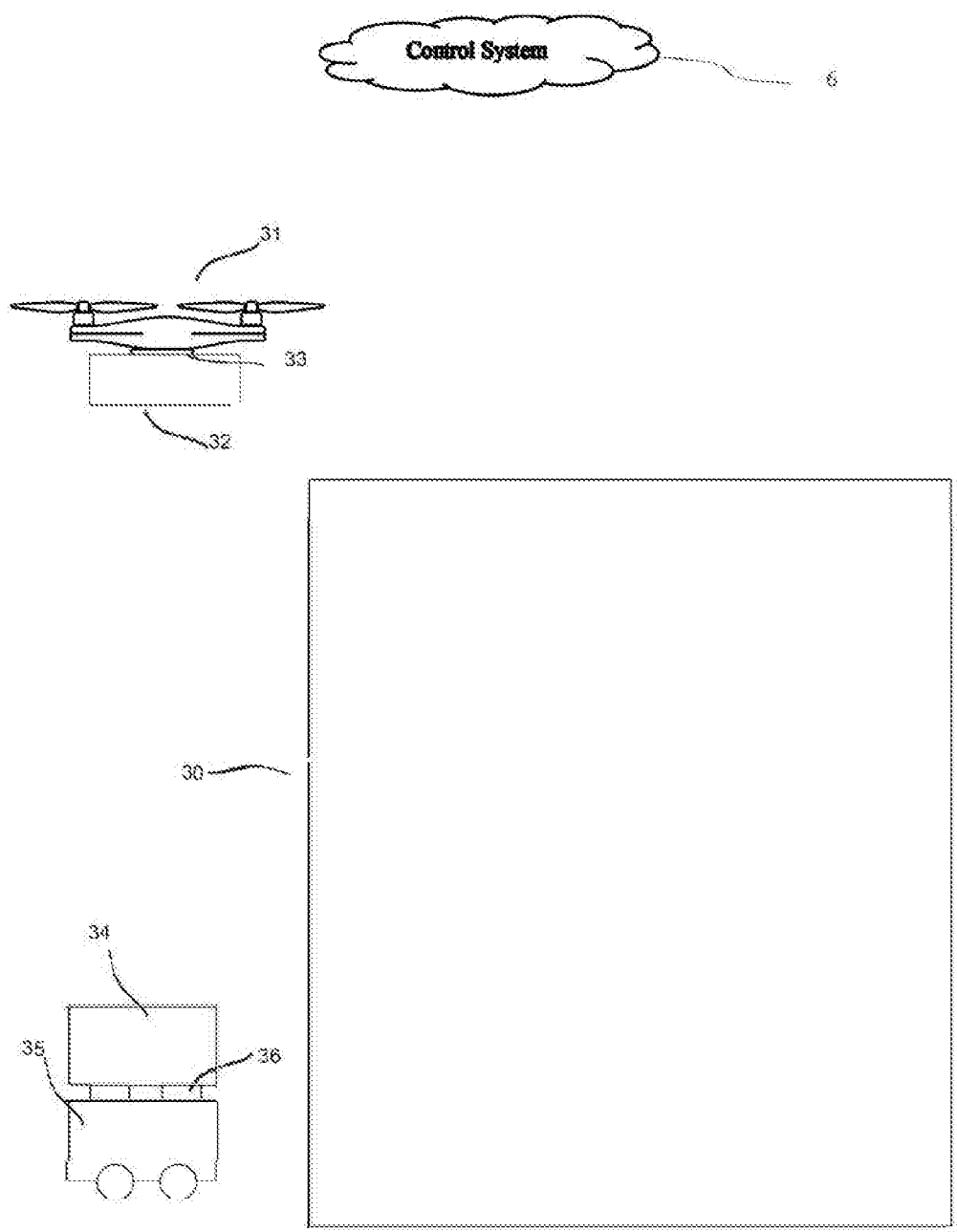
FIG. 3 is a simplified diagram showing two types of robots in accordance with an implementation.

Robots and the extension modules are attached to each other, for example, mechanically or magnetically, using an attachment mechanism. For example, FIG. 3 shows a robot 31 connected to an extension module 32 through an attachment mechanism 33. For example, the attachment is made a mechanical connector such as a latch, or another mechanical device. Alternatively, attachment mechanism 33 is implemented using magnets or some other mechanical or electrical device. FIG. 3 also shows a ground vehicle 35 connected to an extension module 34 through an attachment mechanism 36. For example, the attachment is made a mechanical connector such as a latch, or another mechanical device. Alternatively, attachment mechanism 36 is implemented using magnets or some other mechanical or electrical device.

Examples of the extension modules 12 include but are not limited to cleaning modules, delivery modules, vacuum modules, dirt detection modules or other types of modules as further described below.

Figure 4:
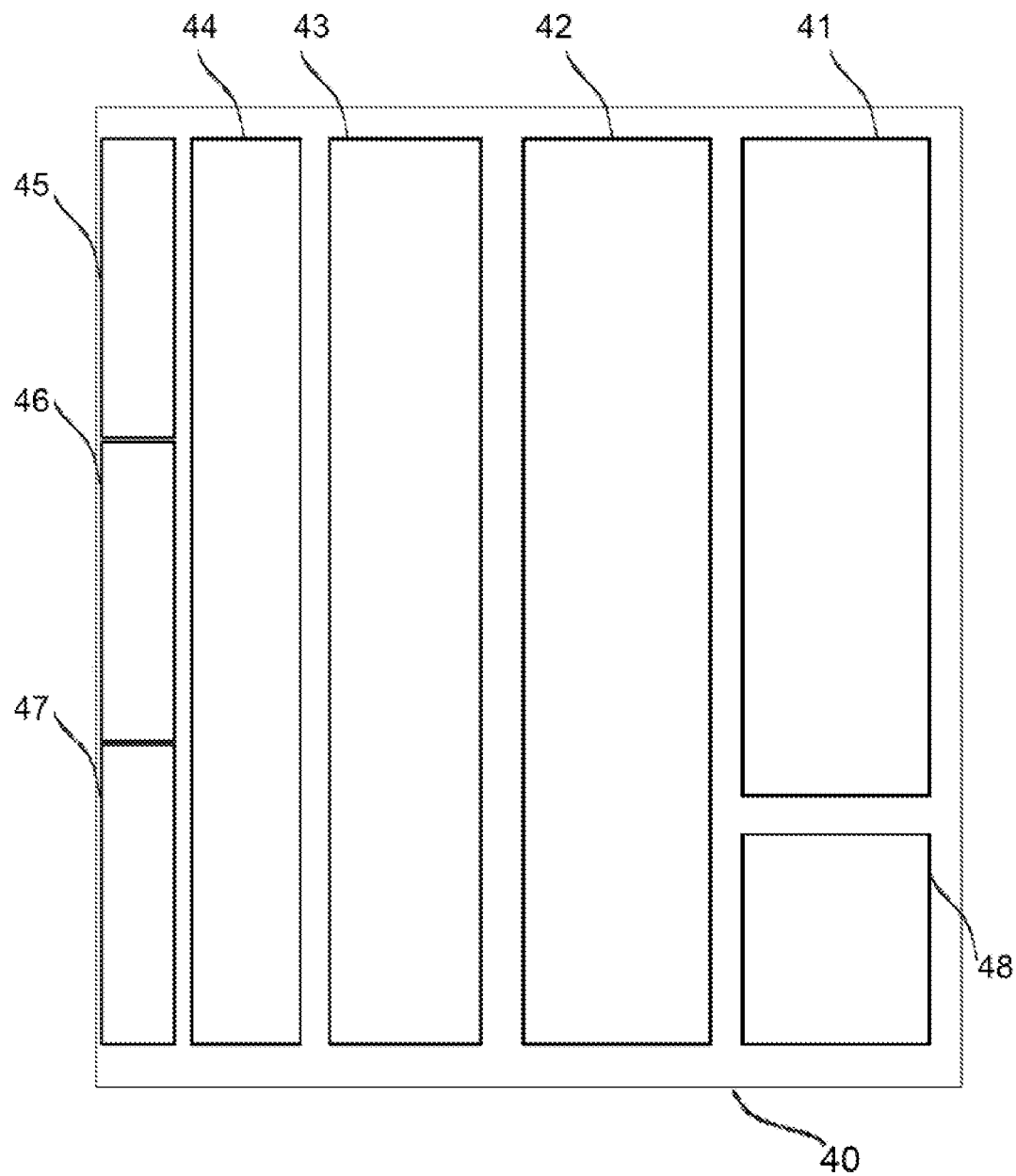
FIG. 4 is a simplified diagram of a "ground" robot with an attached extension module in accordance with an implementation.

Communication between robots and extension modules can be accomplished wirelessly or wired. For example, FIG. 4, shows a wireless communication device 54 within ground vehicle 35.

The components of robots vary based on anticipated application. They components can include, for example, engines, batteries, computer devices, navigation systems, cameras, video recorders, communication devices, sensors and any other device helpful to accomplish tasks intended to be performed by the robots.

Depending on applications, each of robots 13 is equipped with appropriate safety and emergency systems to prevent any harm and damage to people or property. As appropriate, warning systems are included within each of robots 13 to provide warning before there is any potential any harm or damage to people or property. Examples of safety components include, for example, parachutes, audio alarms, emergency lighting and other safety components that are anticipated to be appropriate based on the intended use of each of robots 13.

In some examples, components related to movement, sensing or safety may be located in extension modules 12. Extension modules 12 include, for example, communication functionality to communicate with an attached robot and/or control system 14. Each of extension modules 12 can also have additional safety systems, for example, to continue to provide protection in events such as when an extension module separates from a robot. Examples of safety components include, for example, parachutes, audio alarms, emergency lighting and other safety components that are anticipated to be appropriate based on the intended use of each of extension modules 12. When communication between a robot and an attached extension module is lost, or there is a malfunction or other unexpected event, the robot will return the extension module to an appropriate station.

Figure 5:
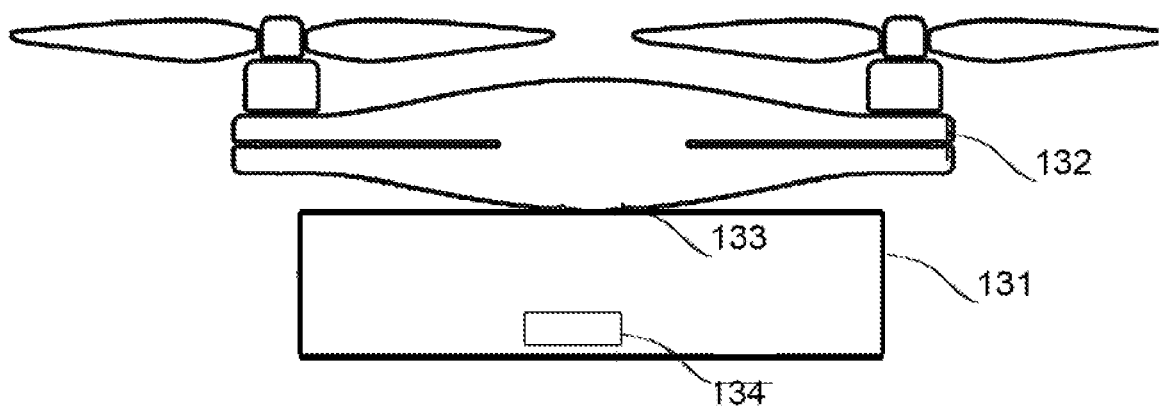
FIG. 5 is a simplified diagram showing sections of a station in accordance with an implementation.

FIG. 5 shows additional detail of station 40, which is one of stations 11. Station 40 includes, for example, launch areas for launching and receiving robots, housing, and preparing places for robots and extension. Stations can be portable and located on vehicles such as, but not limited to, trucks or boats. Also, stations can be based at a stationary location such as a building. Stations are divided into sections as is illustrated by FIG. 5.

For example, a section 43 is a preparing section used for readying robots and extension modules. A section 41 is a robot room for storing robots. A section 42 is used to store containers. A section 44 is used to store extension modules. A section 45 is used to house one or more computer devices. A section 46 is used to house navigation systems and communication devices. A section 47 is used to house power supplies and generators, including batteries, generators and other sources of power. A section 48 is a fuel room used to fuel hybrid or gas powered robots.

Station 40 can have a backup generator or battery in case of an emergency power outage. Station 40 can have solar panels installed to charge the battery in station 40. The order and placement of sections in station 40 is exemplary. There is no required placement or order for the sections in station 40.

Further, the sections can be in one station or can be separated among multiple stations. For example, the preparing section can be in one station and robot rooms can be in another station. When the sections are separated in multiple stations, the system parts should have access to the sections housed in other stations by methods such as, but not limited to, doors to enable the retrieval of extension modules, robots, and items carried by extension modules and robots to use the service of the section. The number of elements in every section can be singular or multiple. For example, the preparing section can have one or multiple devices. For example, stations can have one or multiple identical sections. For example, a single station can have one or multiple preparing sections.

Figure 6:
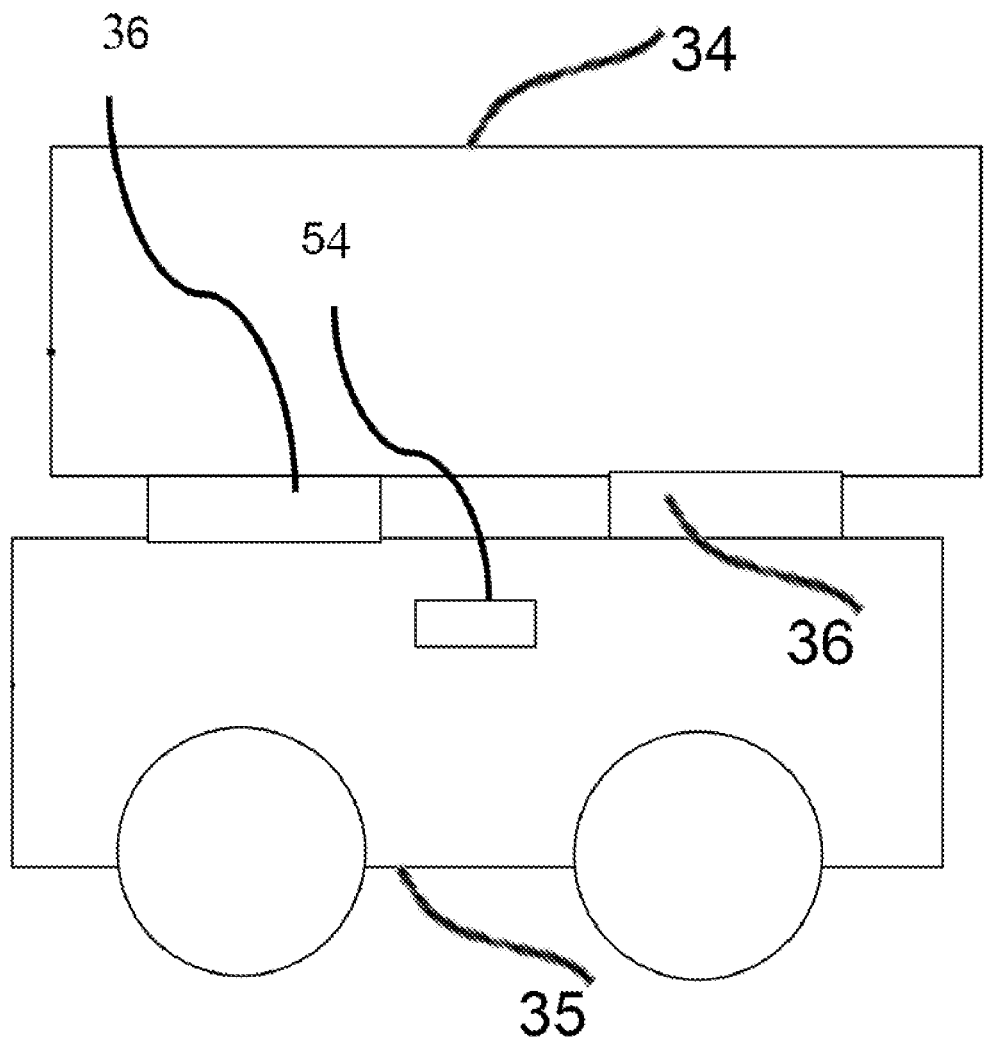
FIG. 6 is a simplified diagram providing additional details of sections of a station in accordance with an implementation.

FIG. 6 suggests some of the flexibility possible when designing and implementing an exemplary station 60. To move extension modules, robots or any items inside a station, the station may have one or multiple moving mechanisms. For example, FIG. 6 shows a conveyer system 65 used to move a holder 69. Alternatively, a moving mechanism can be a robot such as, but not limited to, an unmanned ground vehicle. The robot can carry and move extension modules and items between sections in one or multiple rooms in a building. Extension modules and robots can attach to or detach from each other inside or outside station 60.

Stations have communication devices such as, but not limited to, 4G networks to communicate with the system, robots and extension modules. Stations have navigation devices such as, but not limited to, global positioning systems (GPS) to enhance locating and navigation functionality. Some sections can have designated doors to access and exit to enable robots to deliver extension modules and items directly to the section. In this case, the section could have a separate moving mechanism inside the section.

For example, station 60 has an empty spot 79 to enable robots to make safe stops in case of emergency cases. Also, a station can have a separate control station to autonomously control both robots and extension modules. A station can have a section to enable customers to order services directly from the station site. For example, a touchscreen can enable customers to order services directly from station 60. For example, a limited range network such as, but not limited to, a near field communication (NFC) chip can be used to enable customers to order the services when they are close to station 60 using their computer devices.

For example, station 60 has a section used to fill one or more containers 74 with liquid. One or multiple valves 71 are used as are one or multiple pumps 73 or any other mechanisms to move liquids to fill the extension modules or the robots or to use liquid in preparing processes in the devices in the preparing section such as, but not limited to, cleaning extension modules. Station 60 includes one or more doors 70 used to fill the stations with extension modules or replace them. For example, station 60 has a door 67 used to fill or receive extension modules or items from the robots. Stations have extra space in the preparing section and other sections as needed to facilitate station activity. For example, station 60 has one or more computer devices and systems to run and manage operations.

If a robot (with or without an extension module or an item carried by robots and extension modules) returns to a station and the station does not respond to control system 14 or the station has one or multiple failure notifications from elements that receives robots and extension modules (such as, but not limited to, station doors for extension modules and robots), the robot can stop at an emergency spot in the station. If there is any problem with the station such as, for example, the station being unable to open a door to let a robot launch, control system 14 will redirect the command to another station. In case of emergency in the station such as a fire, the station evaluates the situation. If the emergency situation is a manageable situation and the station is able to release the robots out of the station, the station sends a command to all robots to leave the station. If the emergency situation is a manageable situation and the station is able to release the robots and the extension modules, the station sends a command to all robots to pick up one or multiple extension modules before leaving the station. When an extension module malfunctions or the station does not have the extension module for the service, control system 14 sends a robot to pick up the extension module from its housing location and take it to a service area.

The purpose of a preparing section is to prepare extension modules for the next service or to prepare items carried by the extension modules and robots, such as delivery items. The preparing process can be accomplished at any time. The preparing process is not limited to specific processes or actions. The preparing processes can include, for example, cleaning, scanning, sanitizing, filling extension modules with liquid. In station 60, a preparing section 61 can have one or multiple preparing devices represented by a preparing device 72 and a preparing device 75. For example, a preparing device can be a scanning device such as an X-RAY device. Preparing devices such as washers and dryers can be used to wash extension modules or items carried by extension modules and robots. Other preparing devices can be sanitizing devices that clean extension modules or the items carried by the extension modules. Other preparing section devices can be used for replacing batteries device for the robots and modules. The preparing section devices can be located inside or outside the station. For example, preparing section devices can be on the roof of the station or at other locations. Various other types of preparing devices also can be utilized.

Every device in the preparing section can have one or multiple functions. For example, a washer and dryer used for washing and cleaning extension modules, can also be used to get rid of waste from a waste container within the extension modules. The purpose of scanning the extension modules and items carried by extension modules and robots is to identify all of the items of the extension module. Extension modules and items carried by extension modules and robots can use one or multiple preparing devices in order to be ready to next services. In the case where the preparing section in the station has more than the expected number of extension modules or the expected number of another other item carried by a robot or an extension, control system 14 can direct a robot to deliver a missing extension module or item carried by the robot and extension module from another station A containers section 62 has one or multiple containers filled with liquid such as soap, water, fuel, waste material or other types of liquids or solid items. Containers section 62 can also contain moving mechanisms to move the container or for the solid items. The purpose of the waste container is to receive waste from other sections such as, but not limited to, waste in waste storage 77 in preparing section 61. Station 60 includes one or more pipes 76 leading outside of station 60 to remove the waste from all the sections. Containers can have electronic or mechanical sensors to measure liquid levels. When a waste or another container is full, nothing more may be added until the container is no longer full.

A robot room 82 houses the robots, represented by a robot 24. A charger 81 is present for use when robots stored in robot room have batteries. For example, chargers attach to the robots using an attaching mechanism that operates through cables or wirelessly. The robot rooms can have an electronic holder or any other mechanisms to enable robots to make a successful launch without collision from a launching area 85. Filling area 80 can be used to provide fuel for hybrid or gas powered robots. A door 83 allows robots to enter and exit robot room 82. For example, robot rooms have sensors to check the availability, the stability, and the functionality of the robots. The access to robot rooms can be accomplished from inside or outside the stations.

Some extension modules need to be re-charged. Chargers 78 in preparing section 61 can be used to charge the extension modules. The chargers attach with the extension modules using attaching mechanism can be accomplished wirelessly or wired. For example, extension modules can be stored on shelves as represented by shelves 63 and extension module 64 and extension module 66.

Filling robots with fuel can be accomplished in a special section using electronic sprays or any other mechanism to fill the robots with fuel. The location of fuel room can be inside or outside the station such as, but not limited to, the stations' roof. The robots can go third party stations to fill the robot with fuel.

Figure 7:
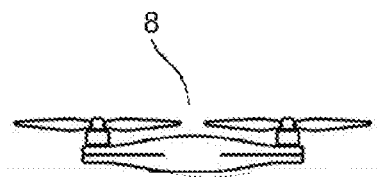
FIG. 7 is a simplified diagram showing a multipurpose robotic system extension module attached to a robot in accordance with an implementation.
Figure 7:
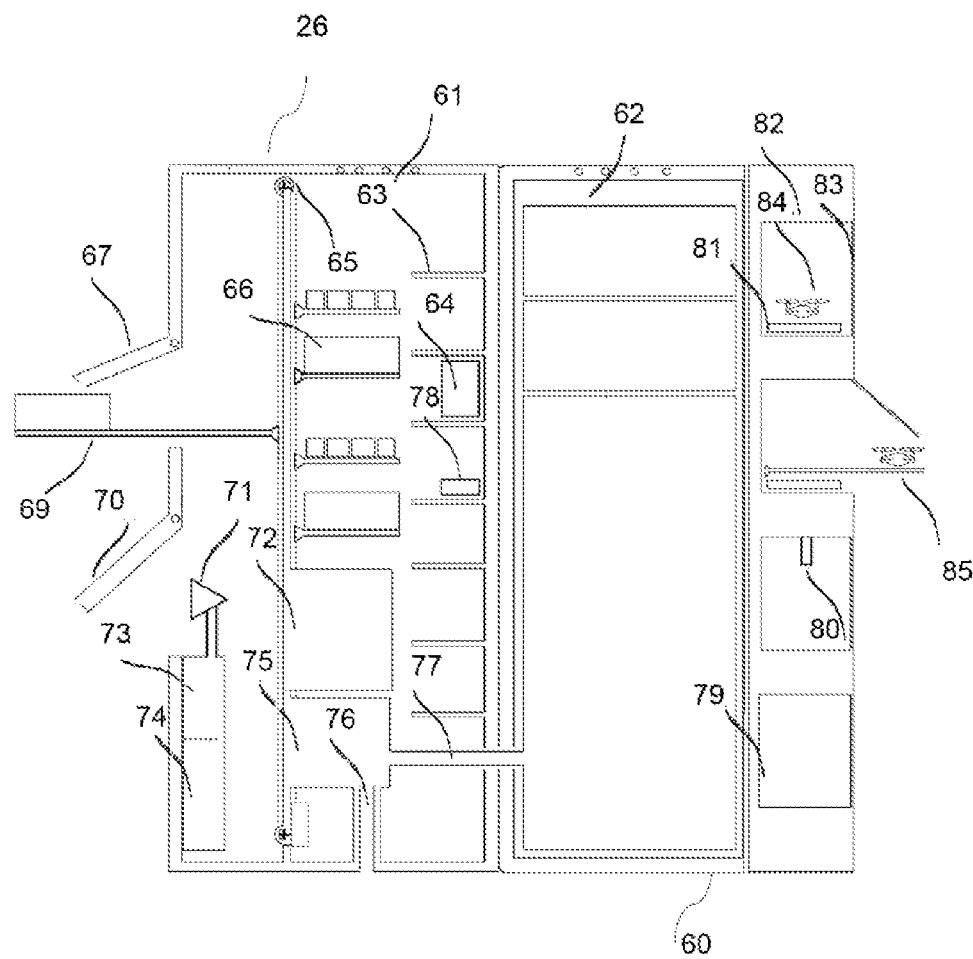

Extension modules can be configured to perform various functions. In FIG. 7, an extension module 100 is shown connected to a robot 102 by a mechanical or electrical (e. g. magnetic) attachment mechanism 104. A communication device 106 allows communication with other robots, a station, control system 14, extension module 100 and/or a customer. The communication between robots and extensions can be accomplished wirelessly or by using cables.

Figure 8:
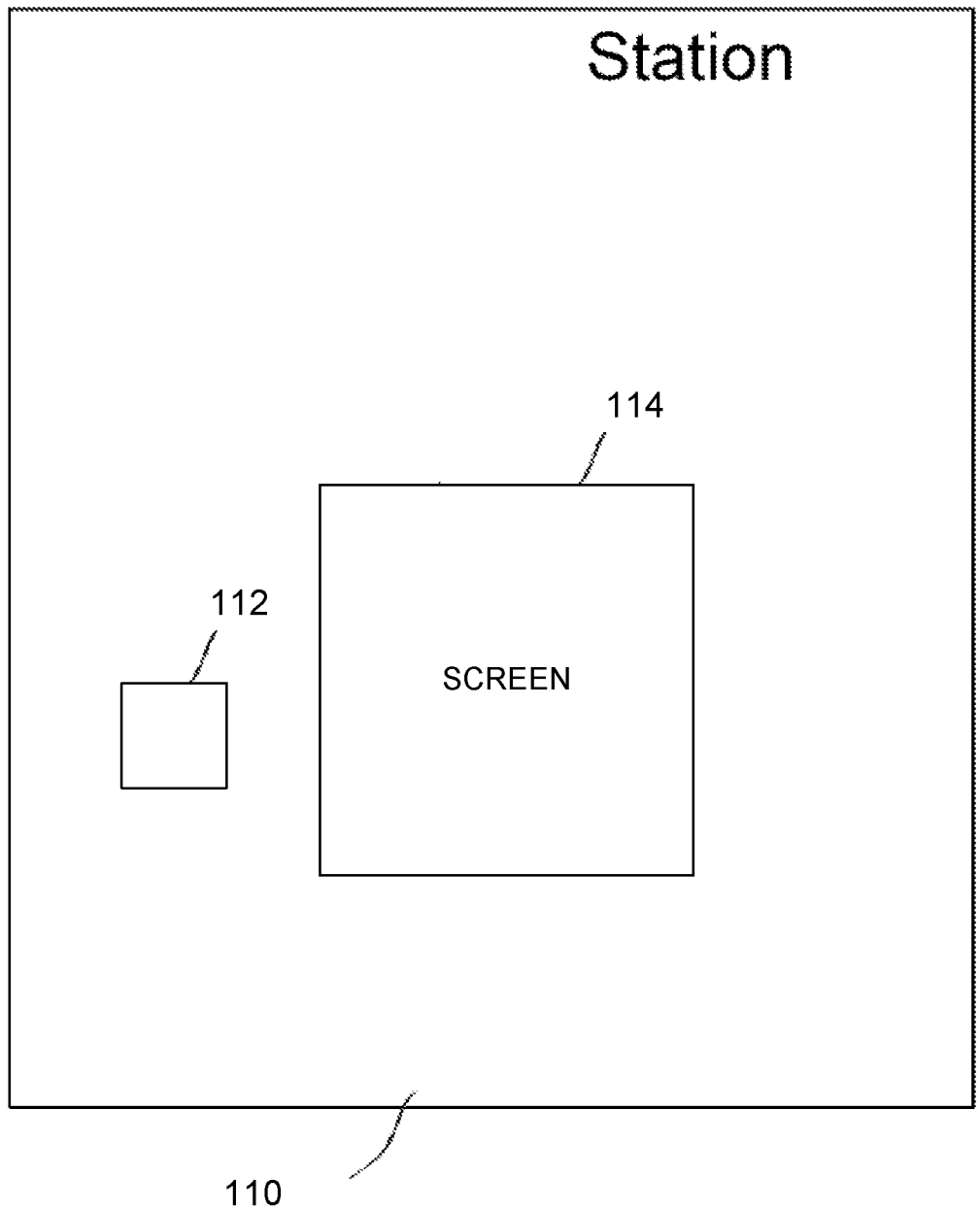
FIG. 8 is a simplified diagram of a station that has an outside screen and a small range communication "beacon" in accordance with an implementation.

In FIG. 8, a station 110 includes a screen 114 on a surface of station 110 that can be useful to communicate with a customer to receive customer orders as well as to advertise services available from robots available through customer interactions with station 110. A close range wireless communication protocol device 112, such as a Bluetooth communication protocol device, can be used by a customer to request services from their computer device.

Figure 9:
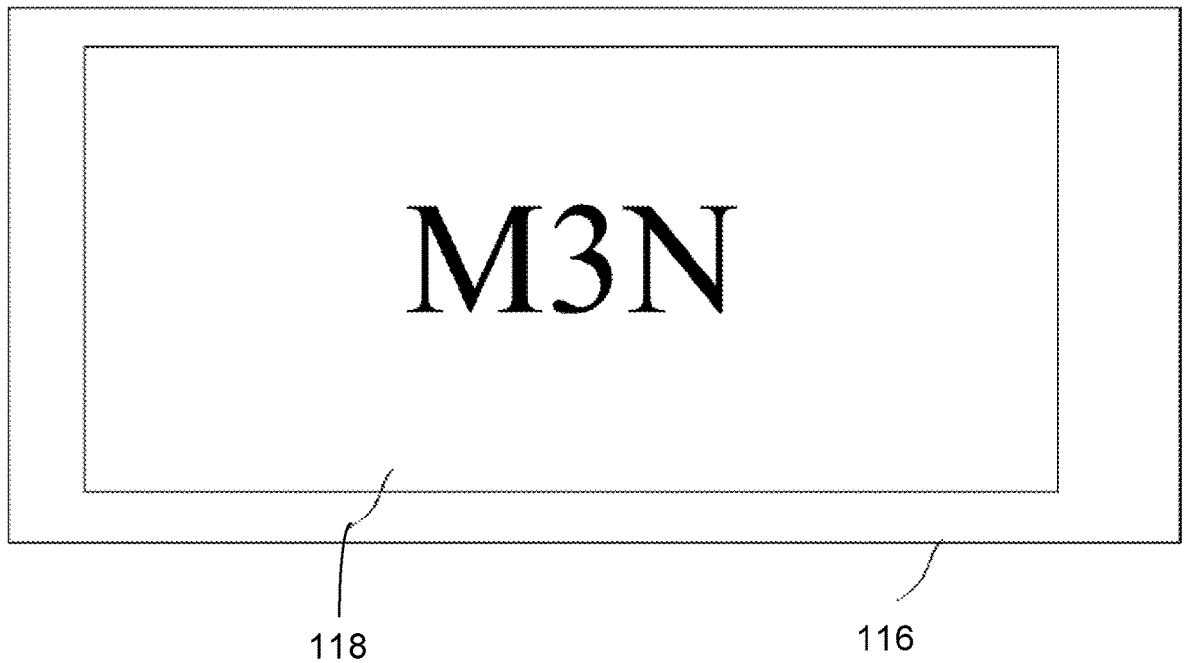
FIG. 9 is a simplified diagram of a module with a side advertisement screen in accordance with an implementation.

In FIG. 9, a sales/advertising module 116 includes a display screen 118. Display screen 118 can be used, for example, to deliver advertisements. For example, sales/advertising module 116 is attached to a robot and used to display advertisements at various locations. For example, the advertisement changes with locations of the robot and with time and date. For example, if when the robot location is above New York city, the advertisement can target New Yorkers. when the robot location is above San Francisco, the robot can target residents of San Francisco residents, and so on. For example, display screen 118 is implemented using LCD, LED or another screen technology.

Figure 10:
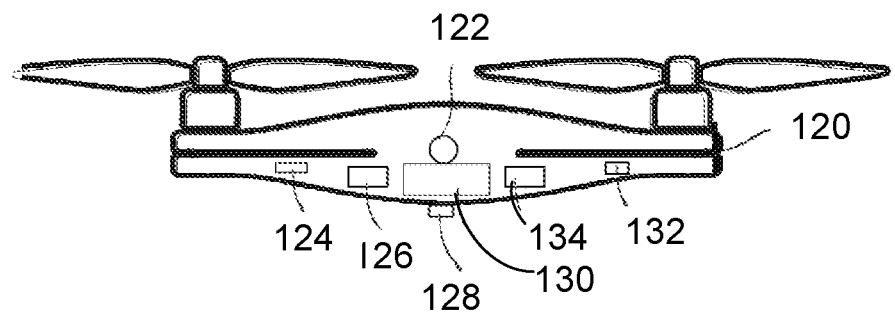
FIG. 10 is a simplified diagram of a robot with an NFC small range network used for making payments in accordance with an implementation.

FIG. 10 gives an example of a sales robot 120 useful for communicating services and receiving payments from customers. Sales robot 120 includes a limited range network 126 to communicate with customers and allow them to pay using their computer devices. For example, limited range network 126 is a Near Field Communication (NFC) or similar network. For example, sales robot 120 can be called to a customer location. The customer can use a computing device such as a smart phone to communicate over limited range network 126 and make payments and provide instructions to sales robot 120. Alternatively, sales robot 120 can include a voice recognition device, credit card scanner or other communication device to receive orders, payments or other communications from a customer.

For example, sales robot 120 includes a display screen 130 to present information to customers. For example, sales robot 120 also includes speakers 132, an optional dirt sensor 128, a camera 122, and lights 134 for night or unclear vision. A small range communication device 124 is used to let customers request services using their computer devices. For example, a robot acts like a sales person, so customers pay and request services from the robot at the customer location.

Sales robot 120 can also be used for other purposes such as to check for correct parking configurations, for example, to check if customers park correctly with enough distances from all obstacles such as cars. Sales robot 120 can be implemented, for example using commonly available computer device components and communication chip such as 4g network to communicate with control system 14 and stations.

Figure 11:
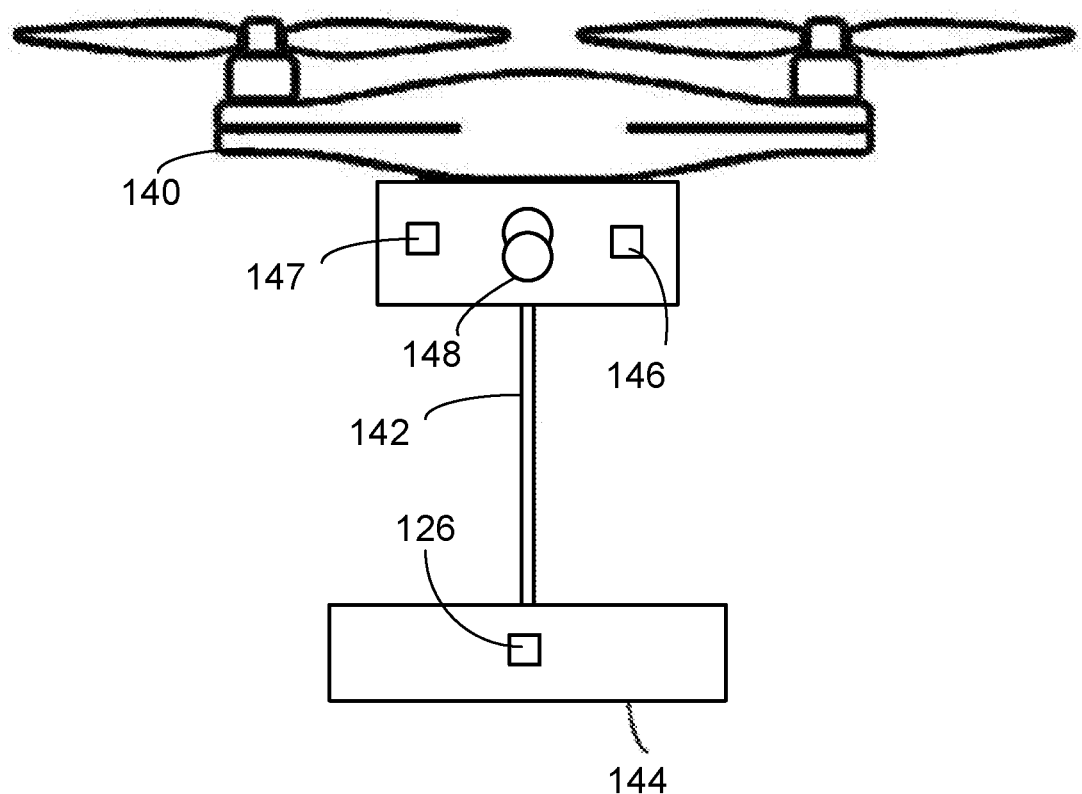
FIG. 11 is a simplified diagram of a robot with an arm and an NFC small range network used for making payments in accordance with an implementation.

FIG. 11 shows example of another robot 140 useful for communicating services and receiving payments from customers. The robot 140 further includes an arm 142, distal end of the arm coupled to an enclosure 144. The arm 142 is configured to be selectively extended or retracted. In the extended position, the enclosure 144 is away from the robot 140. In the retracted position, the enclosure 144 is close to the robot 140. The enclosure 144 includes a limited range network 126 to communicate with customers and allow them to pay using their computer devices. For example, limited range network 126 is a Near Field Communication (NFC) or similar network. By selectively moving the enclosure 144 away from the robot 140, a user may safely approach the enclosure 144, while the robot 140 and any rotating parts of the robot 140 is maintained at a safe distance away from the user.

The enclosure 144 may also have additional sensors, for example, object sensors like infrared sensors, which may be advantageously used to selectively extend the arm 142 to a desired length while maintaining a safe and operable distance between the enclosure 144 and a user. In one example, the arm 142 is coupled to a control enclosure 146, which is coupled to the robot 140. The control enclosure 146 may have control electronics 147, motor 148 and other sensors 149 to selectively move the arm 142 between the retracted and the extended position. For example, the control electronics 147 may receive signals from one or more sensors 149 indicating the position of the enclosure 144, as the arm 142 is selectively moved. Based on the received signal from the sensors 149, the control electronics may selectively control the movement of the arm 142, for example by selectively controlling the signals to the motor 148.

Figure 12:
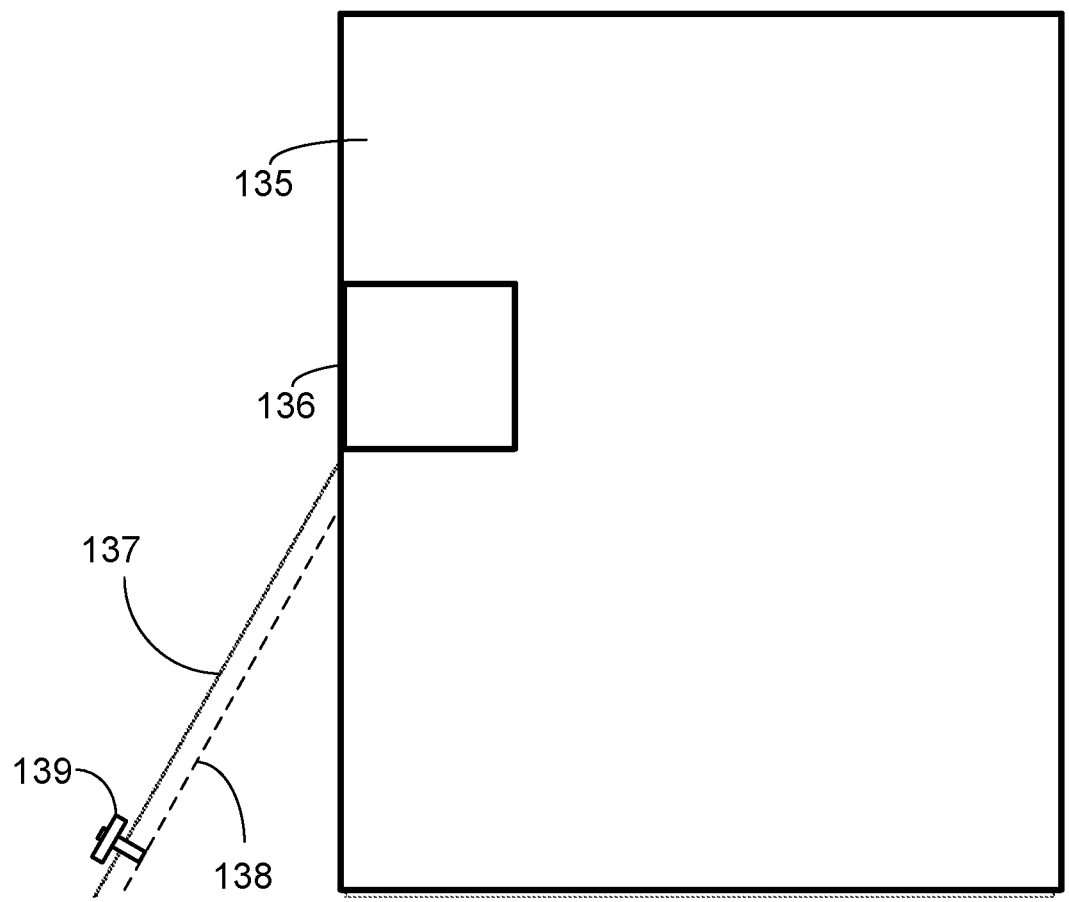
FIG. 12 is a simplified diagram of a station with a ramp.

FIG. 12 shows an example station 135 with a robot room 136. A ramp 137 is operatively coupled to the station 135 so as to provide robots, for example, UGVs access to the robot room 136. In some examples, the ramp 137 may be movably coupled to the station 135 so as to be selectively deployed to permit a UGV to climb up the ramp and into the robot room 136. In some examples, the ramp 137 may include a movable mechanism 138 which may selectively attach to the UGV and transport the UVG to the robot room 136. The movable mechanism 138 in some examples may be a movable carrier with a latching mechanism 139 configured to selectively attach to the UGV and move the UGV up the ramp 137 and into the robot room 136. The latching mechanism 139 may in some examples be an electro-mechanical latch, for example, a magnetic latch. In some examples, the latching mechanism 139 may be a mechanical latch that may be configured to mechanically latch to the UGV.

Previously, with reference to FIG. 5, an example station 40 was described with a preparing station 43. In some examples, the preparing station 43 may have to be selectively expanded to provide more available space to prepare the robot. Now, referring to FIGS. 13 and 14, an example preparing station 43 that is selectively expandable is described. The preparing station 43 includes a fixed portion 150 and a movable portion 152. In one example, the fixed portion 150 is attached to a wall 154 of the station 40. In this example, the movable portion 152 is configured to move along an axis substantially perpendicular to the wall 154, between a first position closer to the wall 154 and a second position away from the wall 154.

Figure 13:
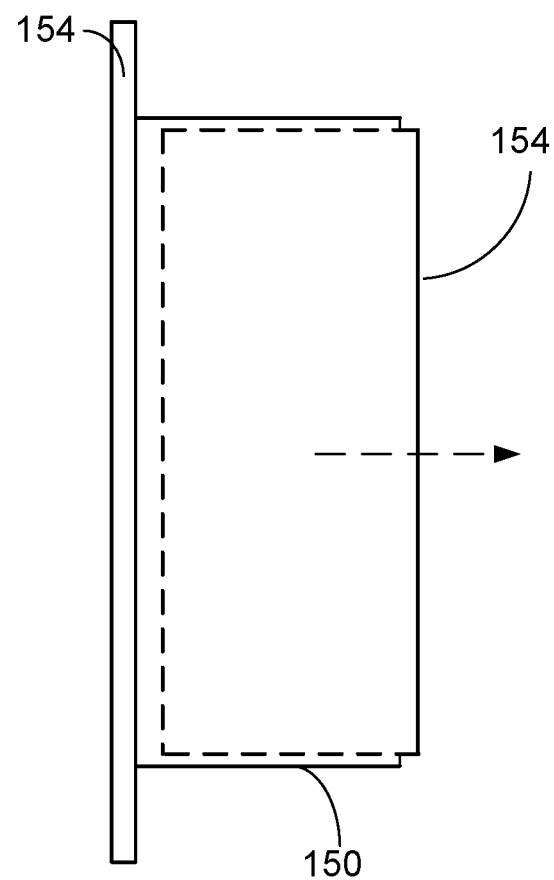
FIG. 13 and FIG. 14 is a simplified diagram of a preparing station with a fixed portion and a movable portion.
Figure 14:
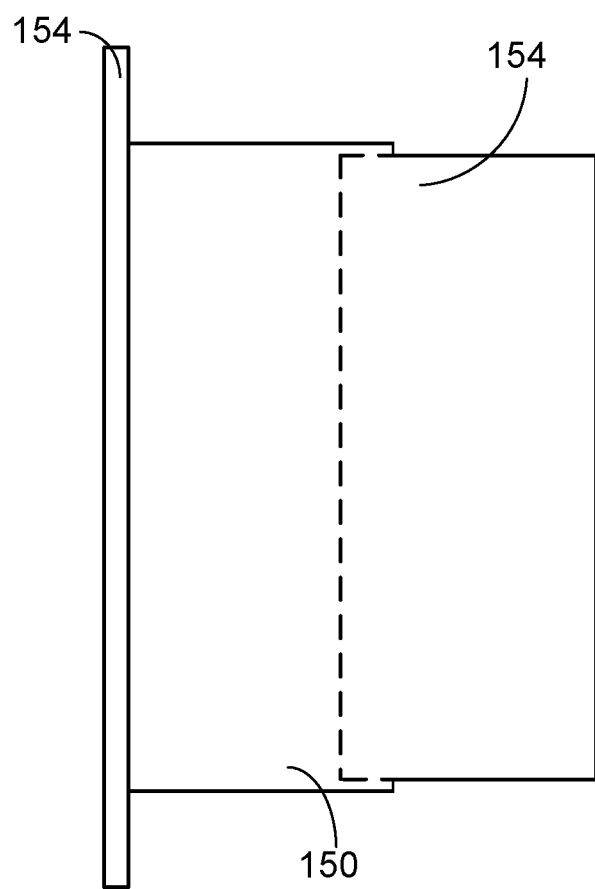

FIG. 13 shows the movable portion 152 at the second position away from the wall 154. In this position, the preparing station 43 is in an expanded position. FIG. 14 shows the movable portion 152 at the first position closer to the wall 154. In this position, the preparing station 43 is in a contracted position. In some examples, the movable portion 152 is maintained in a contracted position, for example, when the system is idle or when the preparing station is not in use. Based on an operation requiring additional space, the movable portion 152 may be selectively moved to the second position away from the wall 154.

In one example, a motor (not shown) may be selectively activated to selectively move the movable portion 152 between the first position and the second position. As one skilled in the art appreciates, the movable portion 152 may also be selectively held in a position between the first position and the second position.

Figure 15:
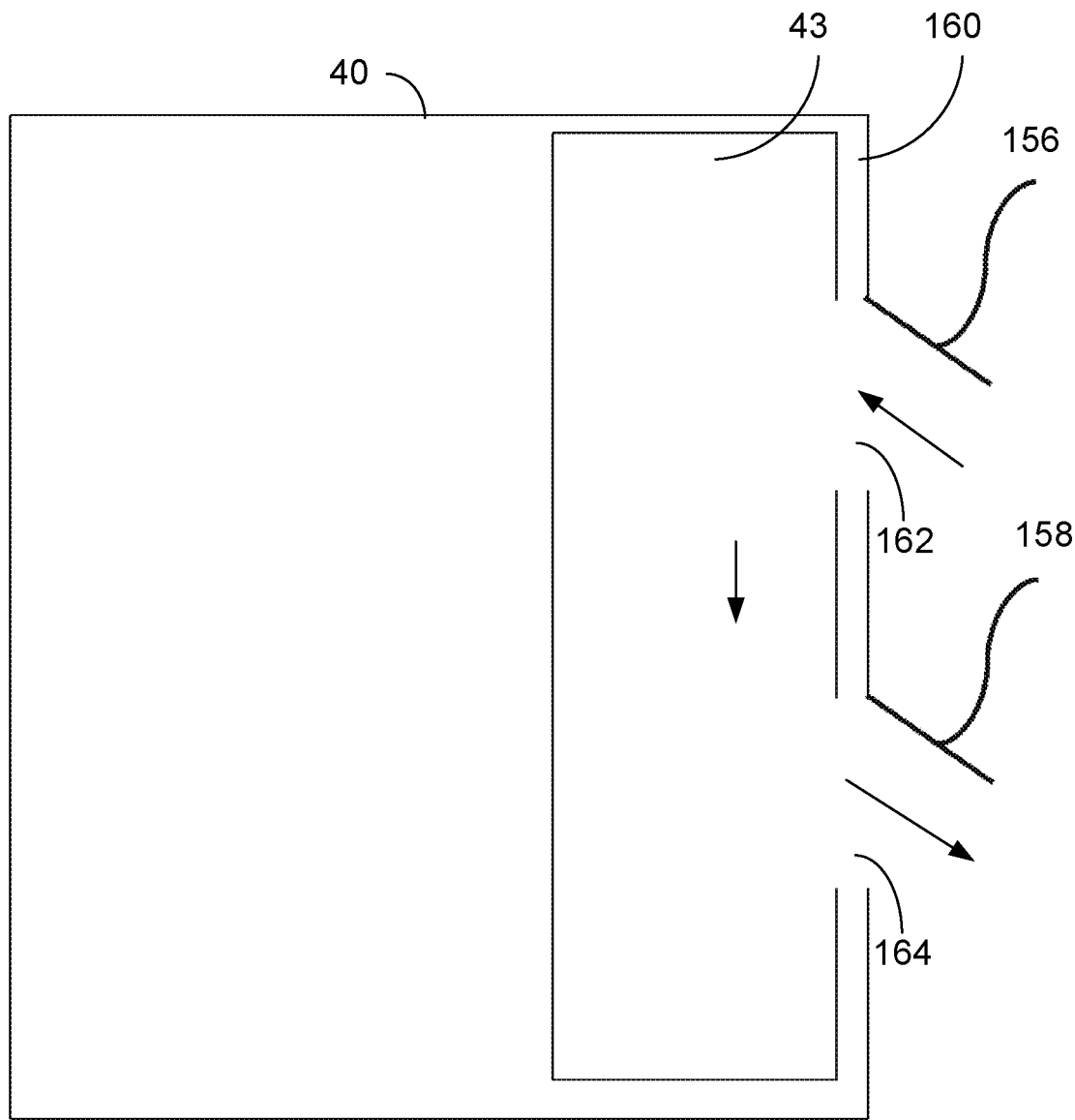
FIG. 15 is a simplified diagram of a preparing station with an entry door and an exit door.

FIG. 15 shows the preparing station 43 of system 40 with an entry door 156 and an exit door 158. In one example, the entry door 156 and the exit door 158 may be movably attached to a wall 160 of the system 40. The entry door 158 and the exit door 158 may be selectively movable from an open position to a closed position. The entry door 156 when in the open position may expose an entry way 162 which is configured to provide access to the preparing station 43. The entry door 156 when in the closed position may selectively close the entry way 162, thereby restricting access to the preparing station 43 Entry way 162 when open may permit a robot or a module to enter the preparing station 43 through the entry way 162.

The exit door 158 when in the open position may expose an exit way 164 which is configured to provide access to the preparing station 43. The exit door 158 when in the closed position may selectively close the exit way 164, thereby restricting access to the preparing station 43. Exit way 164 when open may permit a robot or a module to exit the preparing station 43 through the exit way 163.

Figure 16:
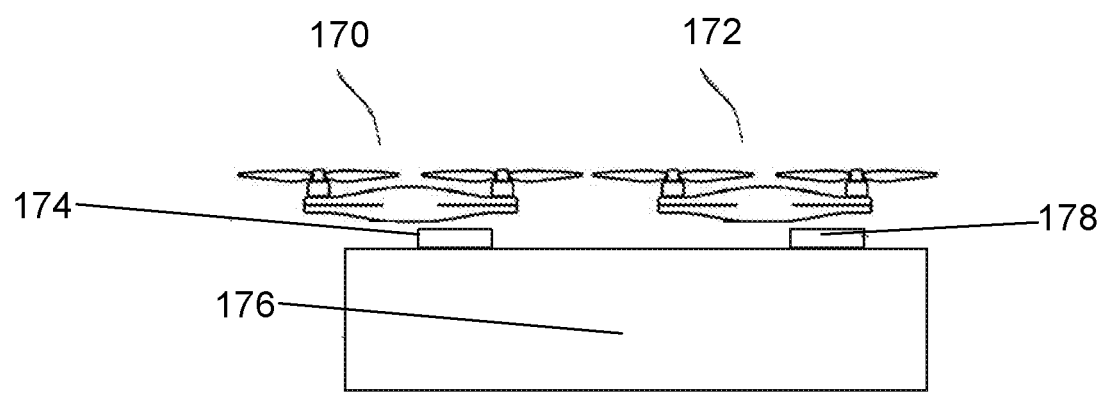
FIG. 16 is a simplified diagram of a first robot and a second robot configured to couple to an extension module.

Previously, with FIG. 7, an extension module 100 was shown connected to a robot 102 by a mechanical or electrical (e. g. magnetic) attachment mechanism 104. In some examples, the extension modules may be heavy or physically big, requiring multiple robots to move them. FIG. 16 shows an example configuration to permit transportation of extension modules that requires multiple robots. FIG. 16 shows a first robot 170 and a second robot 172. A first attachment mechanism 174 selectively couples the extension module 176 to the first robot 170. A second attachment mechanism 178 selectively couples the extension module 176 to the second robot 172. The first attachment mechanism 174 and second attachment mechanism 178 may be similar to attachment mechanism 104 previously described with reference to FIG. 7.

Figure 17:
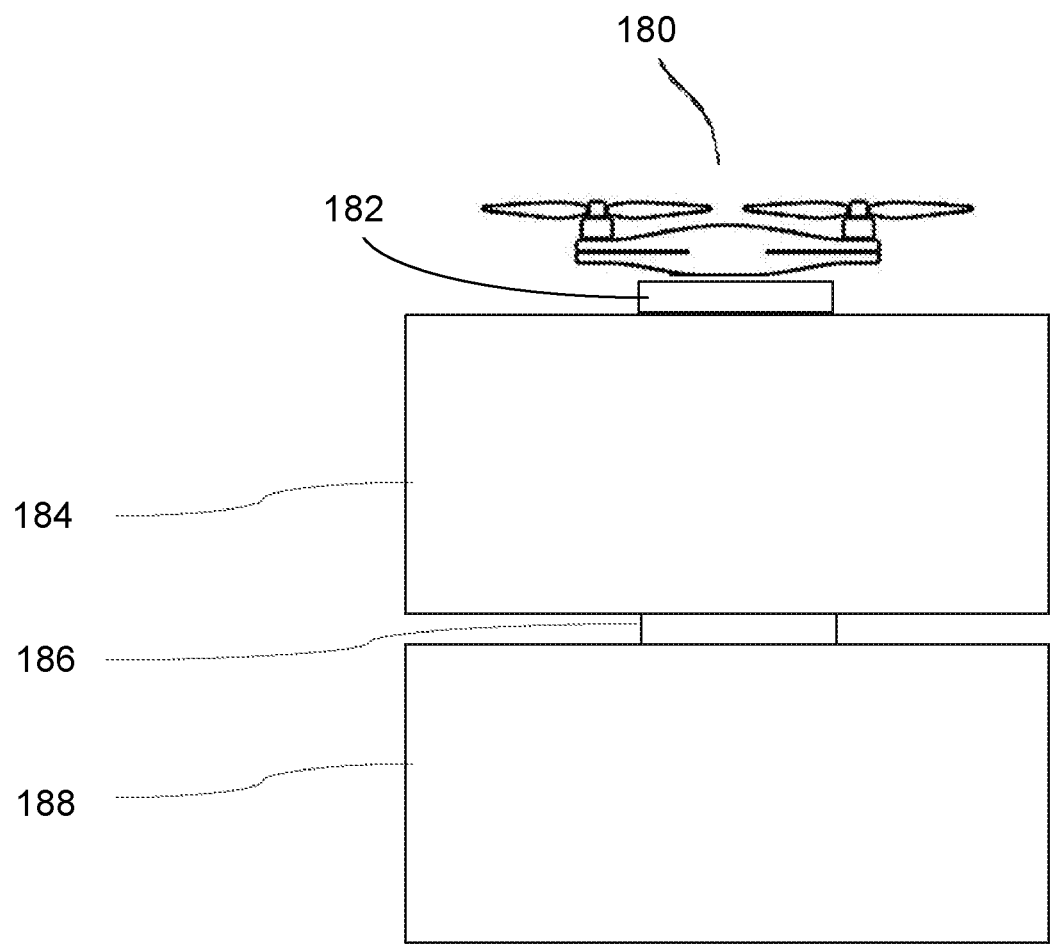
FIG. 17 is a simplified diagram of a robot configured to couple to a first extension module, which is configured to couple to a second extension module.

FIG. 17 shows another configuration, where the robot 180 is configured to carry two extension modules. In this example, an upper attachment mechanism 182 selectively couples a first extension module 184 to the robot 180. A lower attachment mechanism 186 selectively couples a second extension module 188 to the first extension module 184, thereby indirectly coupling the second extension module to the robot 180. As one skilled in the art appreciates, the upper attachment mechanism 182 and the lower attachment mechanism 186 may be similar to attachment mechanism 104 previously described with reference to FIG. 7.

As one skilled in the art appreciates, the upper attachment mechanism 178 and lower attachment mechanism may be independently operated. In some examples, the first extension module 184 may carry the lower attachment mechanism 186. In some examples, the second extension module 188 may carry the lower attachment mechanism 186. In some examples, the first extension module 184 may be coupled to the robot 180, while the second extension module 188 may be selectively coupled to or de-coupled from the first extension module 184. Further, a control system needs to synchronize the coupling and de-coupling of robot 180 to the first extension module 184 and the second extension module 188. For example, the synchronization may be accomplished by exchanging a plurality of control and status messages between the control system, robot 180, first extension module 184 and second extension module 188.

Figure 18:
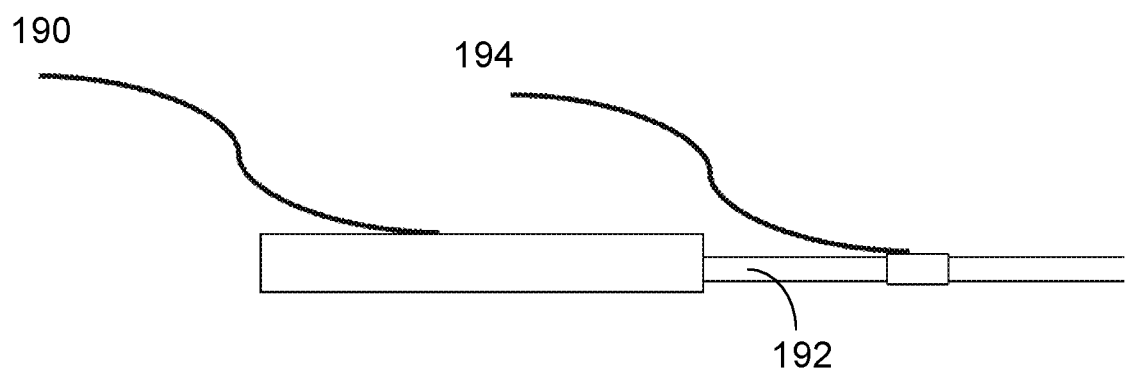
FIG. 18 is a simplified diagram of a holder movably attached to an extension arm.

FIG. 18 shows a holder 190 movably attached to an extension arm 192. In some examples, holder 190 may be part of the system 40 previously described, for example, with reference to FIG. 5. A movable mechanism 194 selectively moves the extension arm 192 to different positions. In one example, the movable mechanism 194 may arcuately rotate the extension arm 192, so that the holder 190 moves along an arc of a circle. In one example, the movable mechanism 194 may radially extend or contract the extension arm 192 so that the holder 190 moves along a radius of a circle. Movable mechanism 194 may include one or more motors to selectively move the extension arm 192 to a desired position. By selectively moving the extension arm 192, the holder 190 is selectively positioned so as to deliver an extension module to a robot. This will now be described with reference to FIGS. 18A and 18B.

Figure 18A:
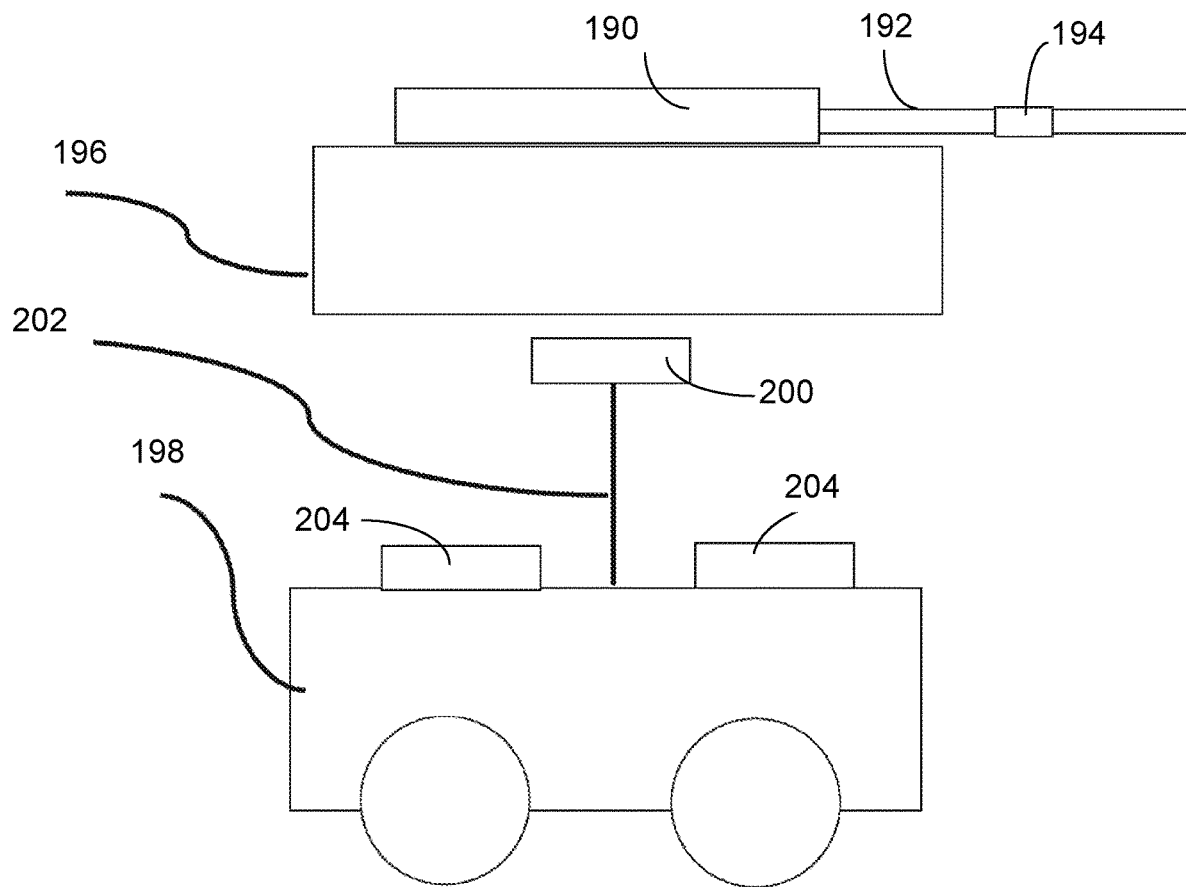
FIG. 18A is a simplified diagram of a robot with a movable attachment mechanism.

Now, referring to FIG. 18A, holder 190 with extension arm 192 and movable mechanism 194 is shown. The holder 190 has an attachment mechanism (not shown) that selectively attaches an extension module 196 to the holder 190. The attachment mechanism may be similar to attachment mechanism previously described with reference to FIG. 7. A robot 198 with a movable attachment mechanism 200 is provided. The movable attachment mechanism 200 is configured to be movable between an elevated position and a retracted position by an elevator arm 202. For example, the robot 198 may have motors or other devices to selectively move the elevator arm 202 from the retracted position, when the movable attachment mechanism 200 is substantially close to the robot 198 to the elevated position, when the movable attachment mechanism 200 is away from the robot 198. Robot 198 in one example may be a UGV.

The holder 190 is selectively positioned so that the extension module 196 is positioned to be properly rested on the movable attachment mechanism 200. In one example, the movable attachment mechanism 200 may also have another attachment mechanism (not shown) to selectively attach the extension module 196 to the movable attachment mechanism 200. When the movable attachment mechanism 200 attaches to the extension module 196, the holder 190 selectively releases the extension module 196 so that the extension module 196 may be moved to its retracted position by selectively operating the elevator arm 202. As one skilled in the art appreciates, the holder 190 assists in selectively positioning the extension module 196 to be picked up by the movable attachment mechanism 200 and properly positioned on the robot 198. In some examples, the robot 198 may have one or more attachment mechanism 204 that selectively attaches an extension module 196 to the robot 198.

Figure 18B:
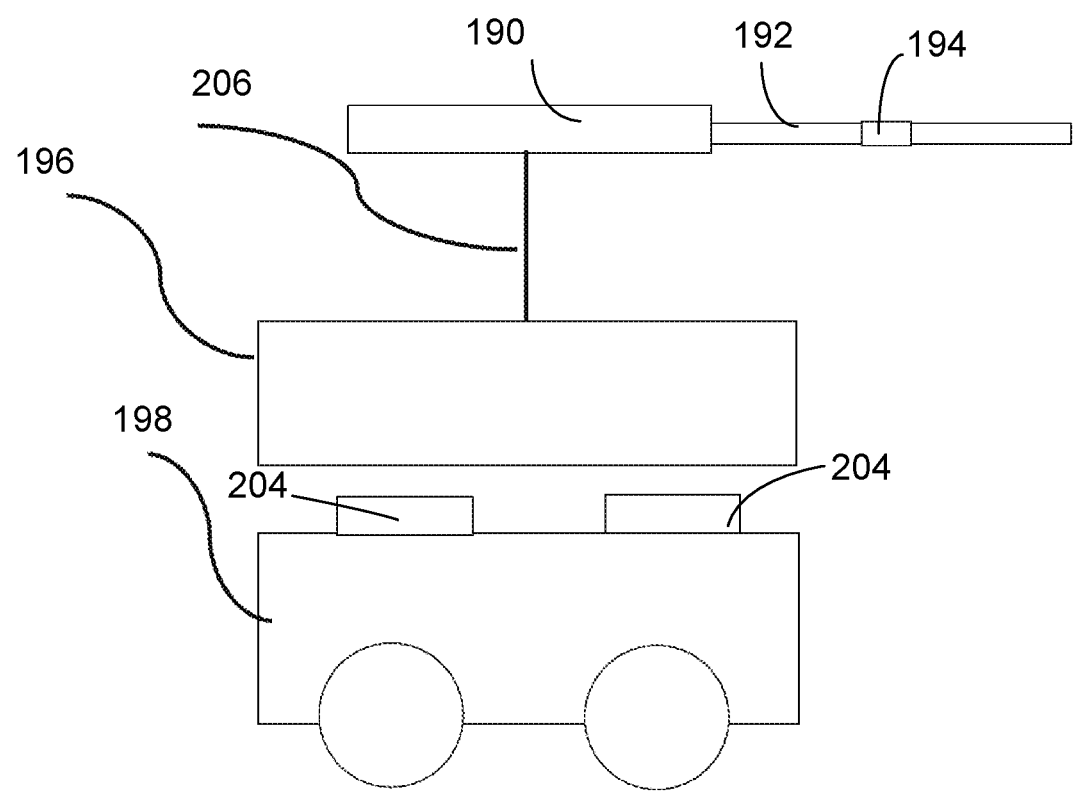
FIG. 18B is a simplified diagram of a holder with a hoist.

Now, referring to FIG. 18B, another example configuration to deliver extension module 198 from the holder 190 to the robot 198 is described. In this example, the holder 190 includes a hoist 206 that can be selectively extended to lower the extension module 196 to be operatively positioned over the robot 198. Once the extension module 196 is operatively positioned over the robot 198, the hoist 206 is released from the extension module 196 and retracted away from the extension module 196. As one skilled in the art appreciates, the hoist 206 may be provided with an attachment mechanism (not shown) that selectively attaches and detached the hoist 206 to the extension module 196. The attachment mechanism may be similar to attachment mechanisms previously described with reference to FIG. 7.

Figure 19A:
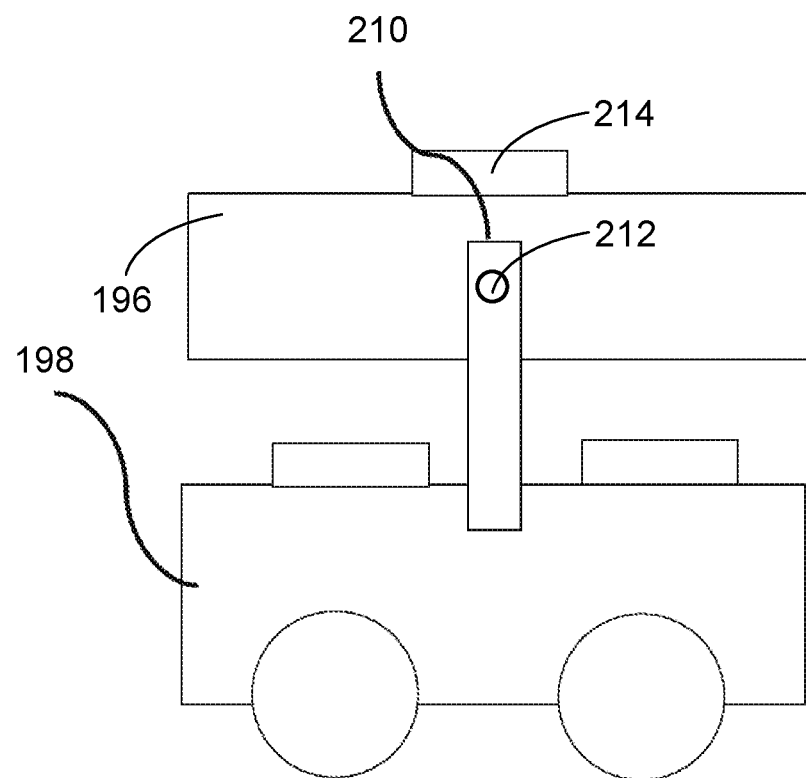
FIG. 19A is a simplified diagram of a robot with a mechanism to rotate an extension module.
Figure 19B:
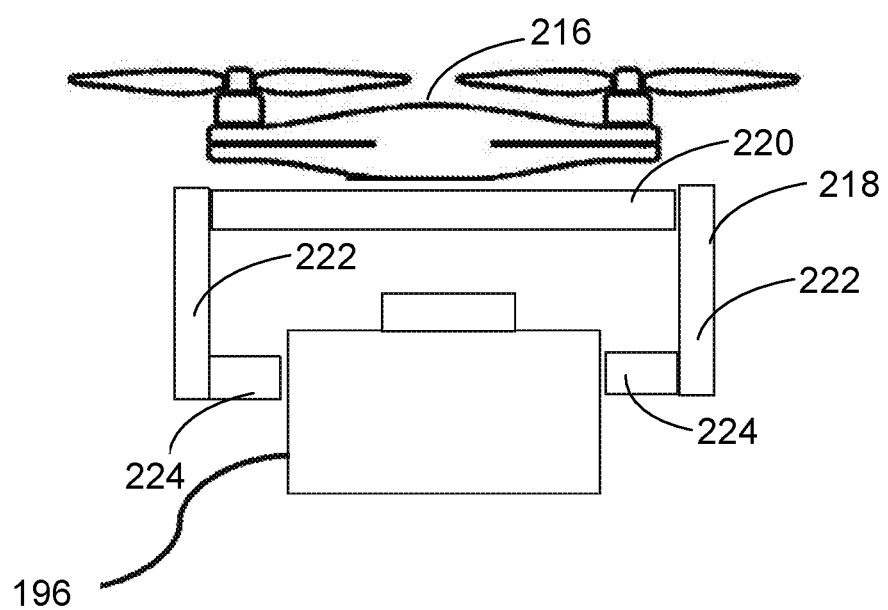
FIG. 19B is a simplified diagram of a flying robot with a mechanism to rotate an extension module.

In some examples, the extension module may have to be rotated (for example, relative to a horizontal axis) to be properly positioned to couple to a robot. FIGS. 19A and 19B show two example configurations to rotate the extension module relative to the robot.

Referring to FIG. 19A, robot 198 includes an extender arm 210, with a rotating mechanism 212 disposed at a distal end of the extender arm 210. The rotating mechanism 212 is configured to couple to the extension module 196 and rotate the extension module. In this example, the extension module 196 has an attachment mechanism 214 that is configured to attach to the robot 198, however, the attachment mechanism 214 in the position shown is disposed away from the robot 198. The rotating mechanism 212 is selectively rotated to rotate the extension module 196 so that the attachment mechanism 214 is brought proximate to the robot 198 and the attachment mechanism 214 is positioned in an operating position to couple the extension module 196 to the robot 198. In this example, the extension module 196 may be rotated in a clockwise or anticlockwise direction so as to properly position the attachment mechanism 214 in the operating position relative to the robot 198. As one skilled in the art appreciates, the extender arm 210 has to be of sufficient length to permit the rotation of the extension module 196 to a proper position, without hitting the robot 198.

Now, referring to FIG. 19B, another example configuration to rotate the extension module 196 is described. In this example, a flying robot 216 is provided with a frame 218. The frame 218 may include a horizontal portion 220 and two vertical portions 222 extending perpendicular to the horizontal portion 220. The vertical portions 222 at their ends have a rotator mechanism 224. The rotor mechanism 224 is configured to couple to the extension module 196, for example, on their sides and selectively rotate the extension module 196 along an axis passing through the sides of the extension module 196. When the extension module 196 is selectively rotated, the position of the attachment mechanism 214 is selectively changed to a desired location.

For example, when the attachment mechanism 214 is rotated by 180 degrees, the attachment mechanism 214 will be positioned below the extension module 196 and a robot (not shown) can be positioned below the attachment mechanism 214 so as to operatively couple the extension module 196 to the robot (not shown). As one skilled in the art appreciates, a length of the horizontal portion 220 is so chosen to permit the rotation of the extension module 196, with sufficient clearance between the extension module 196 and the horizontal portion 220.

Figure 20:
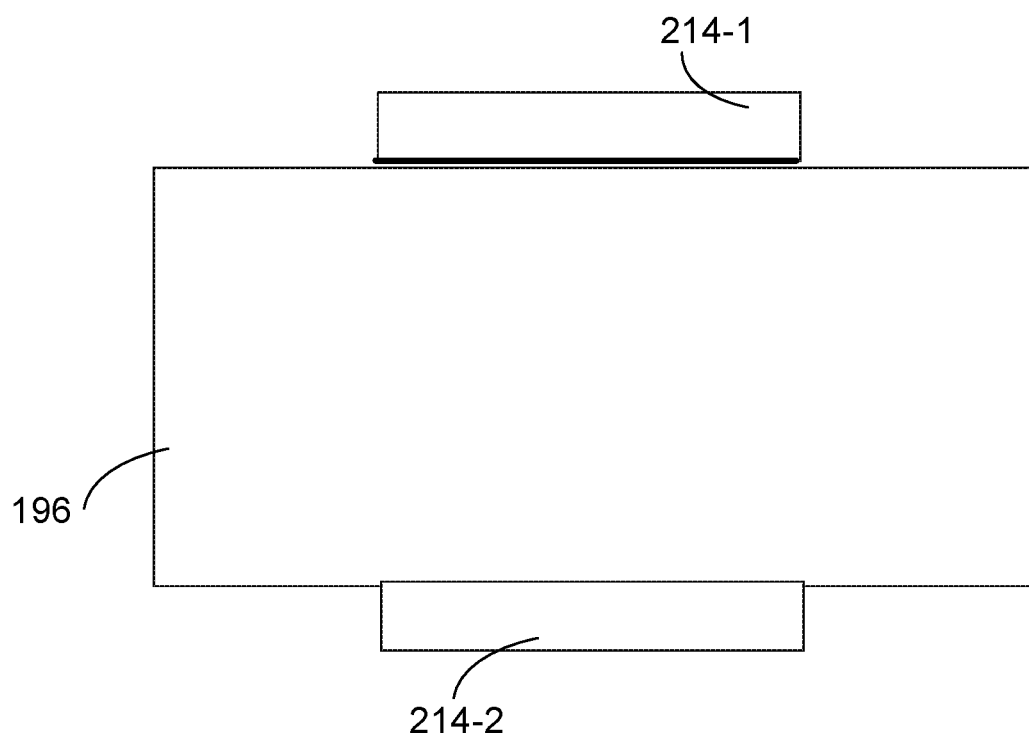
FIG. 20 is a simplified diagram of an extension module with a plurality of attachment mechanisms.

In some example, it may be preferable to provide a plurality of attachment mechanisms in an extension module. FIG. 20 shows an example extension module 196 with a plurality of attachment mechanisms 214-1 and 214-2. The extension module has a plurality of surfaces. In this example, the attachment mechanisms are disposed on opposite surfaces of the extension module 196. As one skilled in the art appreciates, attachment mechanism 214-1 and attachment mechanism 214-2 may be independently operated from each other. Although only two attachment mechanisms are shown, as one skilled in the art appreciates, additional attachment mechanisms may be disposed on other surfaces of the extension module 196.

Figure 21:
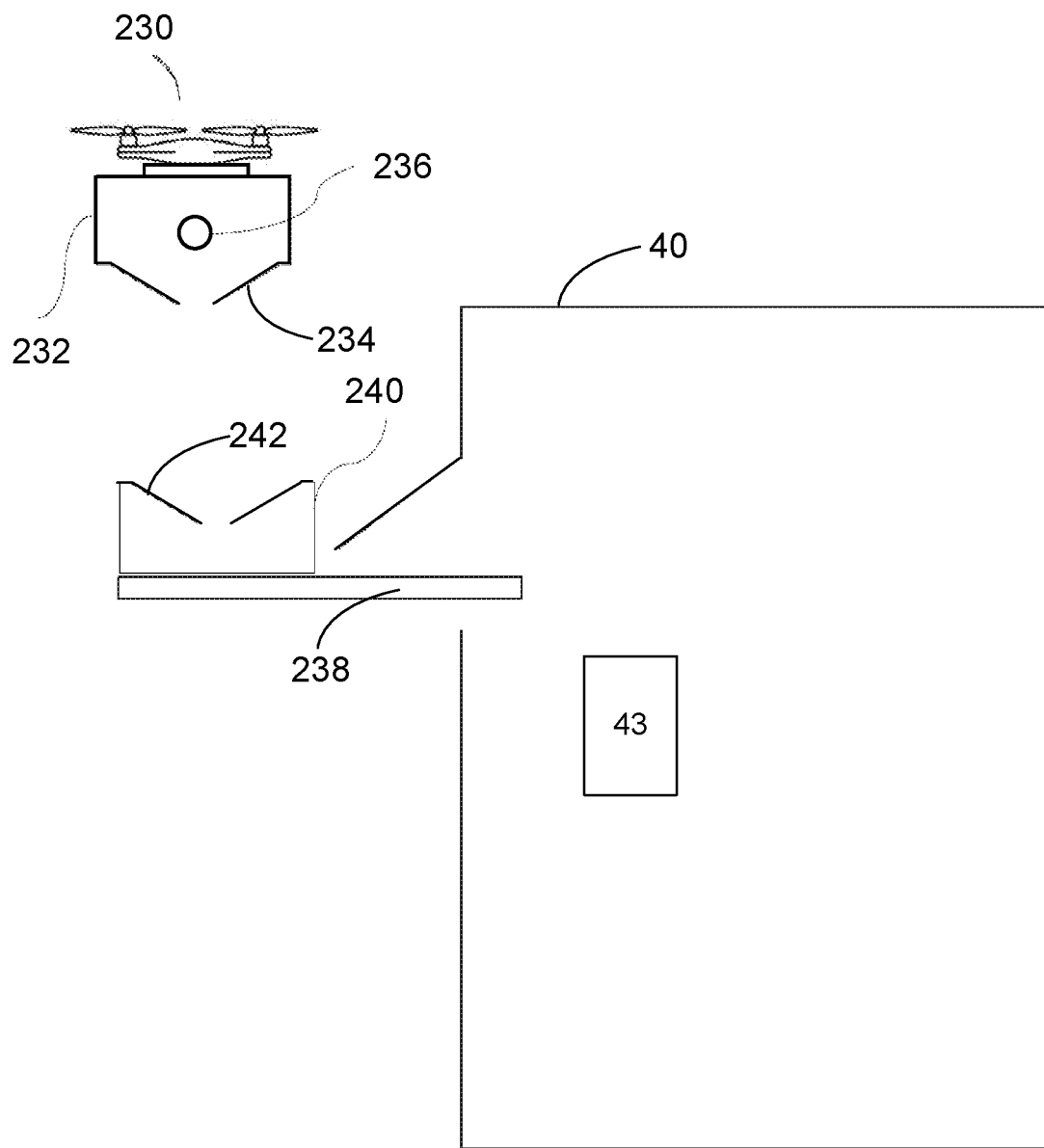
FIG. 21 is a simplified diagram of a station configured to receive an item and process the item within the station.

Previously, with reference to FIG. 5, an example station 40 was described with a preparing station 43. Now, referring to FIG. 21, an example system is described, which is configured to receive an item and process the item in the preparing station 43. Referring to FIG. 21, a robot 230 with an extension module 232 is shown. The extension module 232 has a release door 234 which may be selectively opened or closed. In this example, an item 236 to be transported is disposed within the extension module 232. The station 40 with preparing station 43 is shown. In this example, a movable platform 238 is configured to selectively move a receiver module 240 in and out of the station 40. The receiver module 240 includes a receiver door 242 that may be selectively opened or closed.

The robot 230 is selectively positioned above the receiver module 240 so that when the release door 234 is opened, the item 236 drops into the receiver module 240, when the receiver door 242 is in an open position. Once the item 236 is dropped into the receiver module 240, the receiver module 240 is selectively moved into the station 40. The item 236 is selectively retrieved from the receiver module 240 and further processed. For example, the item 236 may be processed in the preparing station 43.

Figure 22:
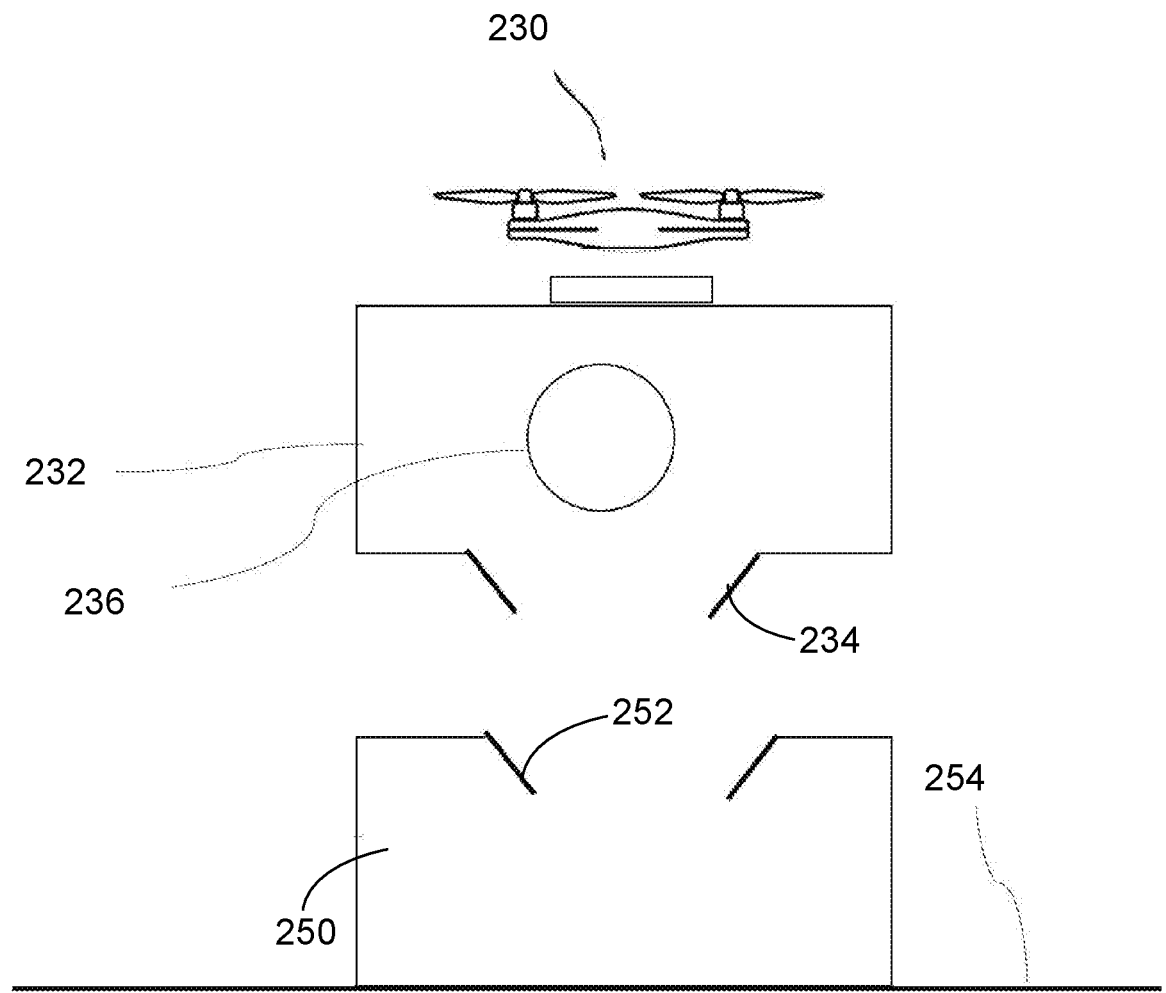
FIG. 22 is a simplified diagram of a robot configured to deliver an item to an extension module.

FIG. 22 shows yet another example implementation where the robot and extension module described with reference to FIG. 21 delivers an item to another extension module. In this example, a robot 230 with an extension module 232 is shown. The extension module 232 has a release door 234 which may be selectively opened or closed. In this example, an item 236 to be transported is disposed within the extension module 232. Another extension module 250 is shown, with a receiver door 252, which can be selectively opened or closed. In this example, the extension module 250 is disposed on a staging surface 254.

The robot 230 is selectively positioned above another extension module 250 so that when the release door 234 is opened, the item 236 drops into the another extension module 250, when the receiver door 252 is in an open position. Once the item 236 is dropped into the another extension module 250, the receiver door 252 may be selectively closed. The another extension module 250 is now ready to be picked up by another robot for further transporting the item to a different location, for example, as described with reference to FIG. 23.

Figure 23:
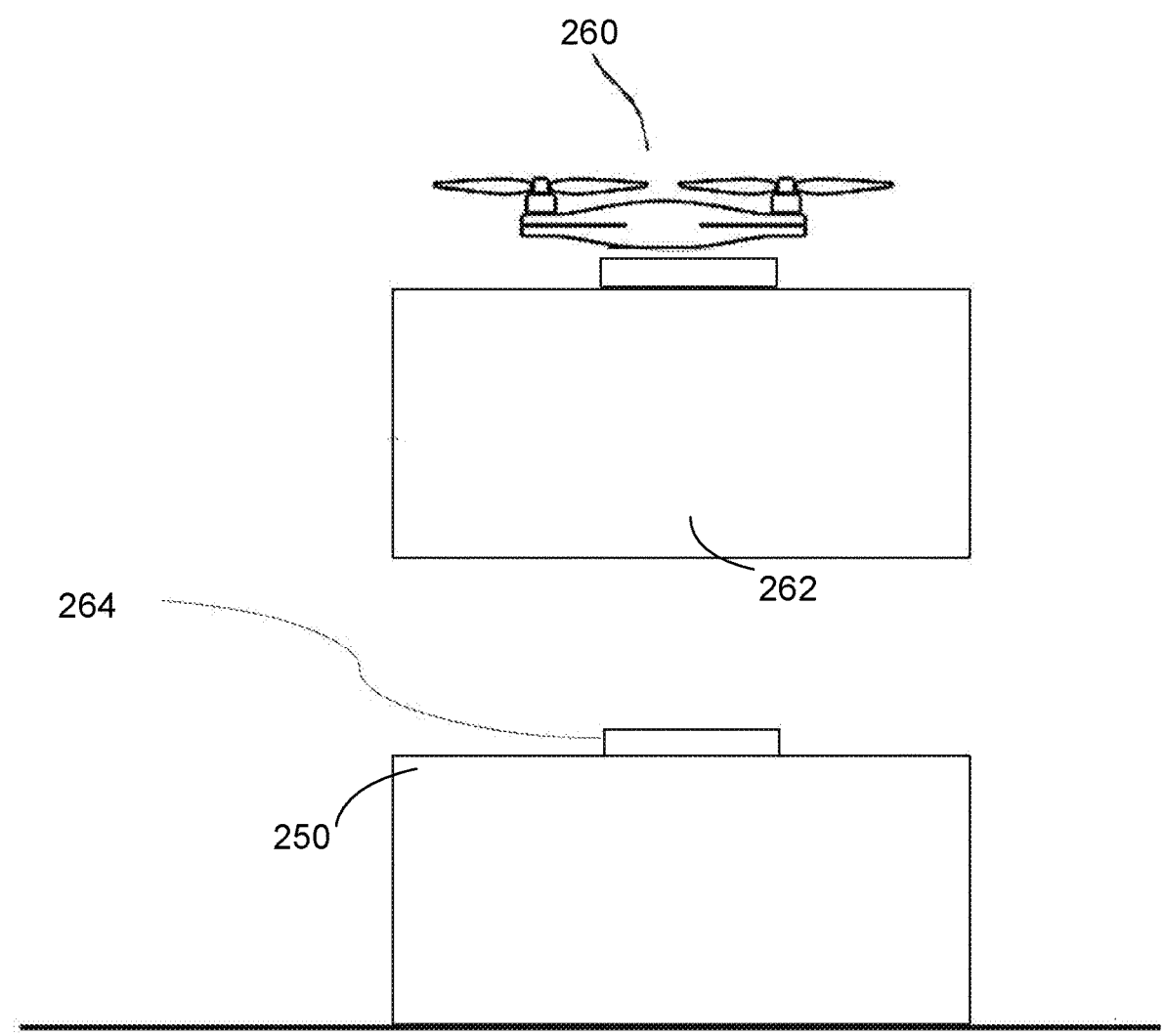
FIG. 23 is a simplified diagram of a robot with an extension module configured to attach to another extension module.

Referring to FIG. 23, another robot 260 is shown, with an attached extension module 262. The another extension module 250 which is disposed on the staging surface 254 also has an attachment mechanism 264. Robot 260 is positioned to be in an operative position with reference to the another extension module 250 so as to couple the another extension module 250 to the attached extension module 262, for example, using the attachment mechanism 264. As one skilled in the art appreciates, using the systems described with reference to FIGS. 22 and 23, a plurality of items may be selectively dropped into the another extension module and later picked up by another robot for transportation to a different location. In some examples, another robot 260 may be configured to directly couple to the another extension module 250, without the attached extension module 262. For example, the attachment mechanism 264 may be configured to couple to the robot 260.

Figure 24:
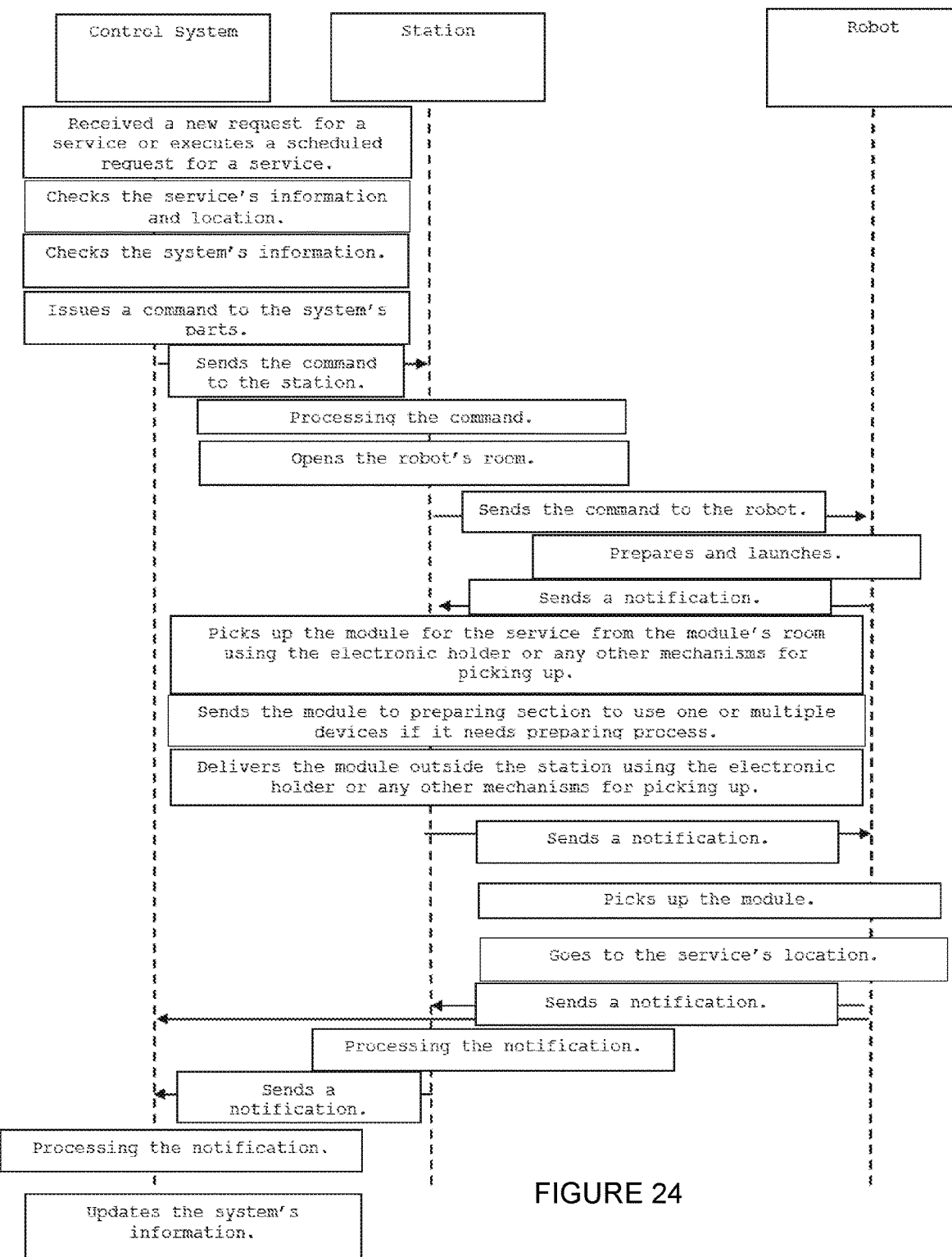
FIG. 24, FIG. 25, FIG. 26A, FIG. 26B, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, FIG. 49, FIG. 50, FIG. 51, FIG. 52, FIG. 53, FIG. 54, FIG. 55, FIG. 56, FIG. 57, FIG. 58, FIG. 59, and FIG. 60 are simplified flowcharts that illustrate tasks performed by a multi-purpose robotic system in accordance with various implementations.

FIGS. 24 through 60 shows flowcharts for performing various tasks within a multipurpose robotic system. FIG. 24 is a simplified flowchart for a system that receives a new request or executes a scheduled request.

Figure 25:
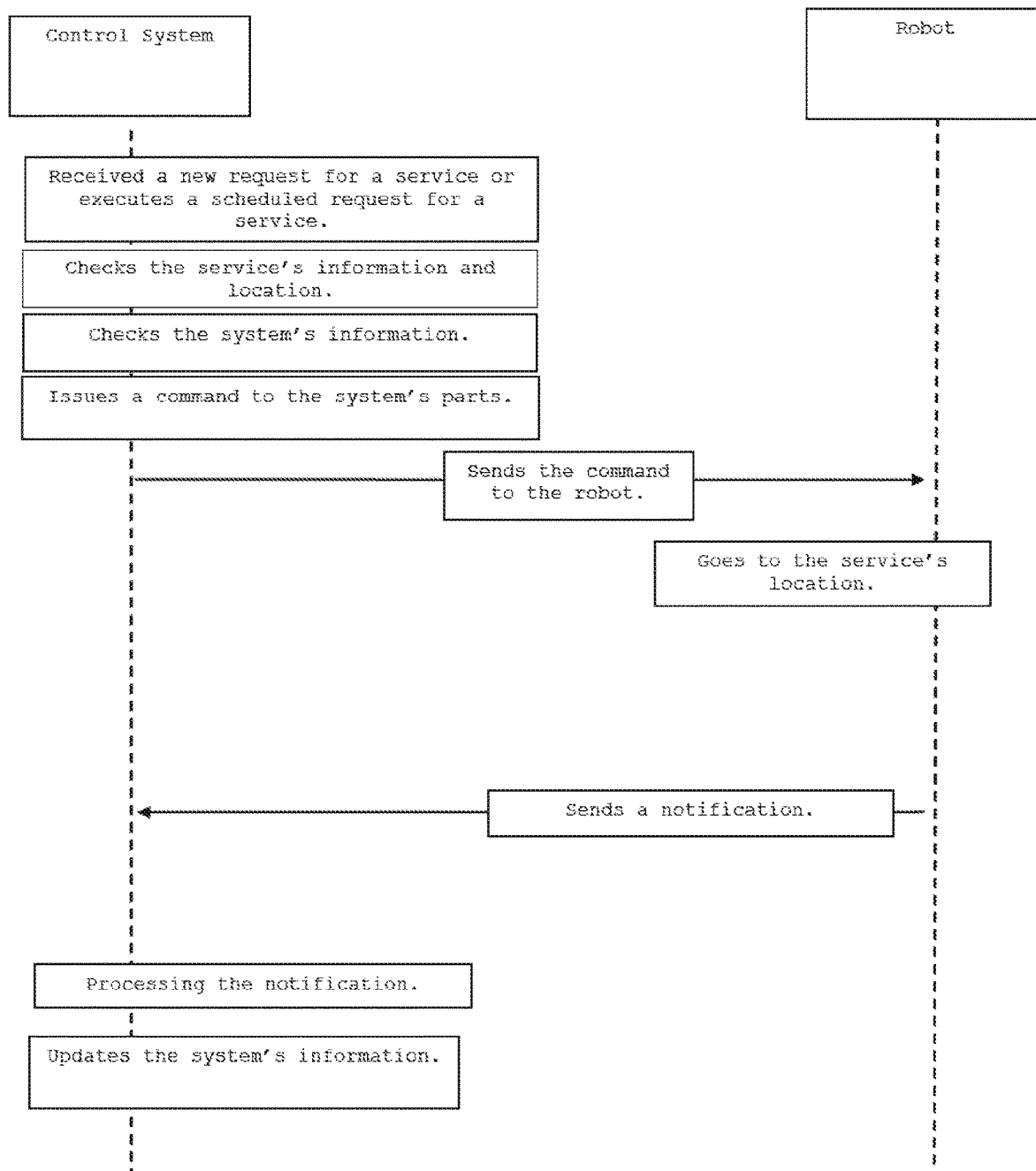
Figure 26A:
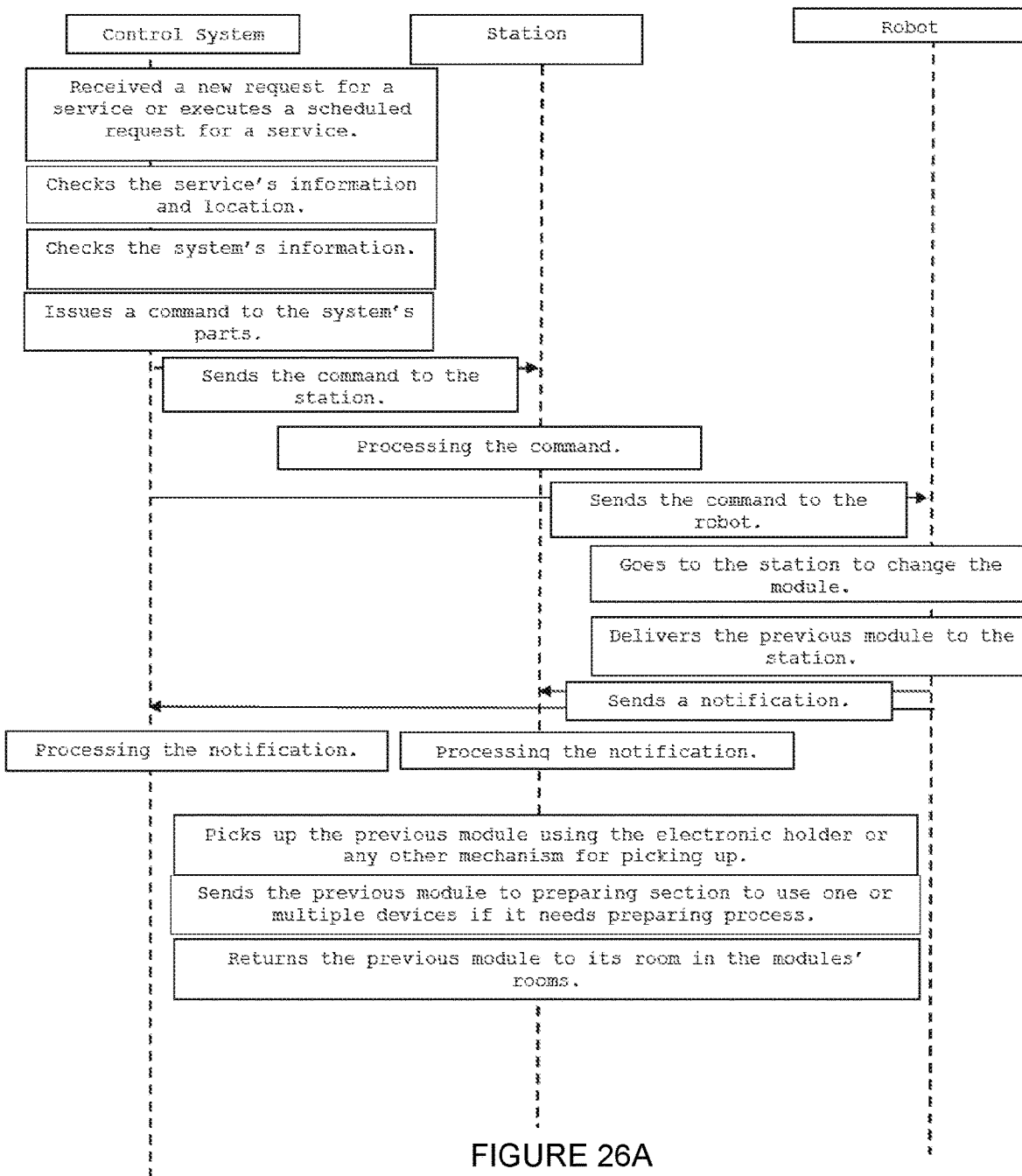
Figure 26B:
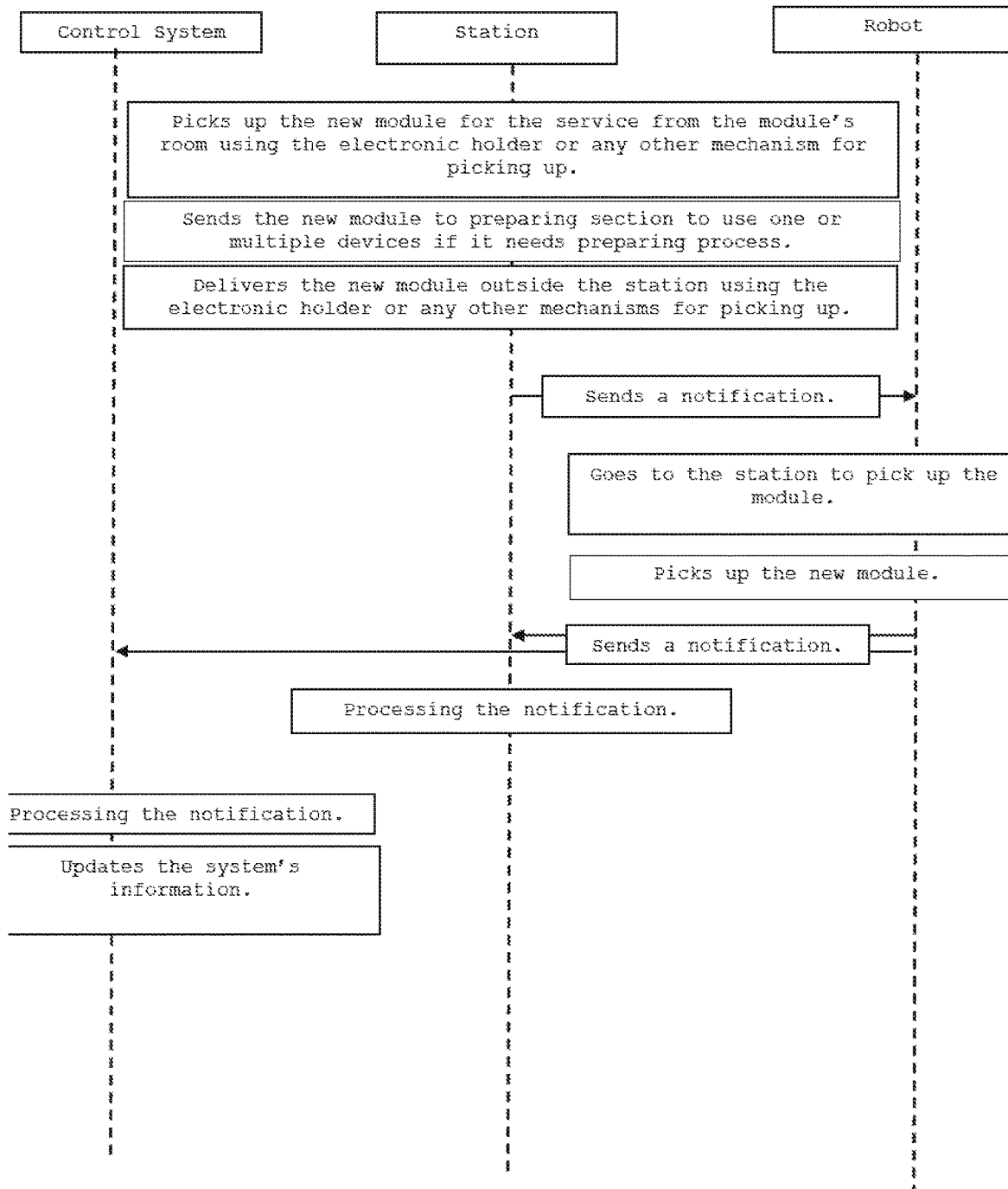

FIG. 25 is a simplified flowchart for a system that receives a request or executes a request and sends the request to a robot that is currently out of a station. FIG. 26A and FIG. 26B are a simplified flowchart for a system that changes a module for a robot.$$

Figure 27:
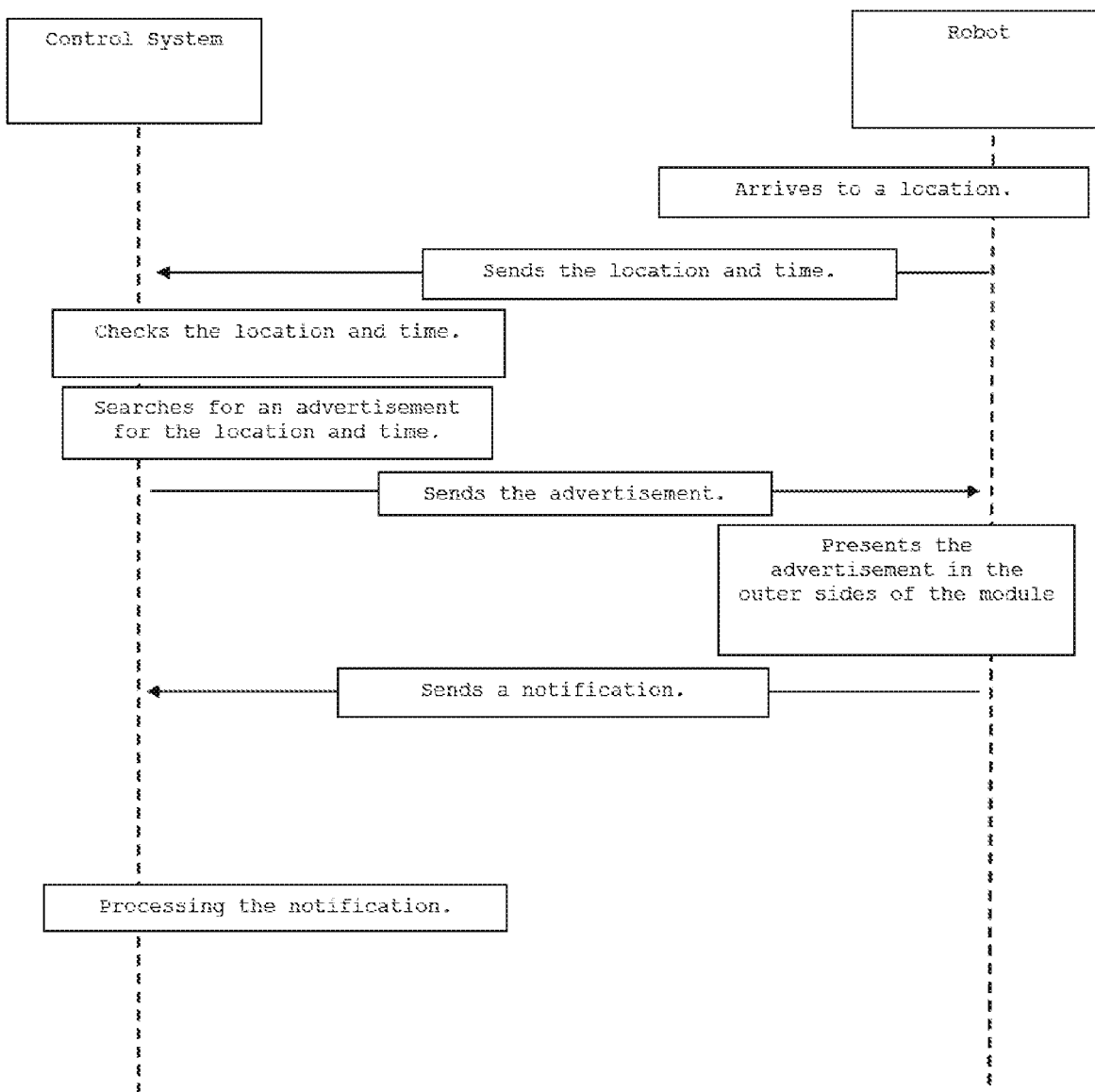

FIG. 27 is a simplified flowchart for a system that sends an advertisement to a module to present the advertisement on sides of the module.

Figure 28:
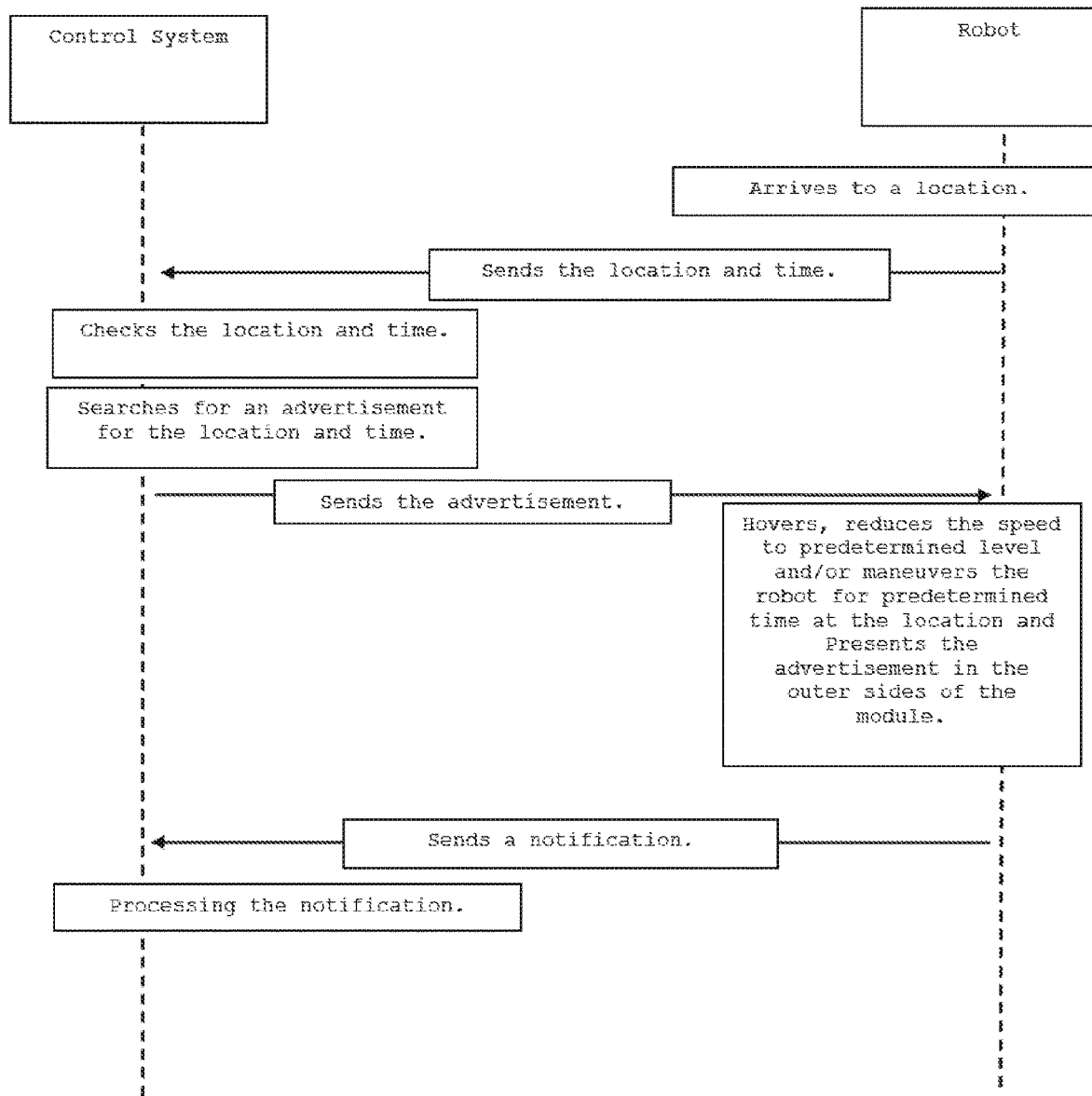

FIG. 28 is a simplified flowchart for a system that sends an advertisement to a module to present the advertisement on sides of the module. The robot can hover, reduce the speed to a predetermined level and/or maneuver for a predetermined time at a particular location.

Figure 29:
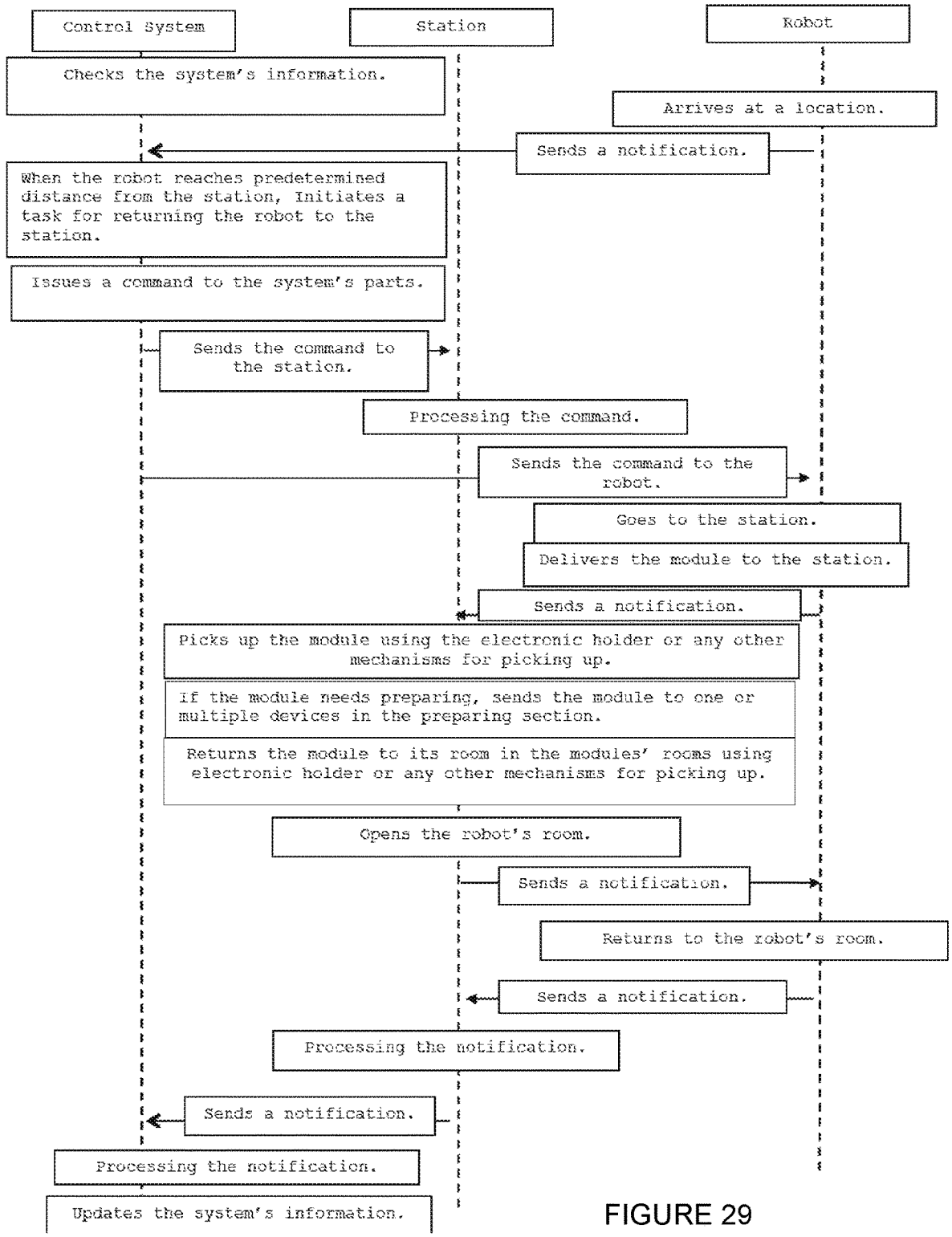

FIG. 29 is a simplified flowchart for a system that returns a module and a robot to a station.

Figure 30:
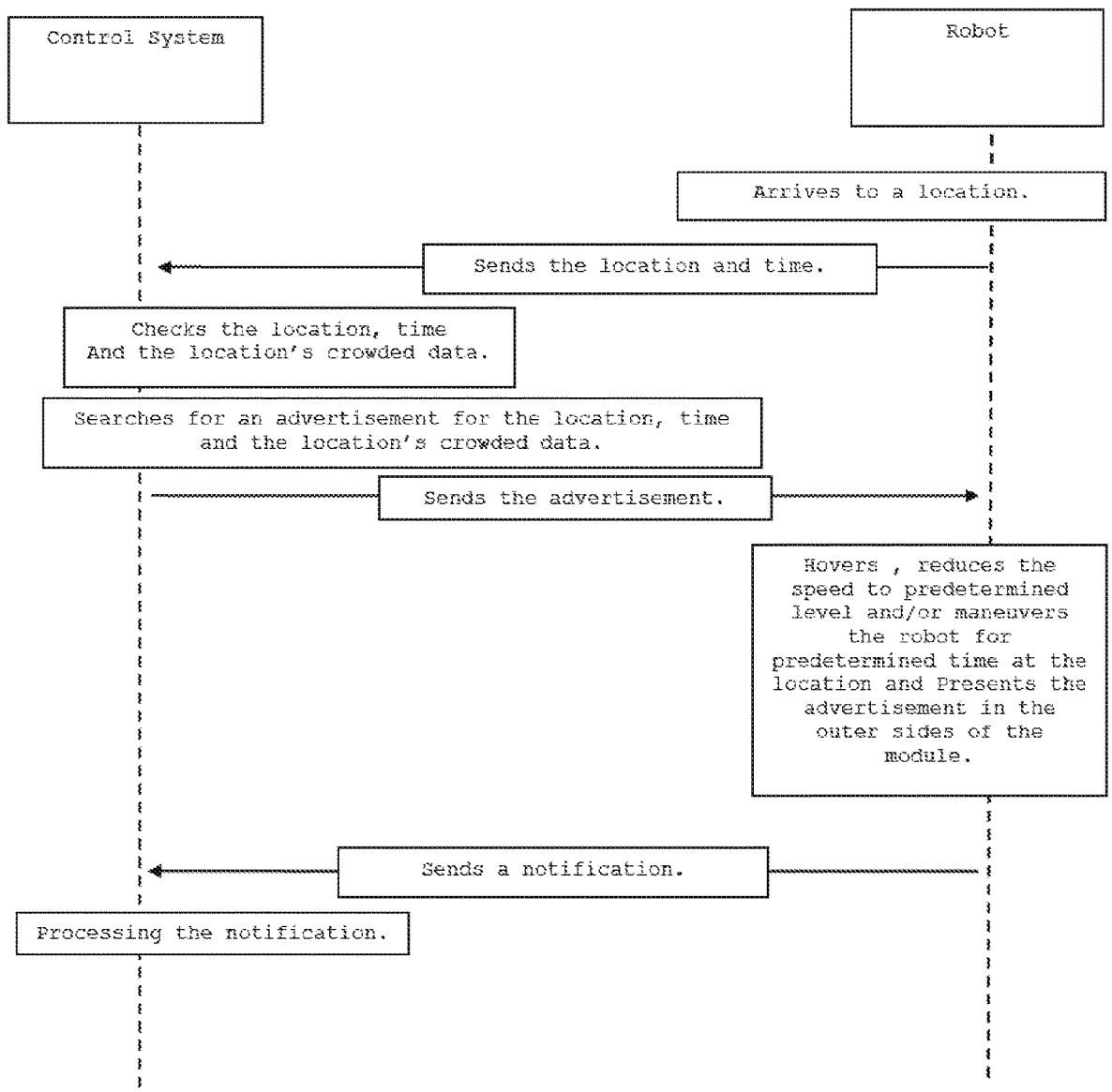

FIG. 30 is a simplified flowchart for a system that sends an advertisement to a module to present the advertisement in the outer sides of the module. The robot can hover, reduce the speed to a predetermined level and/or maneuver for a predetermined time at a particular location. The system searches for the advertisement using historical data about the crowdedness at the location.

Figure 31:
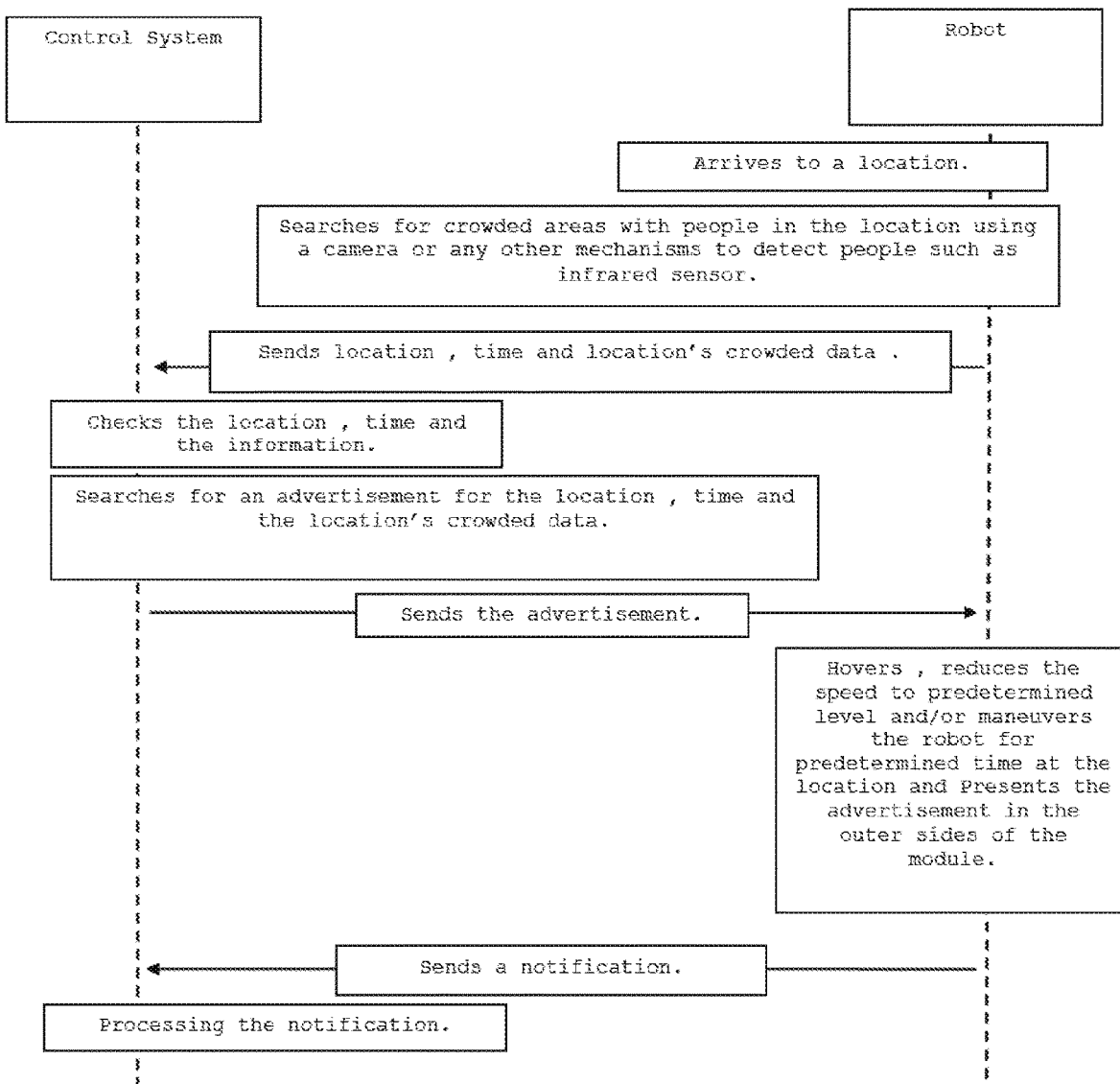

FIG. 31 is a simplified flowchart for a system that sends an advertisement to a module to present the advertisement on the sides of a module. The robot can hover, reduce the speed to a predetermined level and/or maneuver for a predetermined time at a crowded location after finding the crowded location using camera or any sensor to detect locations crowded with people.

Figure 32:
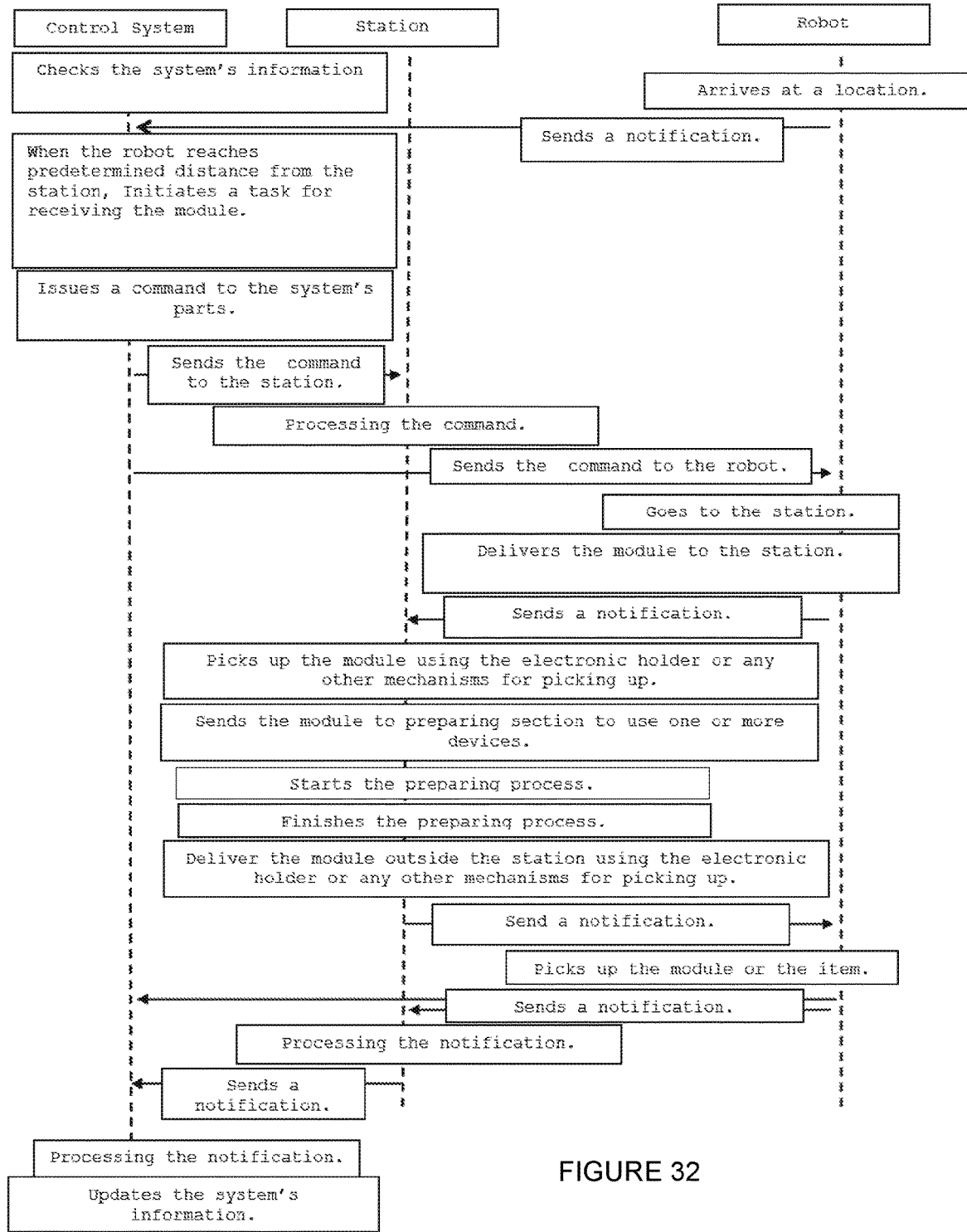

FIG. 32 is a simplified flowchart for a system that receives a module or an item carried by a robot. The received module or item is sent to the preparing station for preparation. After the module or item is prepared, it is delivered for pick up by a robot.

Figure 33:
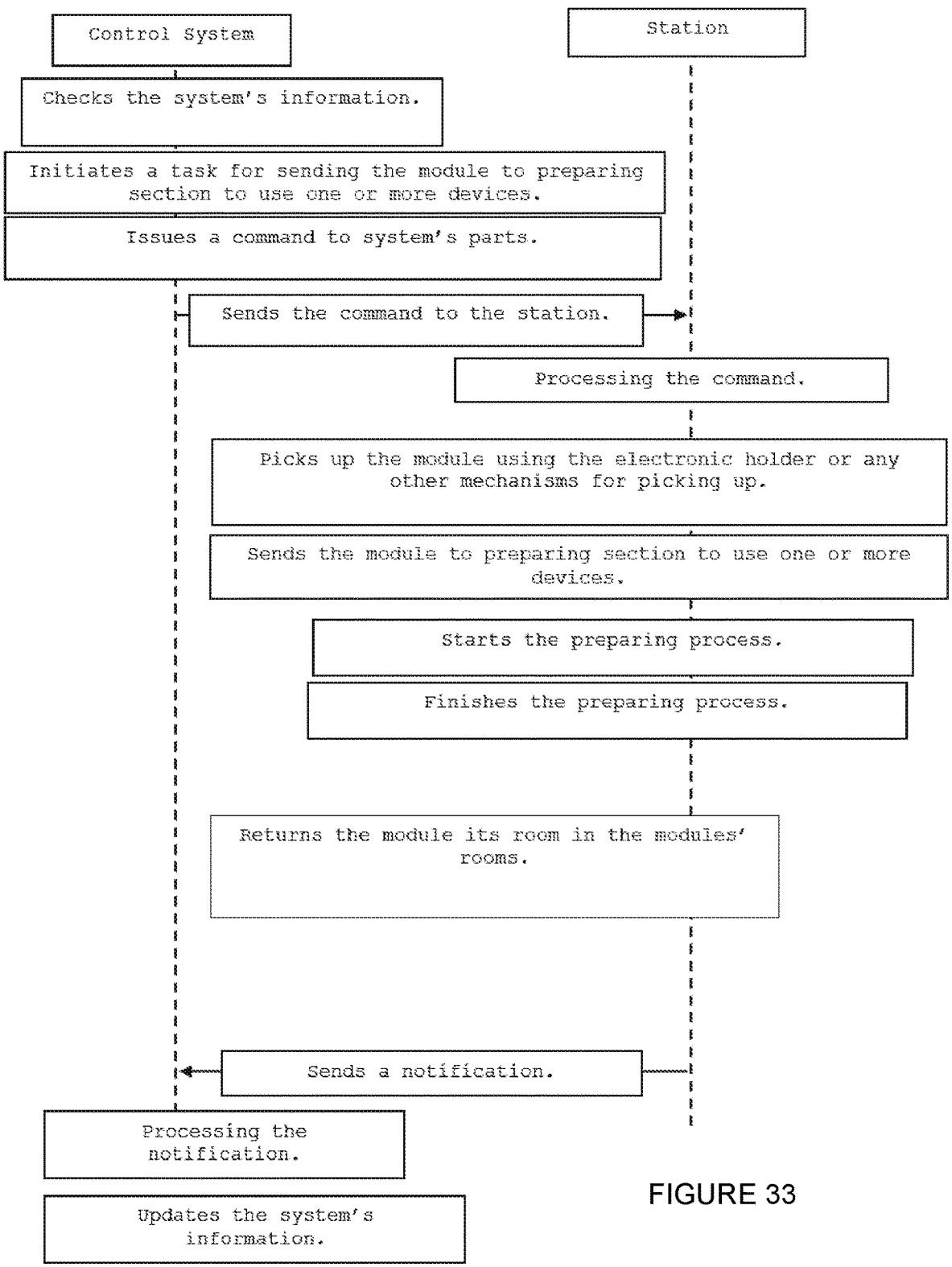

FIG. 33 is a simplified flowchart for a system that receives a module, sends the module to preparing station for preparation. After preparation, the module is returned to the modules room.

Figure 34:
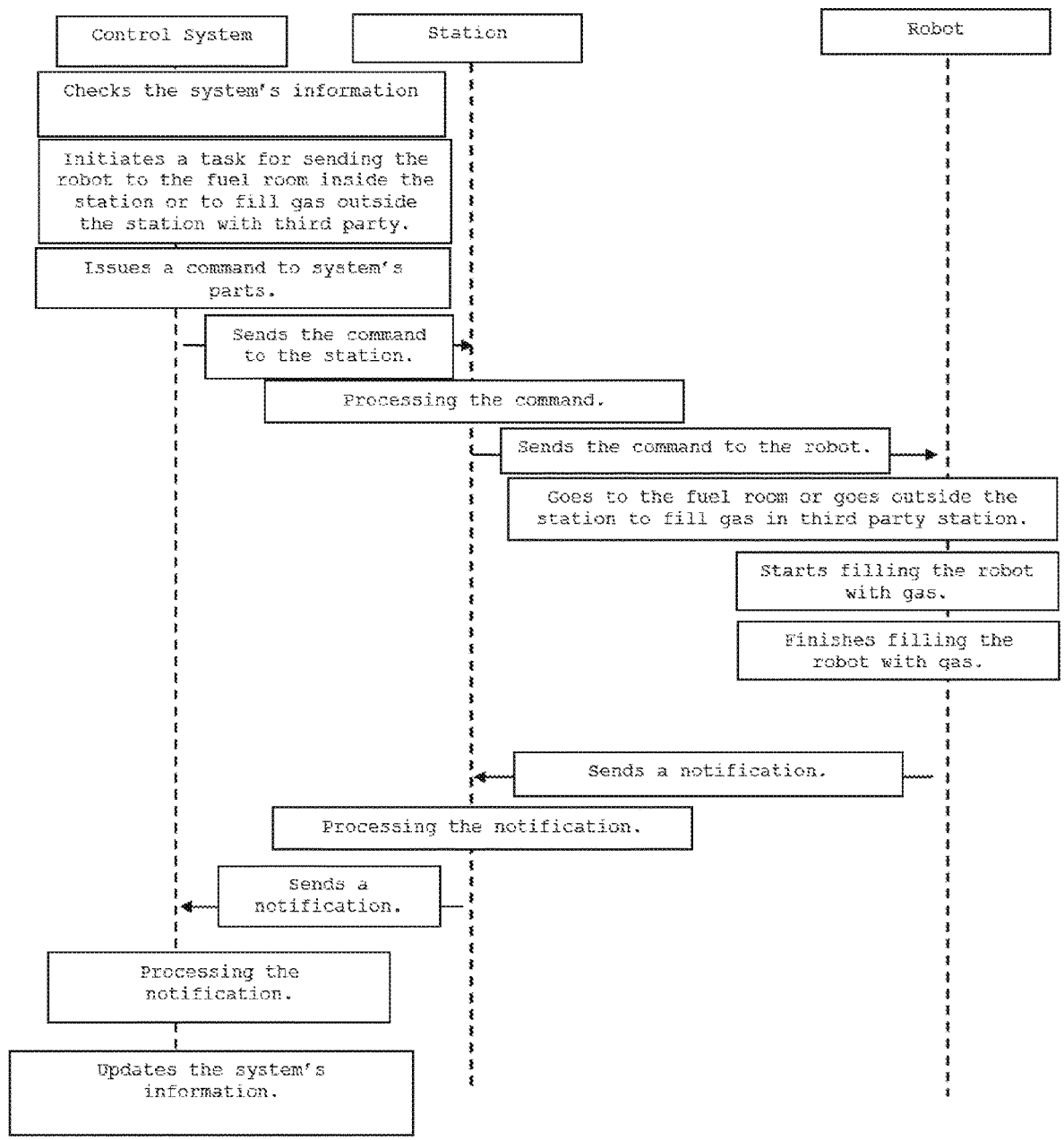

FIG. 34 is a simplified flowchart for a system that sends a robot to a fuel room or a third party fuel station to be filled with fuel.

Figure 35:
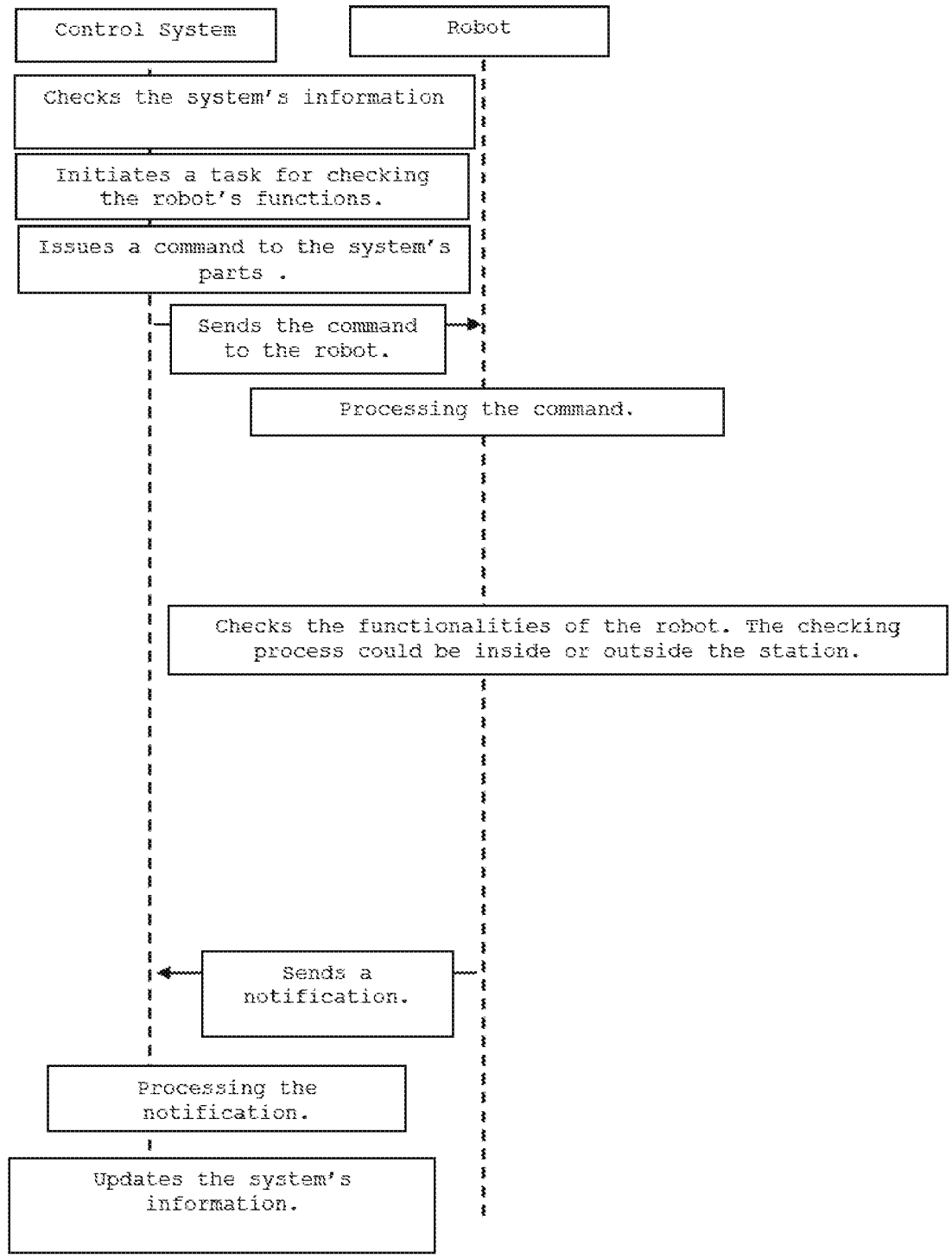

FIG. 35 is a simplified flowchart for a system that checks robot's functionality.

Figure 36:
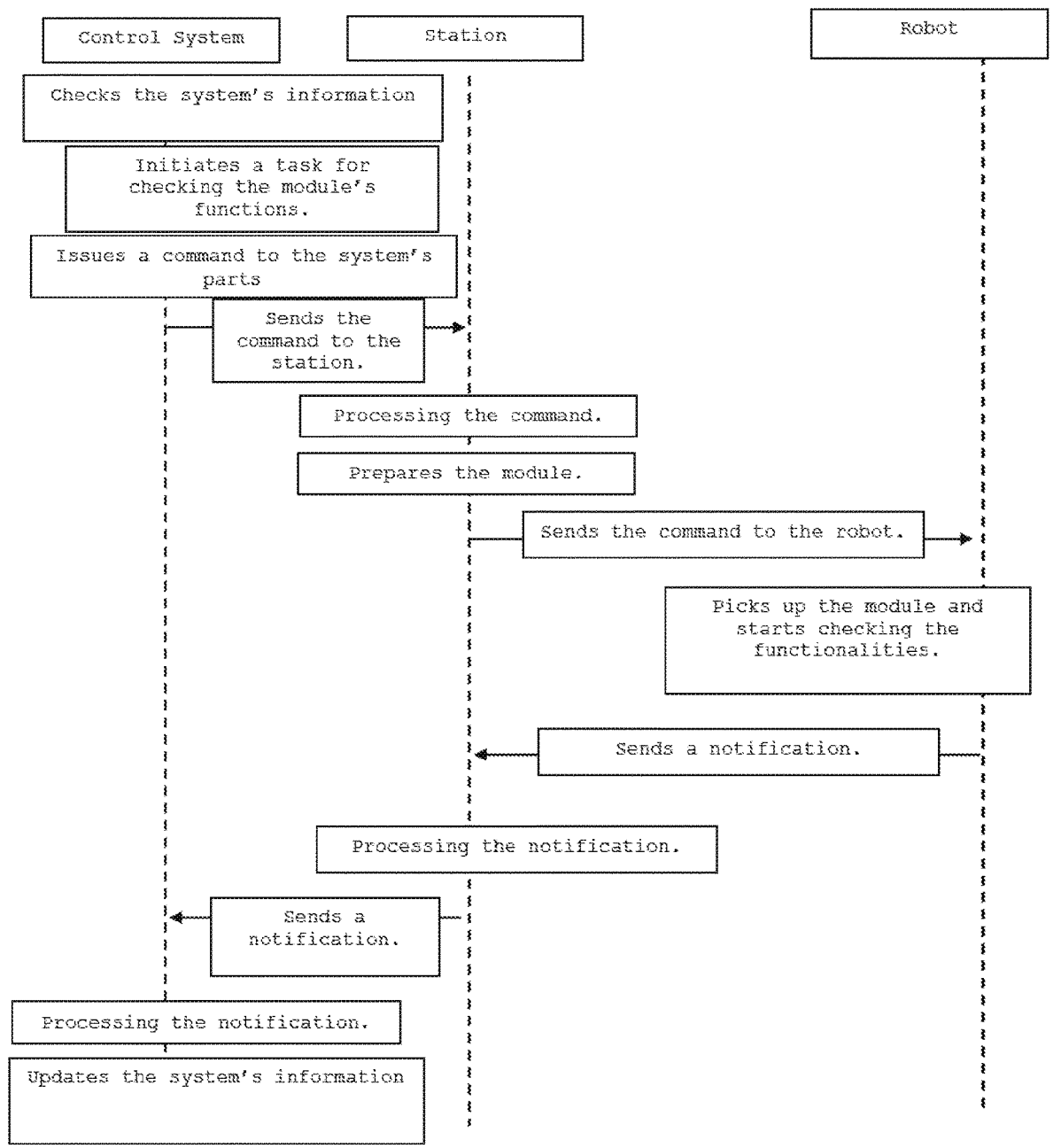

FIG. 36 is a simplified flowchart for a system that checks a module's functionality.

Figure 37:
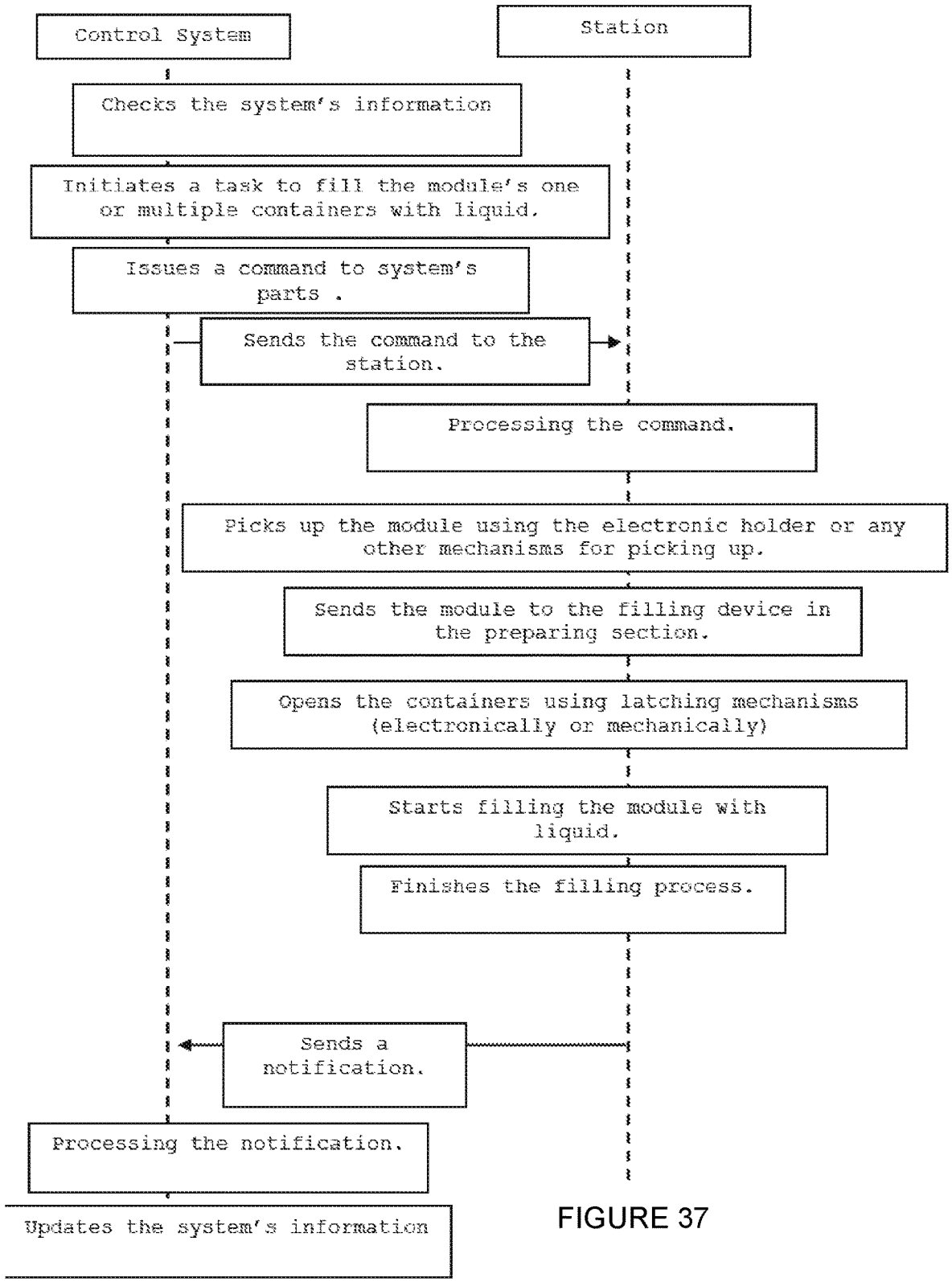

FIG. 37 is a simplified flowchart for a system that sends a module to be filled with liquid.

Figure 38:
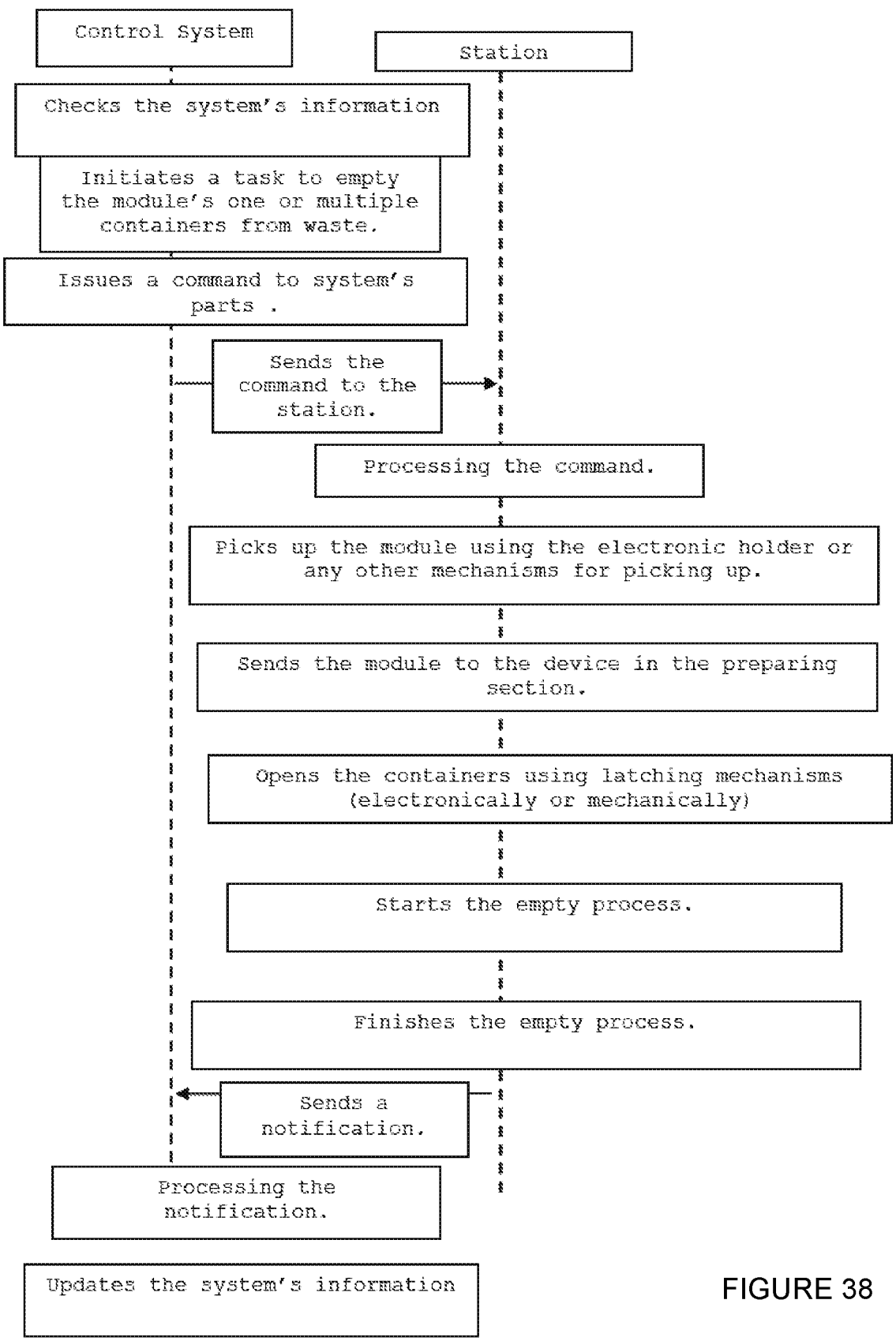
Figure 39:
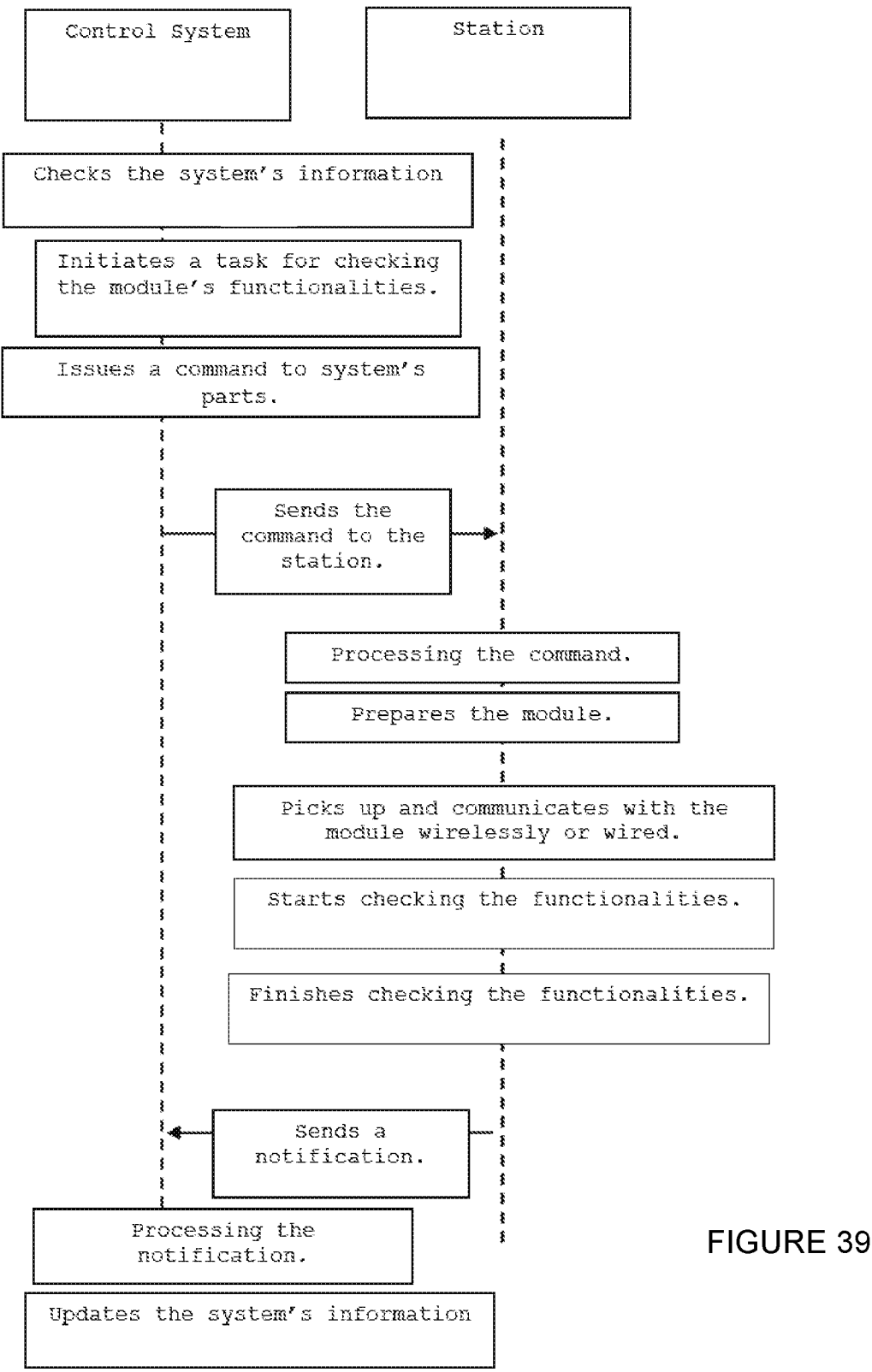

FIG. 38 is a simplified flowchart for a system that sends a module to be emptied of waste contained in the module FIG. 39 is a simplified flowchart for a system wherein the station communicates with and checks a module functionality. The module in this example is configured with a communication device that can communicate with other communication devices.

Figure 40:
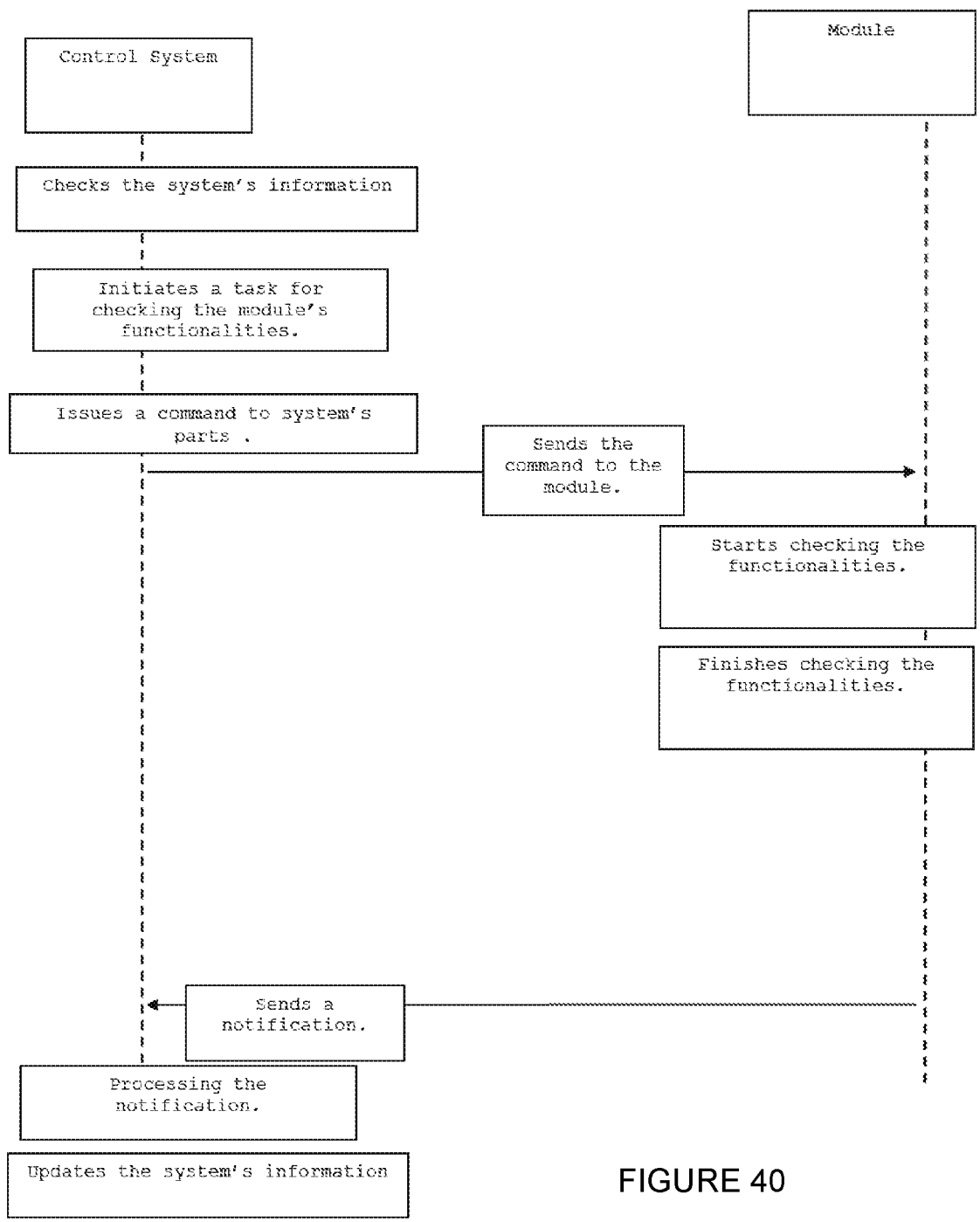

FIG. 40 is a simplified flowchart for a system wherein the control system communicates with and checks a module functionality. The module in this example is configured with a communication device that can communicate with other communication devices.

Figure 41:
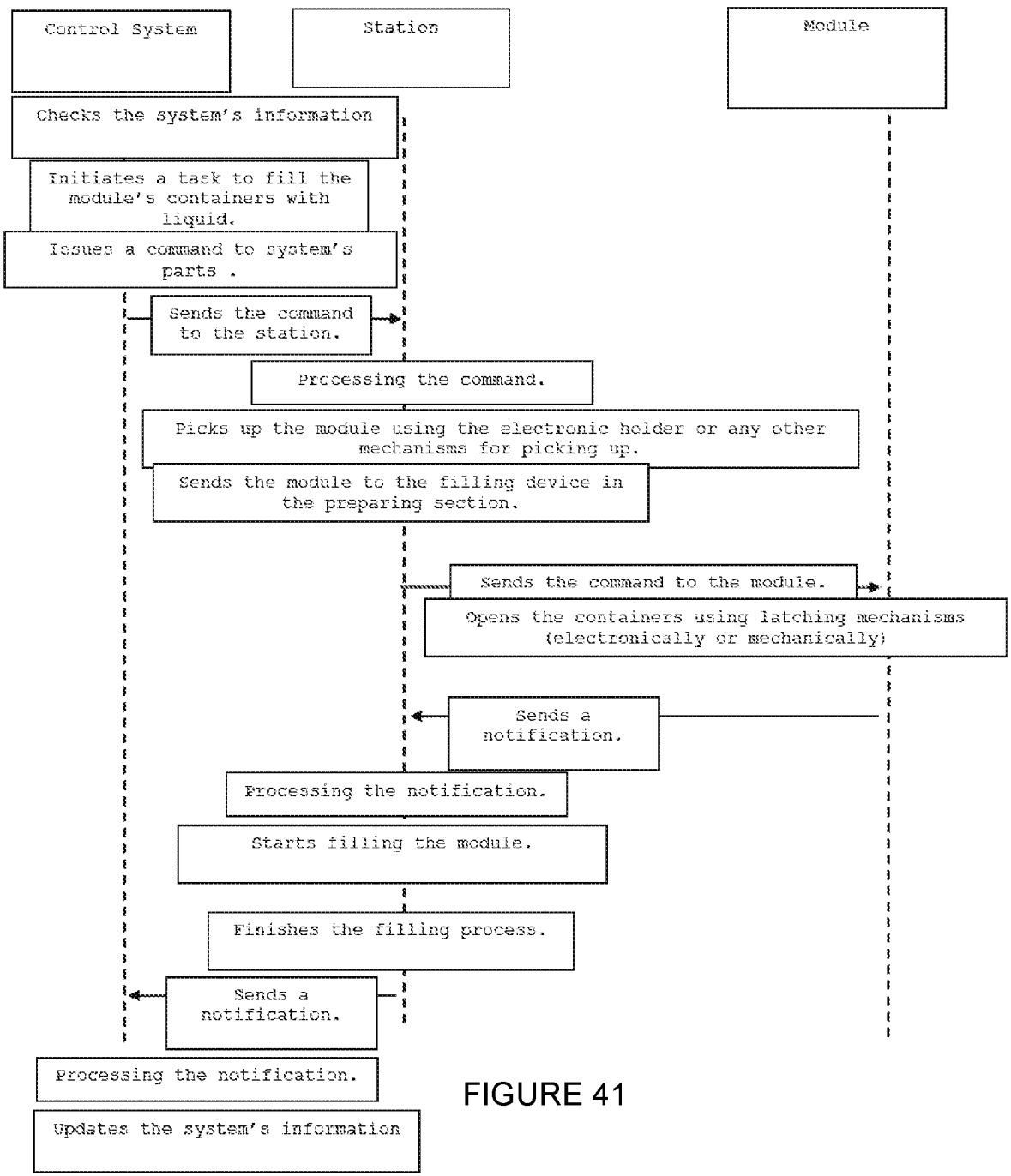

FIG. 41 is a simplified flowchart for a system that sends a module to be filled with liquid. The module in this example is configured with a communication device that can communicate with other communication devices.

Figure 42:
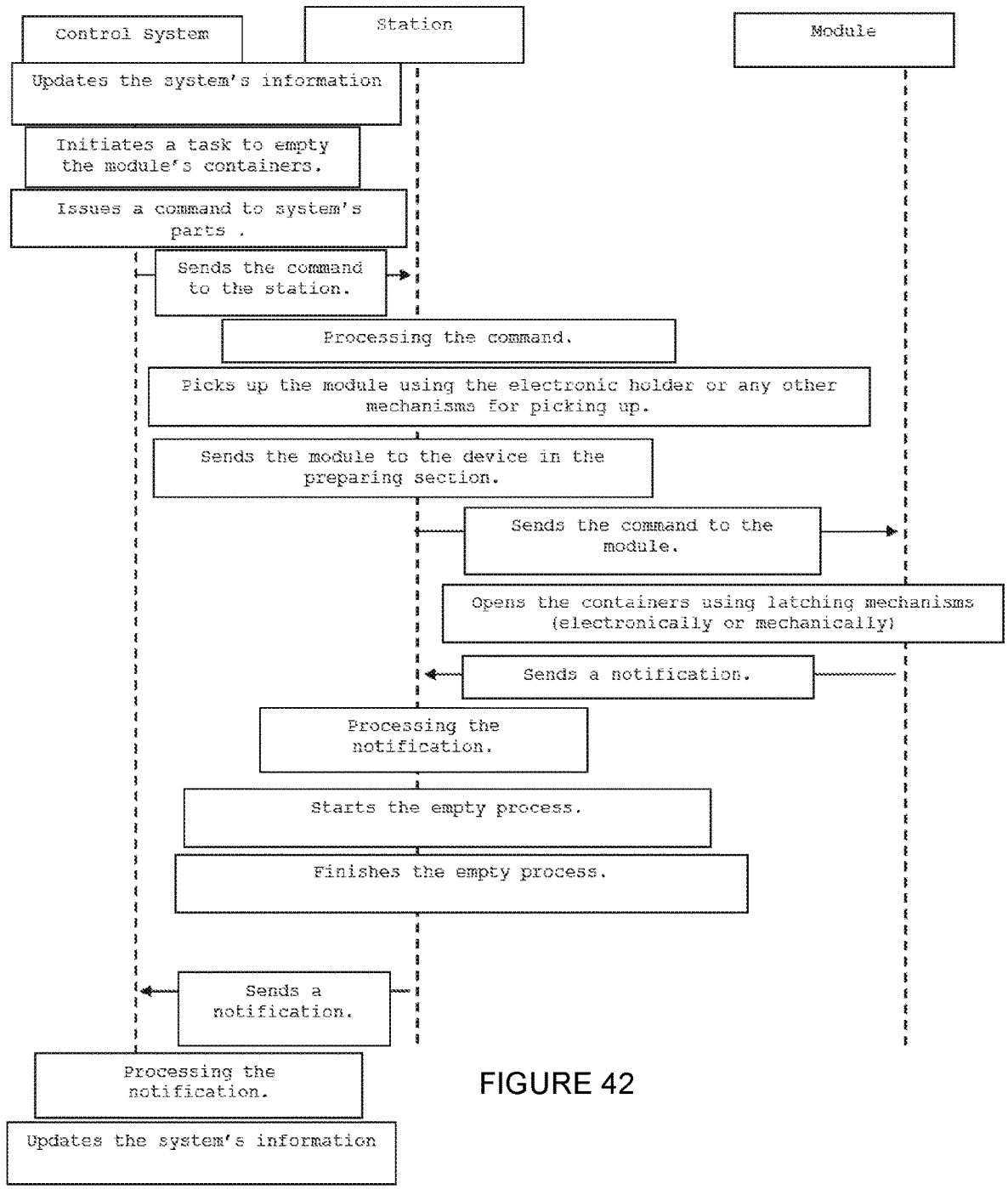

FIG. 42 is a simplified flowchart for a system that sends a module to empty waste contained in the module. The module in this example is configured with a communication device that can communicate with other communication devices.

Figure 43:
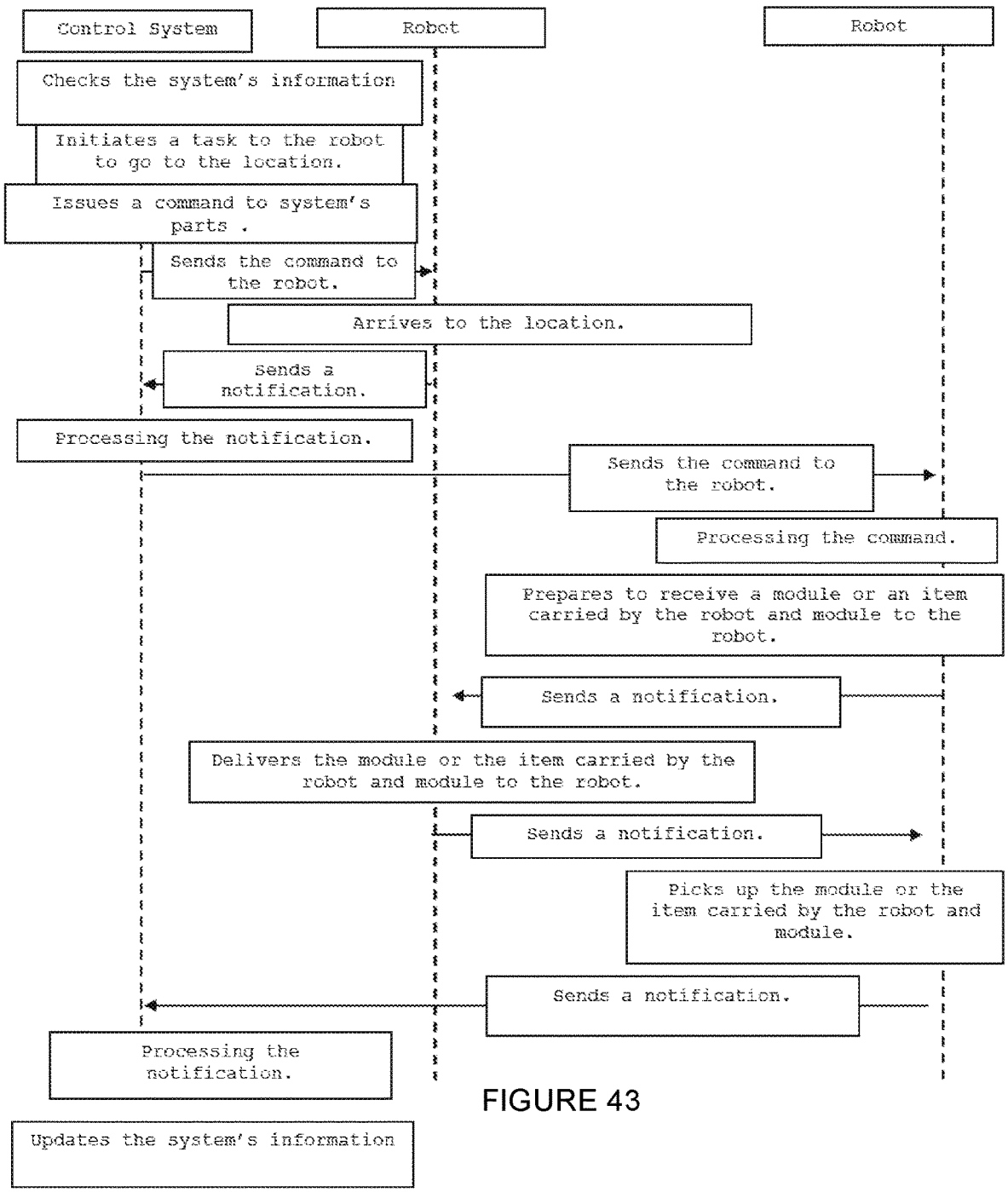

FIG. 43 is a simplified flowchart for a system that exchanges a module or an item carried by a robot with another robot.

Figure 44:
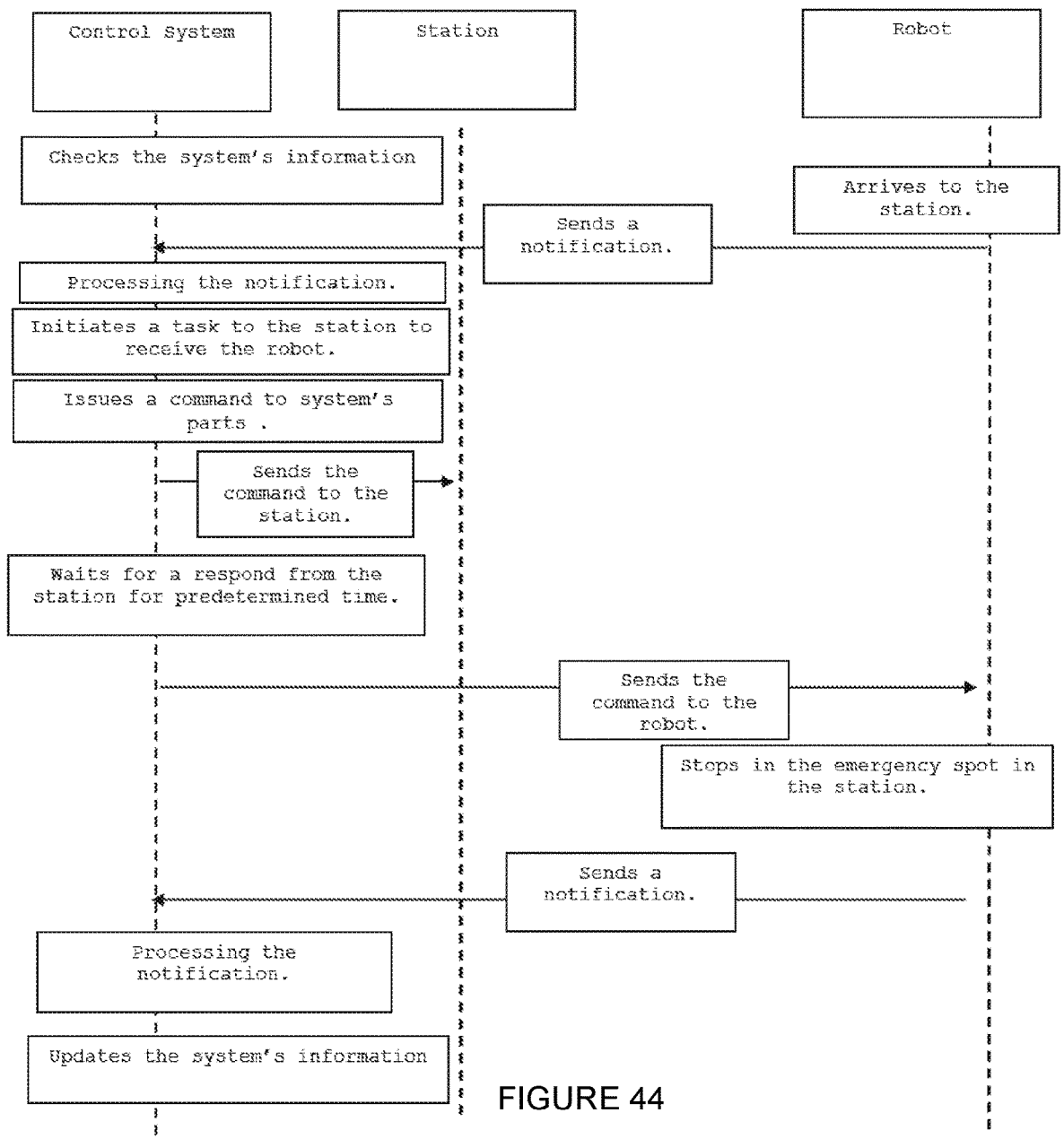

FIG. 44 is a simplified flowchart for a system that enables a robot to stop at an emergency spot in the station, when the station doesn't respond.

Figure 45:
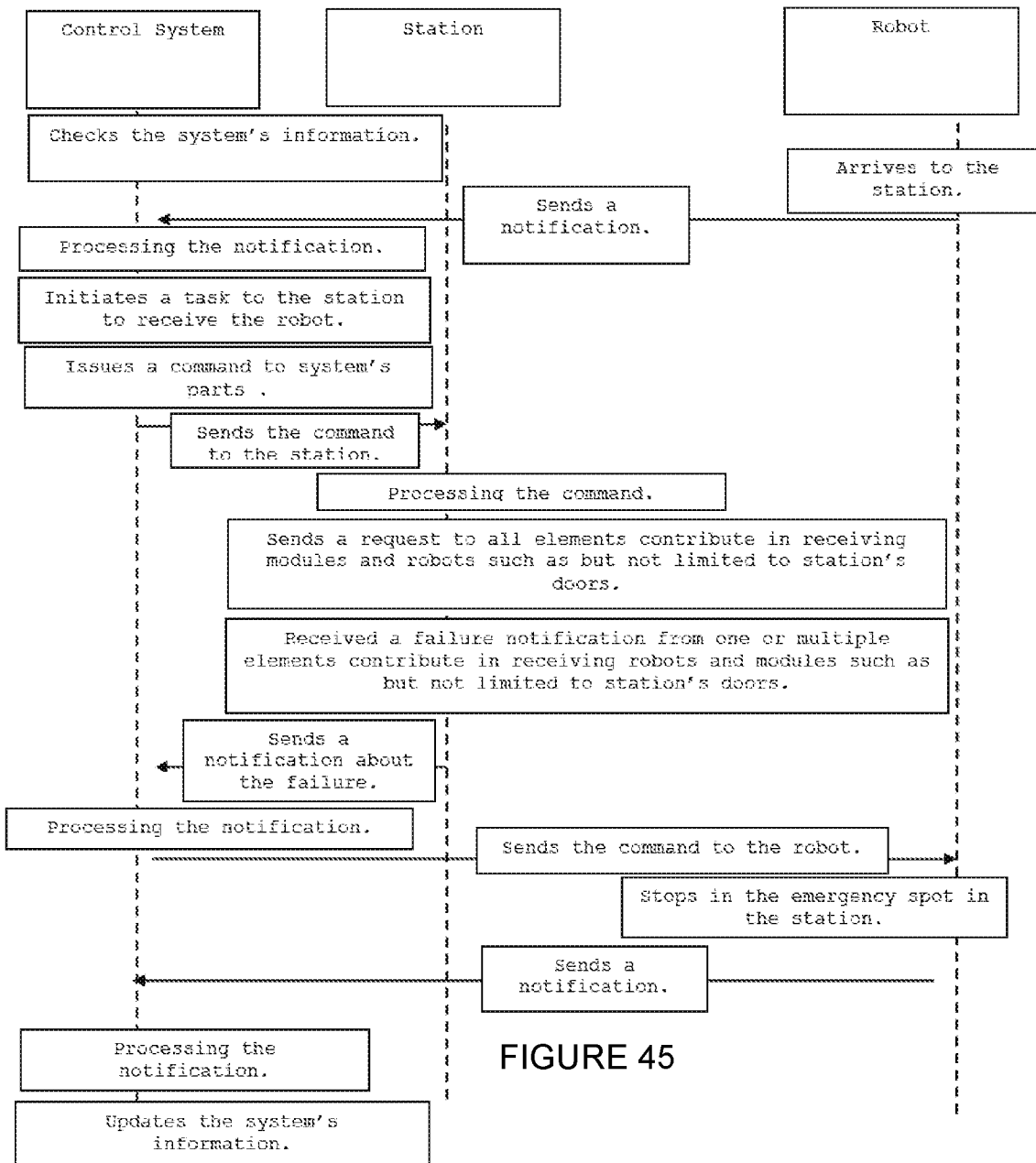

FIG. 45 is a simplified flowchart for a system that enables a robot to stop at an emergency spot in the station, when the station reports a failure from one or more elements of the station involved in receiving the robot, for example, an entry door that fails to open.

Figure 46:
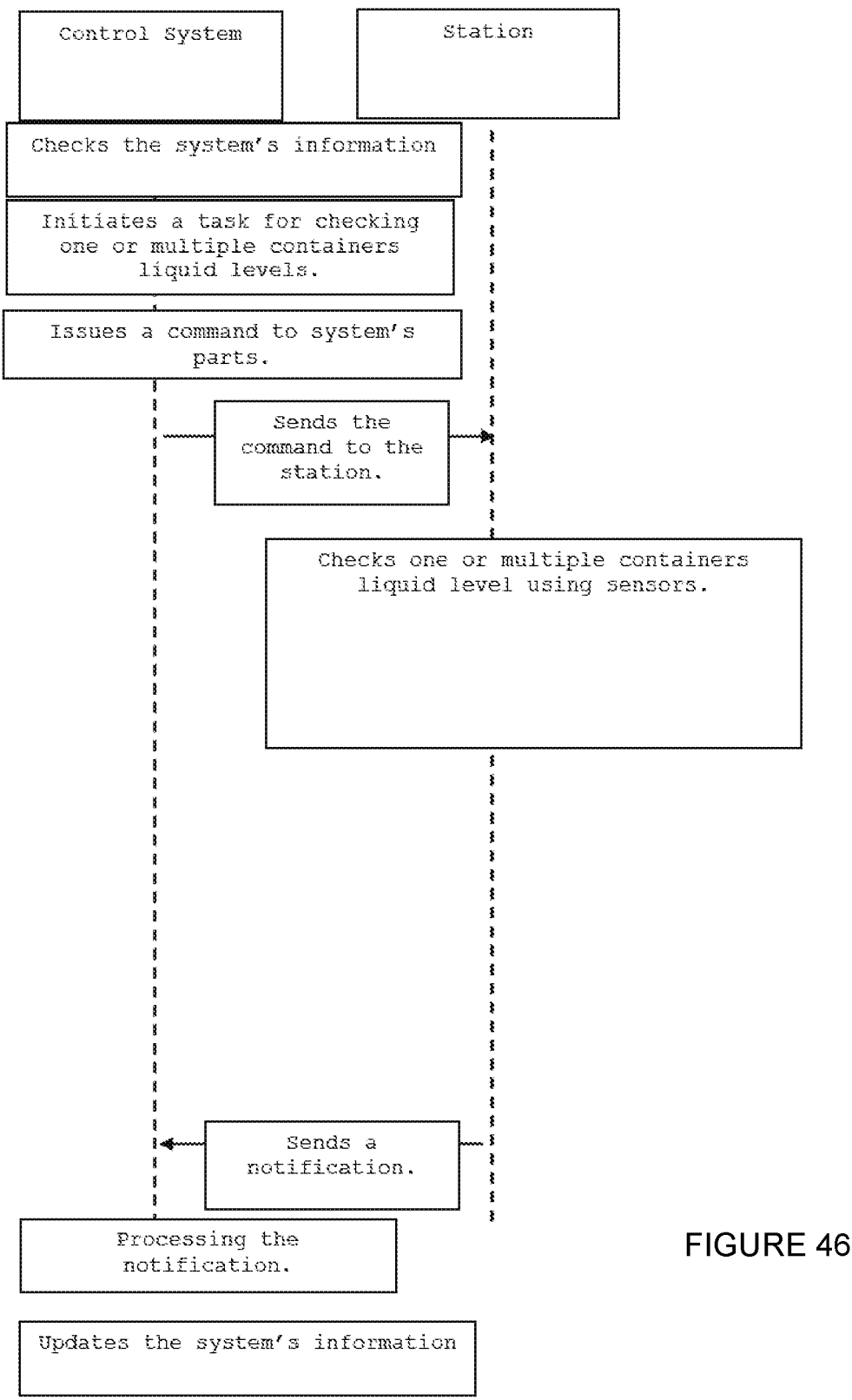

FIG. 46 is a simplified flowchart for a system that checks fluid level in one or more containers, for example, containers contained in the station.

Figure 47:
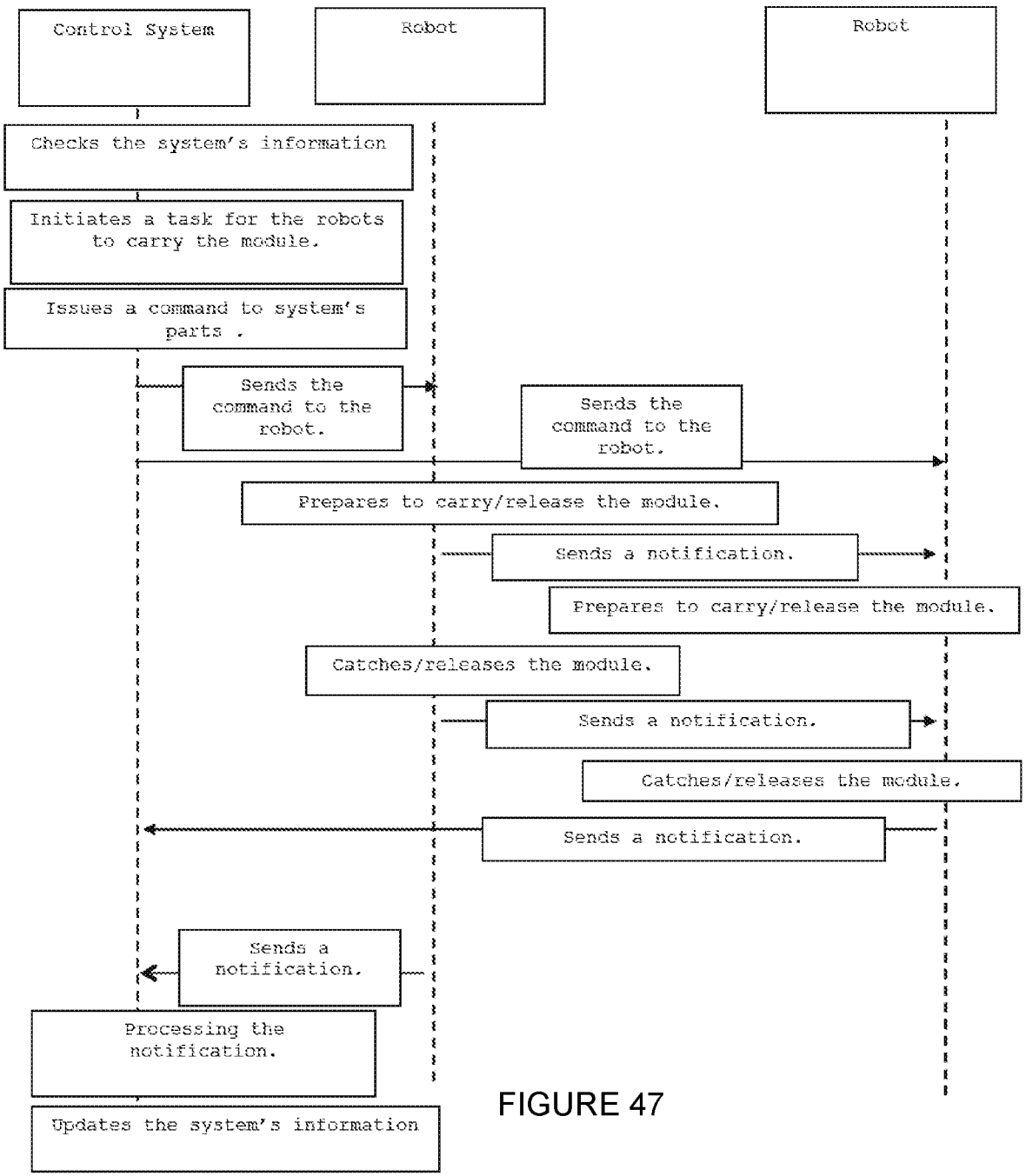

FIG. 47 is a simplified flowchart for a system that synchronizes communication between two robots configured to carry or release a module.

Figure 48:
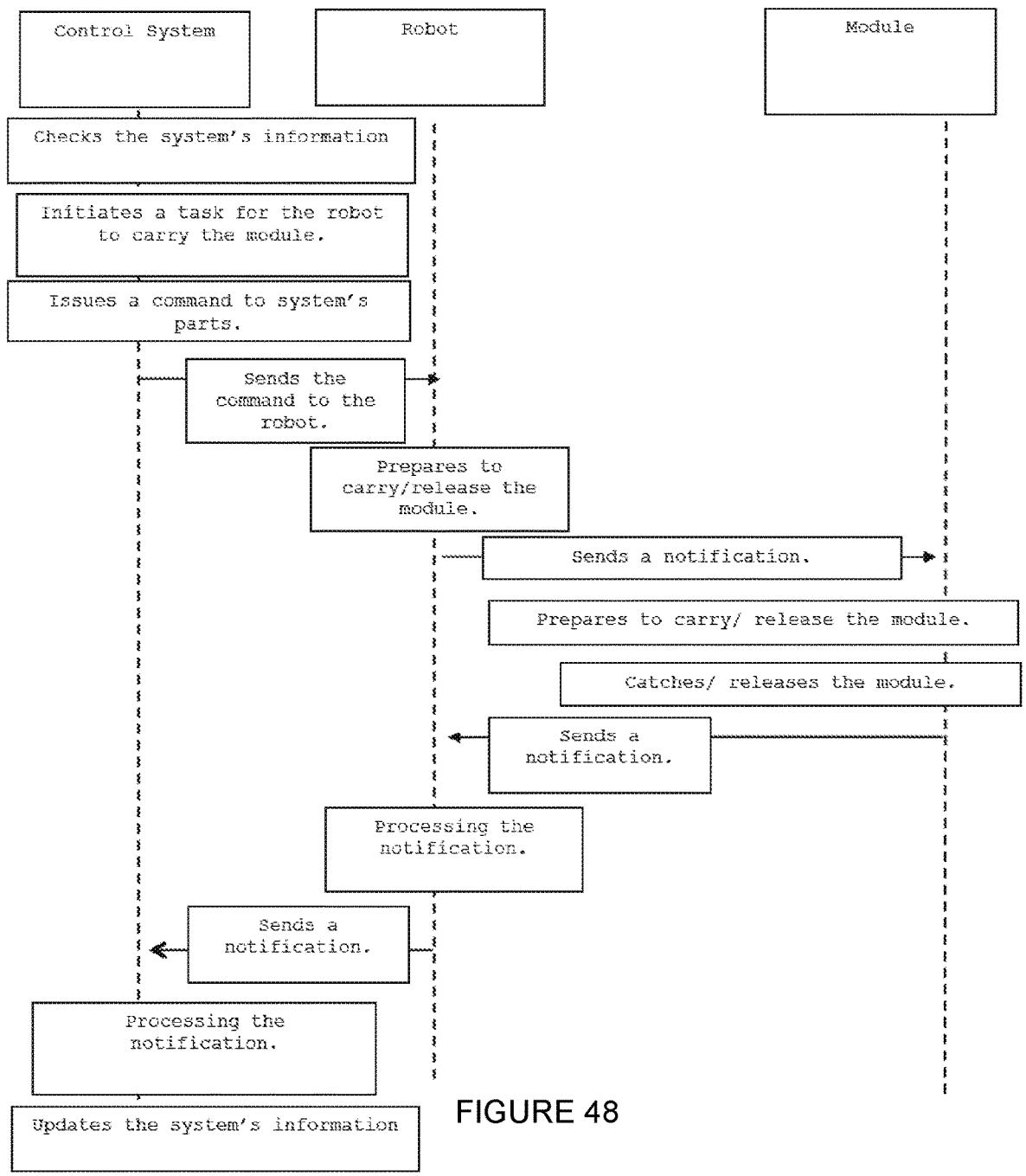

FIG. 48 is a simplified flowchart for a system with a robot configured to carry or release multiple modules. The robot selectively communicates with each of the modules to carry or release the module.

Figure 49:
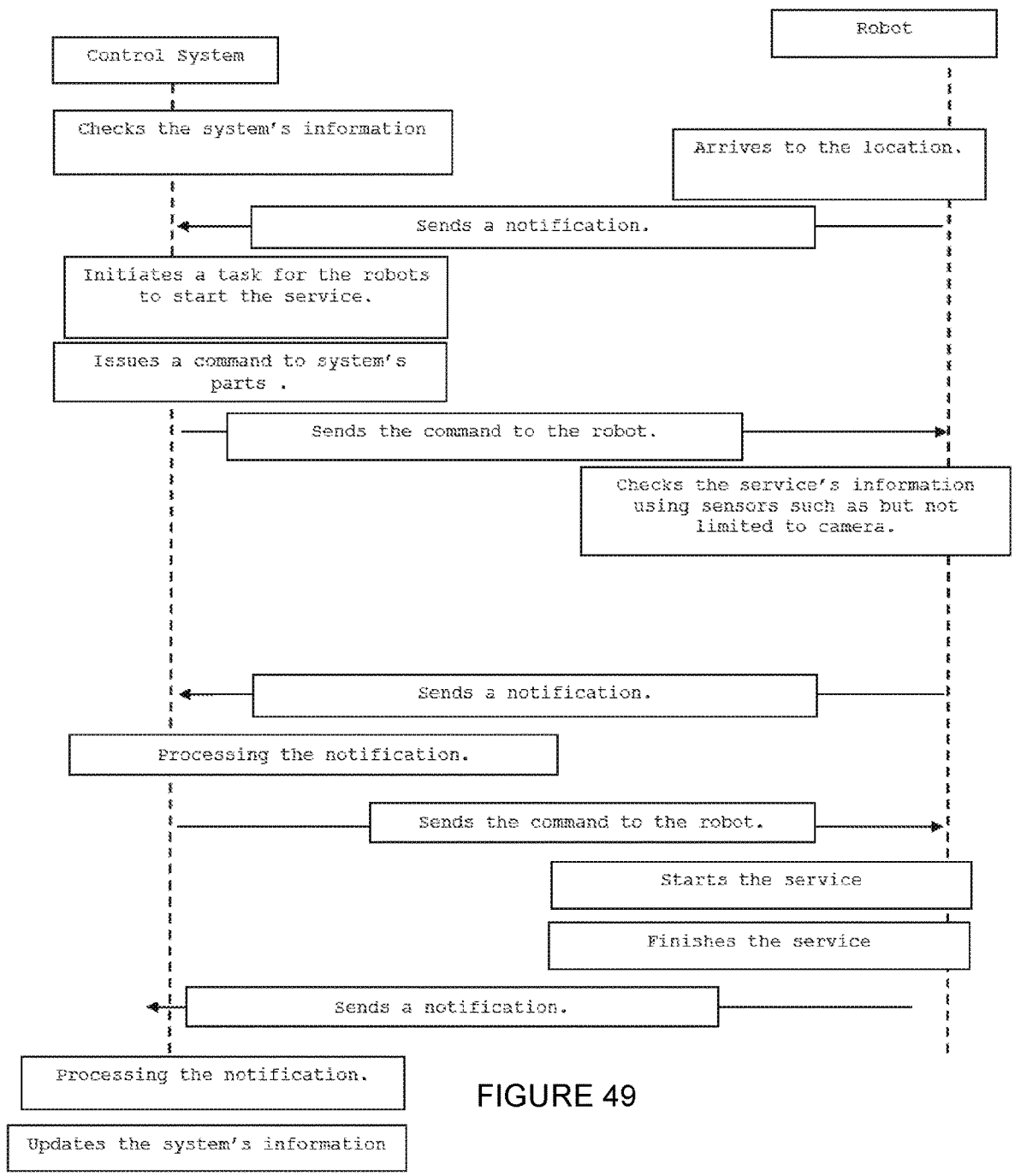

FIG. 49 is a simplified flowchart for a system that sends a robot to a service location to start the service.

Figure 50:
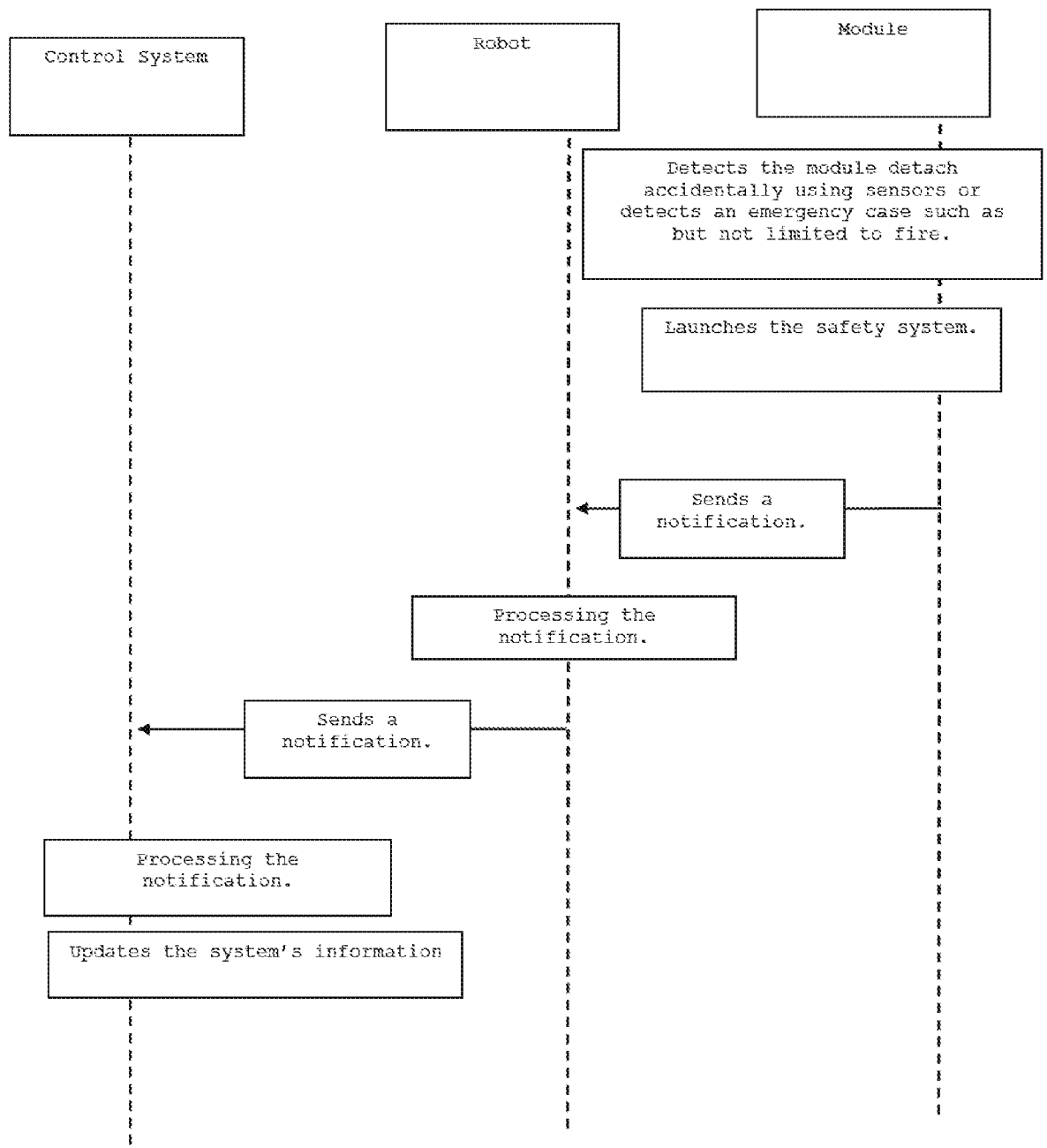

FIG. 50 is a simplified flowchart for a system that receives notification from a module to launch safety system, when the module detects an error or an emergency. For example, the error may be triggered when the module improperly detaches from the robot. For example, an emergency situation may be created when the module detects a fire.

Figure 51:
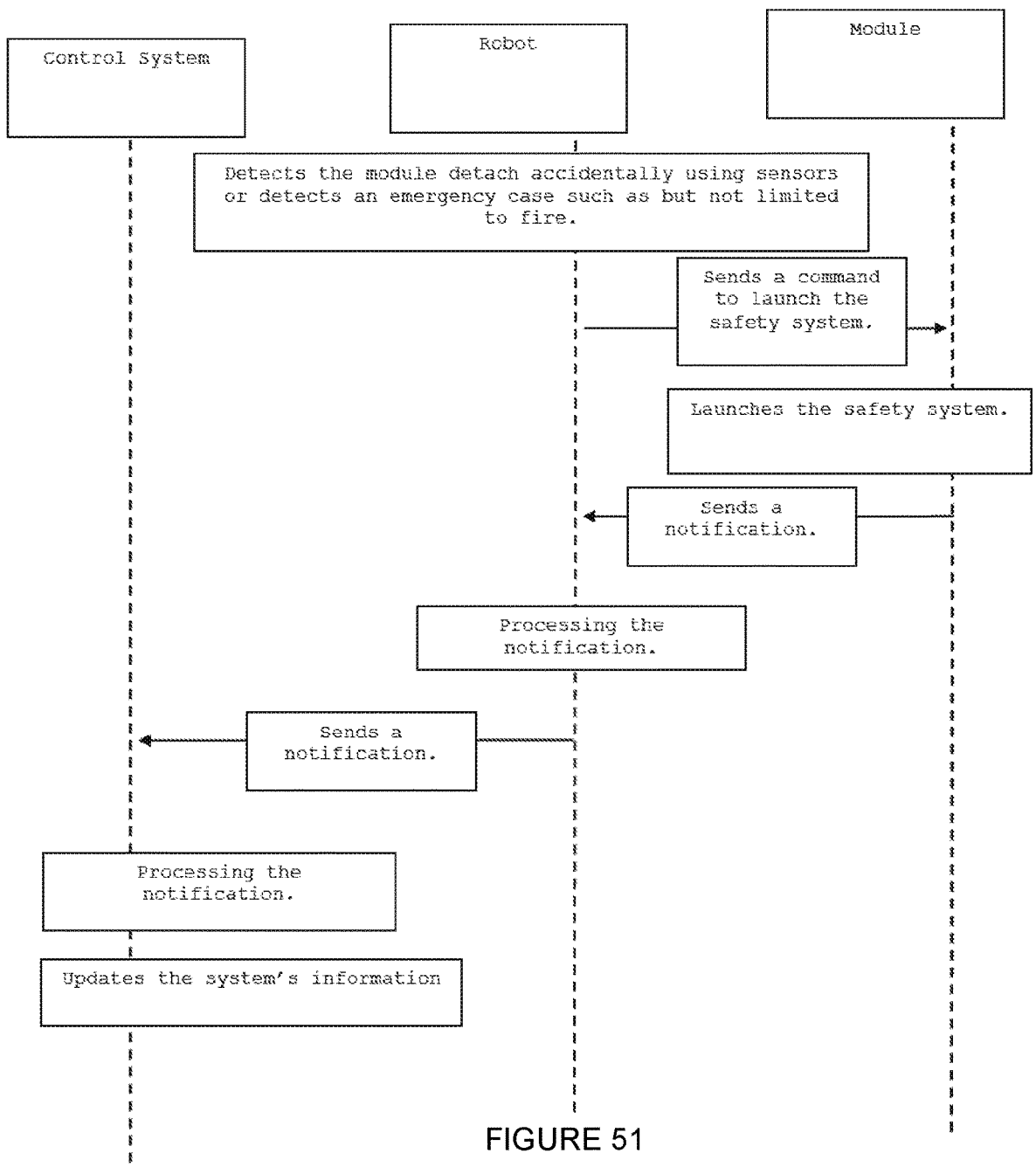

FIG. 51 is a simplified flowchart for a system that receives notification from a robot to launch safety system, when the robot detects an error or an emergency. For example, the error may be triggered when the module improperly detaches from the robot. For example, an emergency situation may be created when the module or the robot detects a fire.

Figure 52:
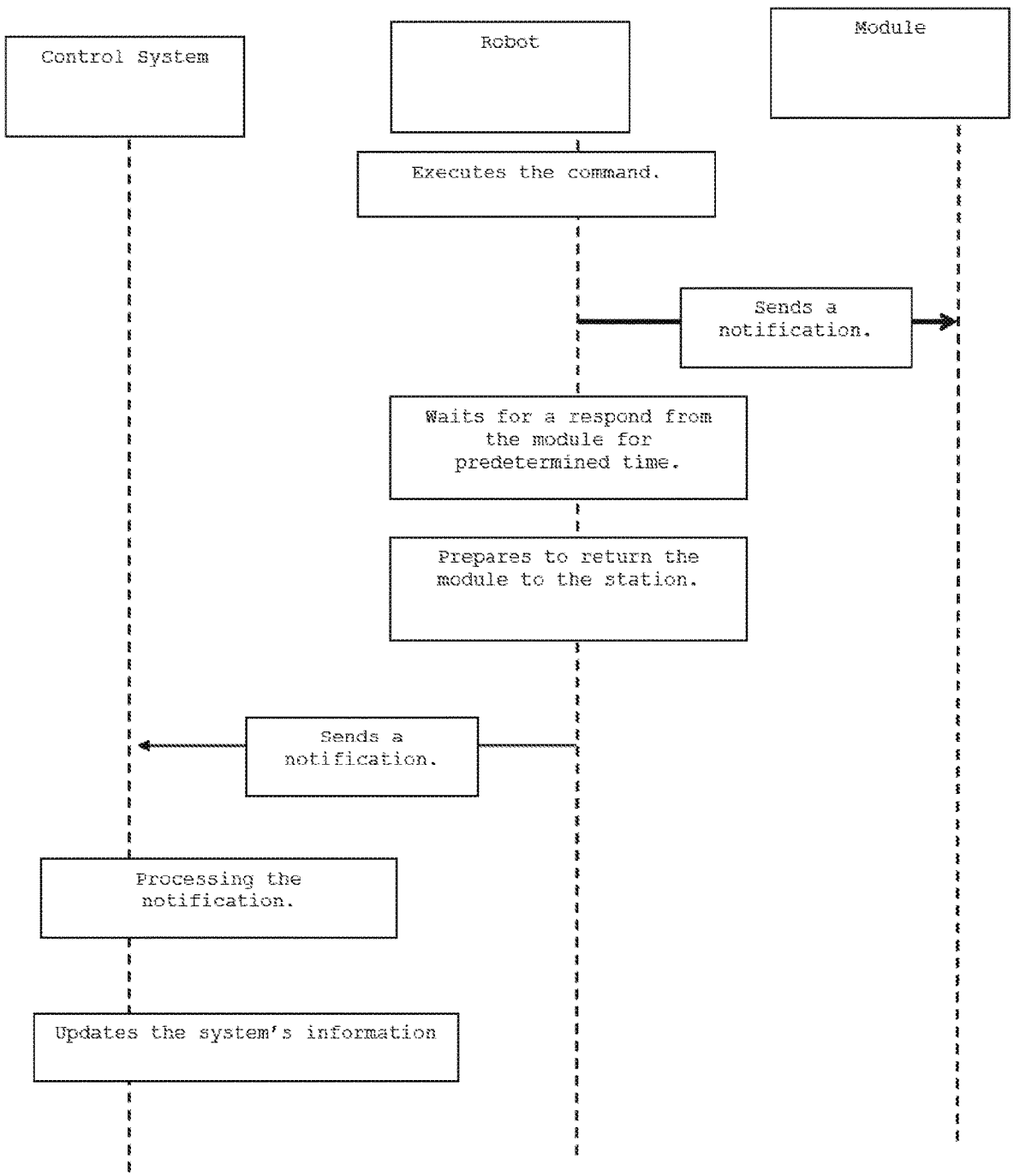

FIG. 52 is a simplified flowchart for a system that returns a module to a station because the module doesn't respond to the robot or the system.

Figure 53:
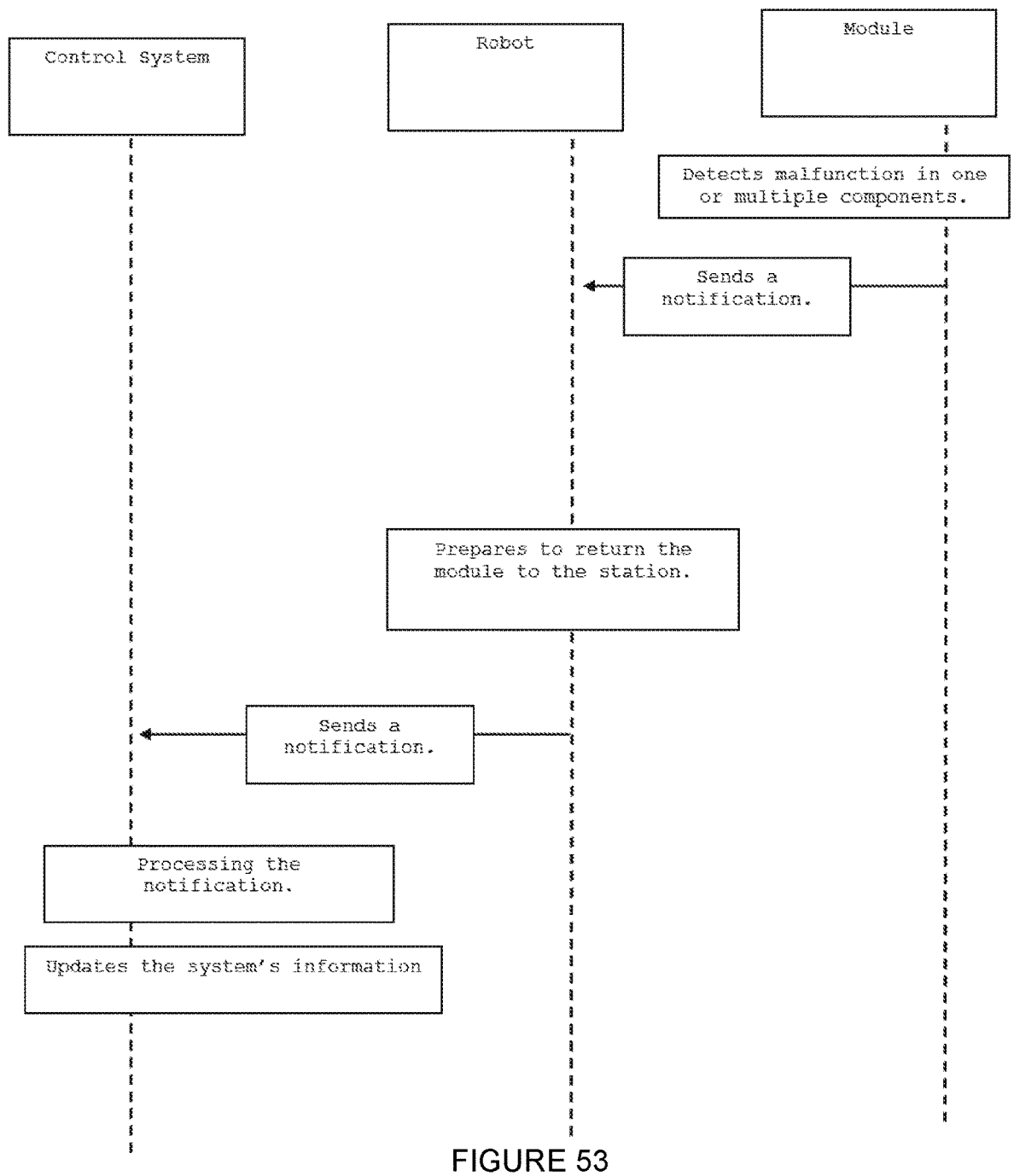

FIG. 53 is a simplified flowchart for a system that returns a module to a station because the module has one or more malfunctioning components.

Figure 54:
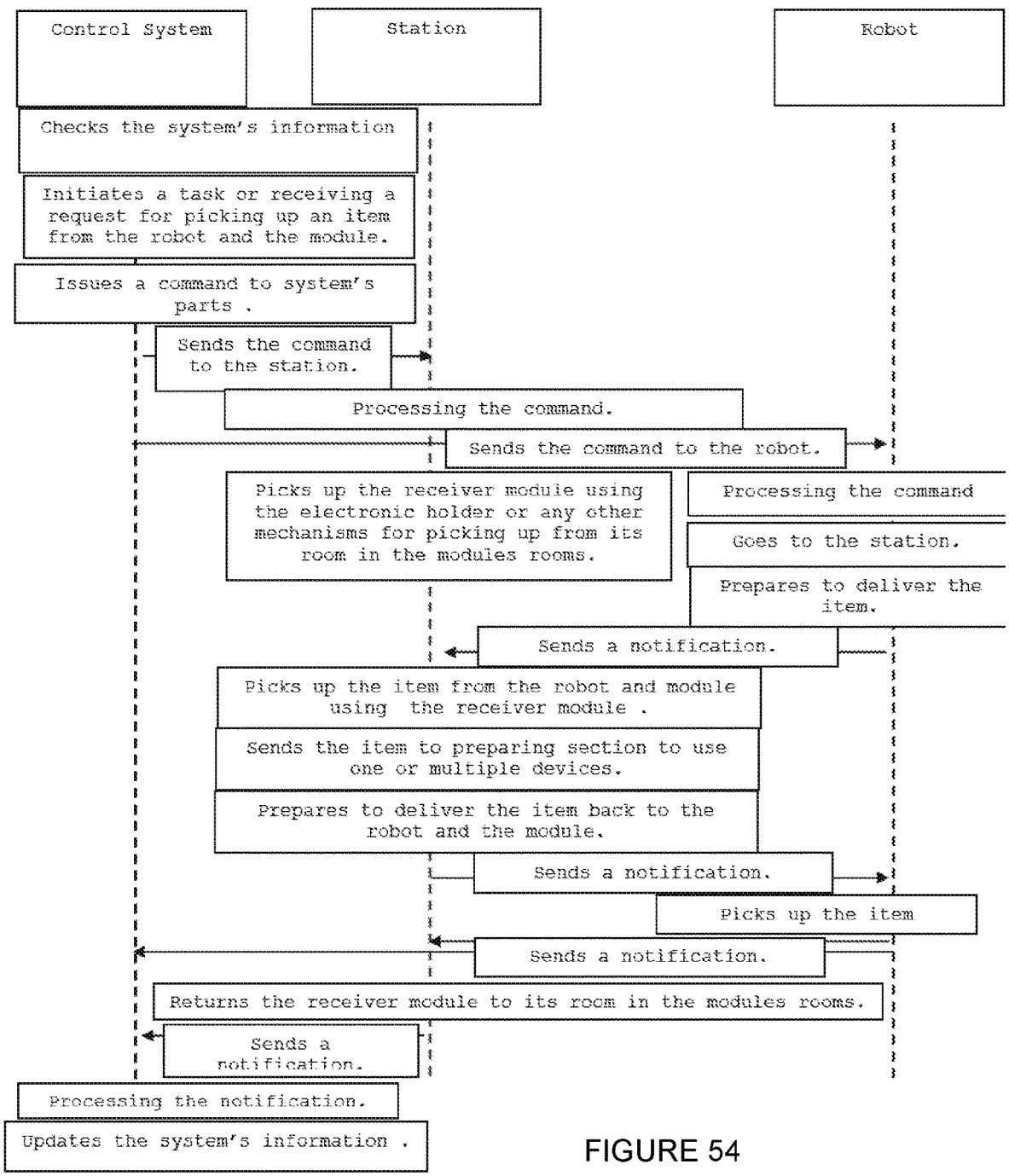

FIG. 54 is a simplified flowchart for a system that receives an item from a module attached to a robot into a receiver module, processes the item in the preparing station. After processing the item, the item is delivered for pick up by a robot.

Figure 55:
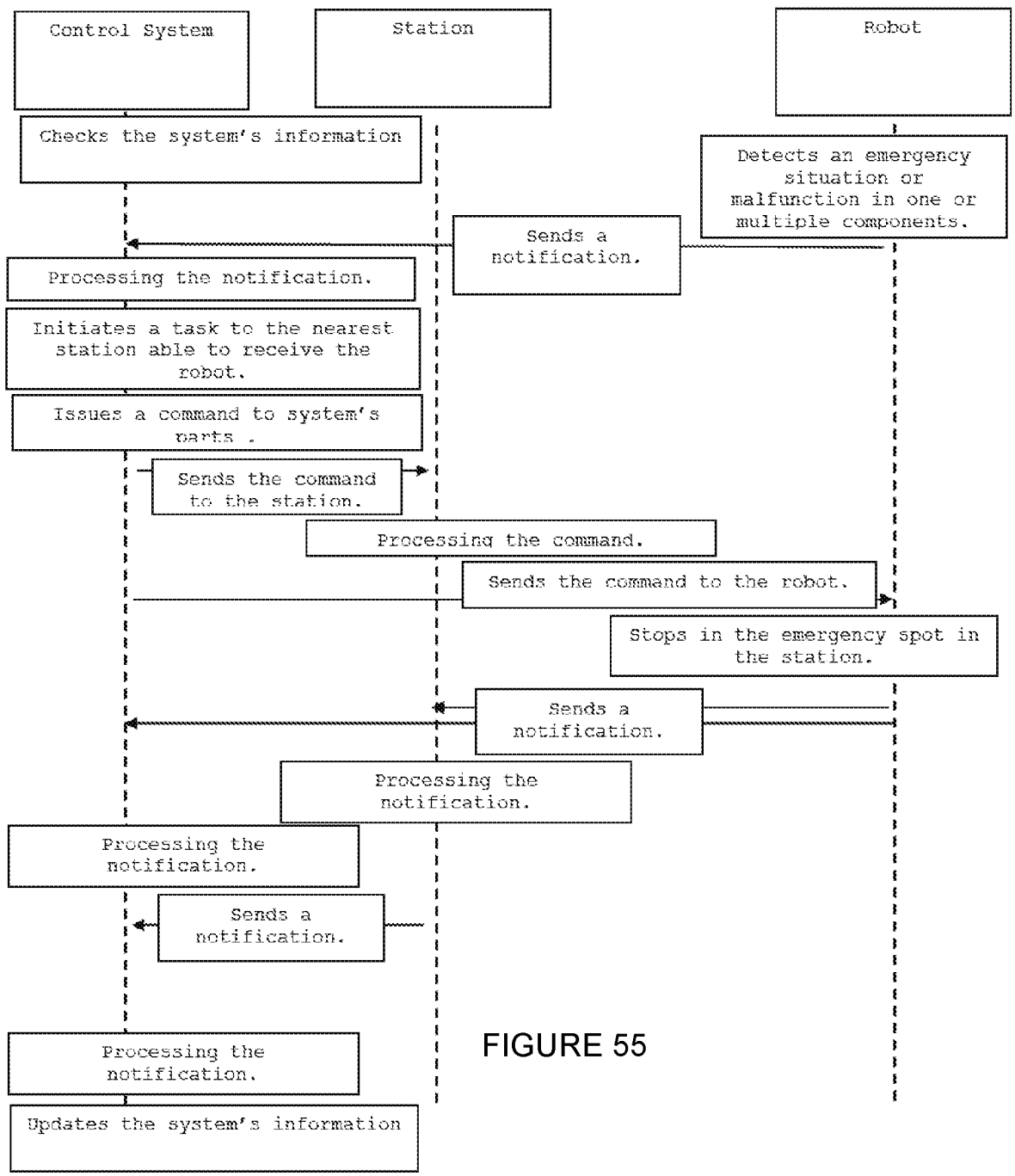

FIG. 55 is a simplified flowchart for a system that detects one or more malfunctions or an emergency in a robot and schedules return of the robot to a nearest station. Robot returns to the emergency spot in the station.

Figure 56:
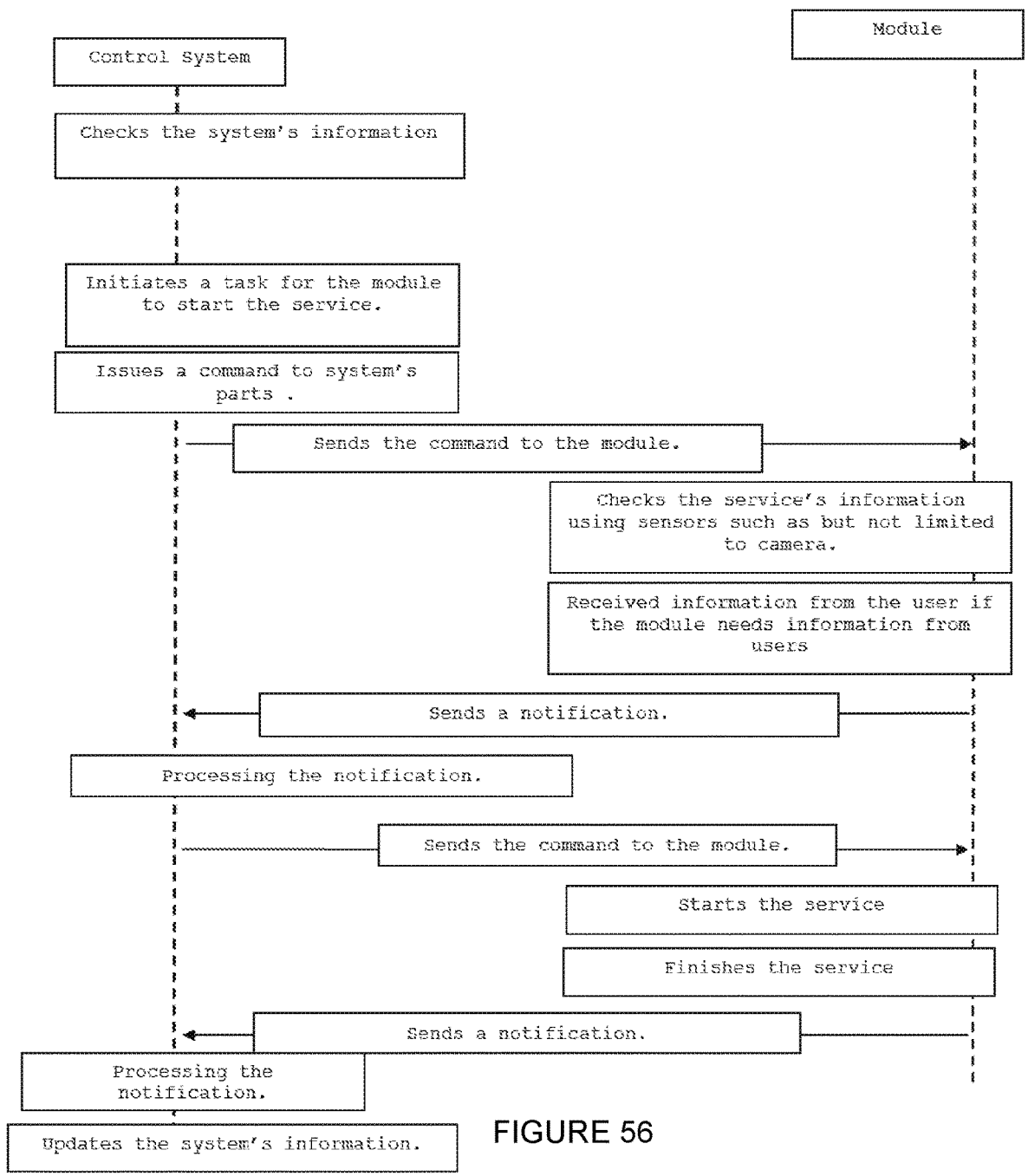

FIG. 56 is a simplified flowchart for a system that sends a module to a service location to perform the service.

Figure 57:
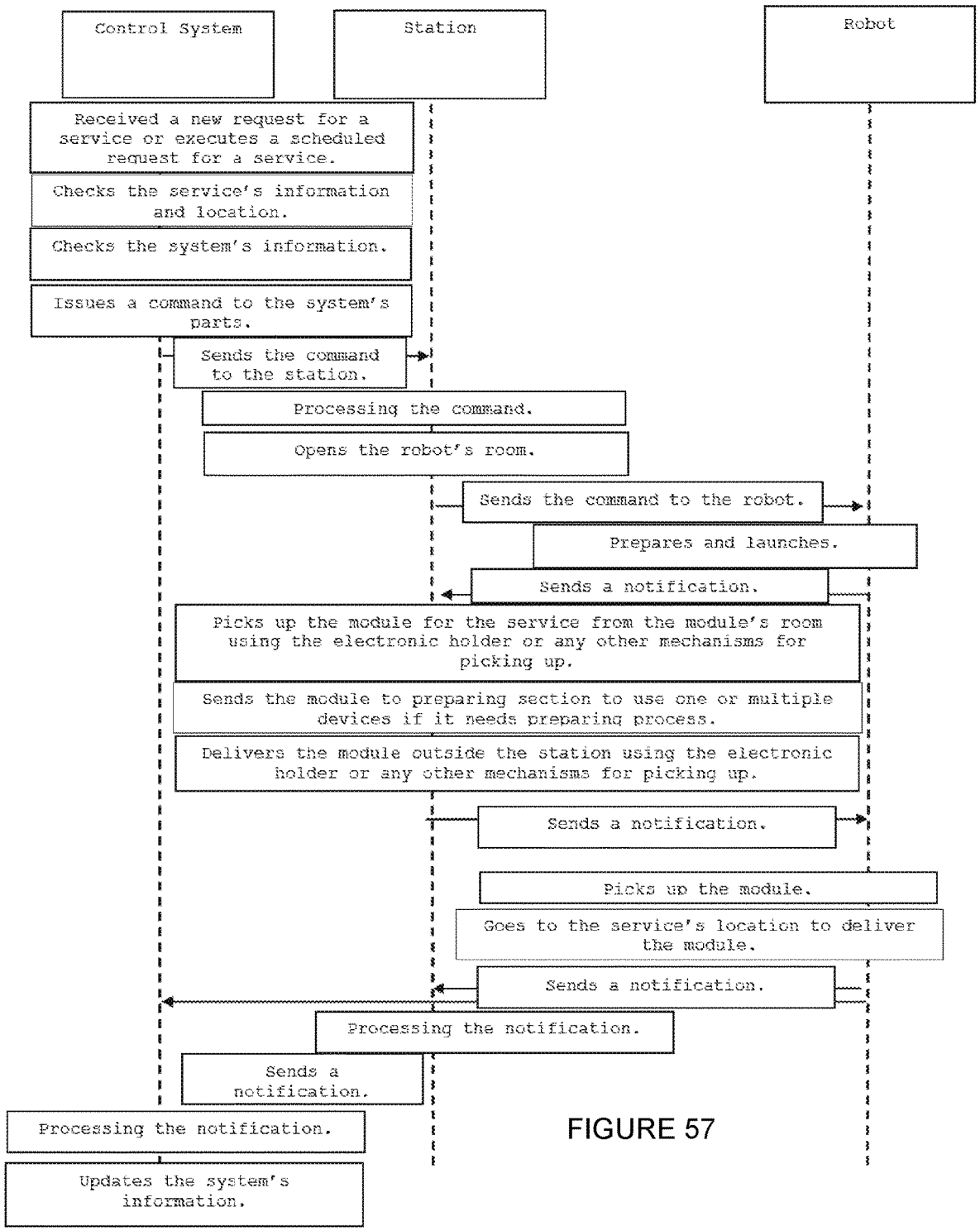

FIG. 57 is a simplified flowchart for a system that receives a new request for service or executes a scheduled request for service and sends a module to the service location to perform the service.

Figure 58:
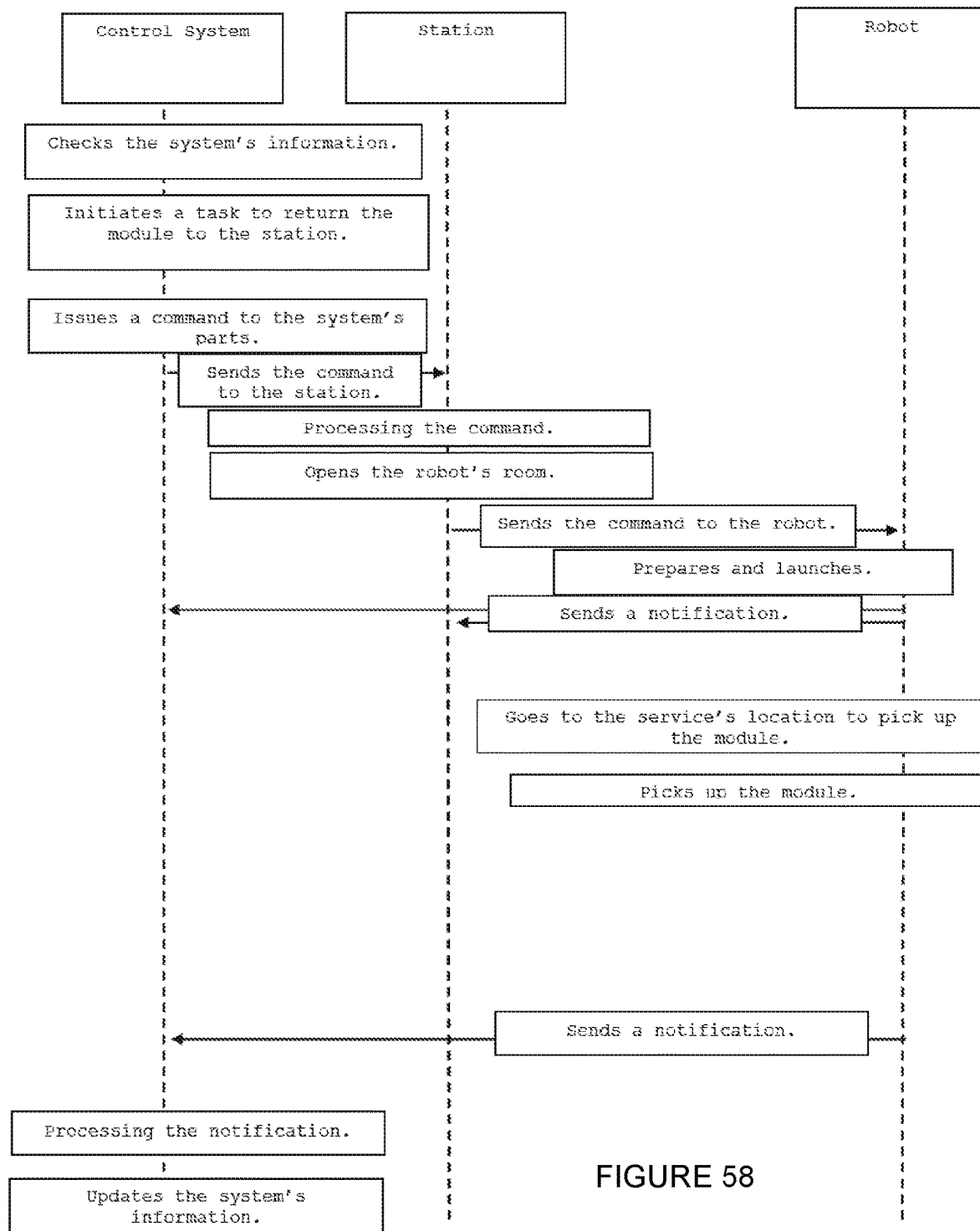

FIG. 58 is a simplified flowchart for a system that returns a module to the station.

Figure 59:
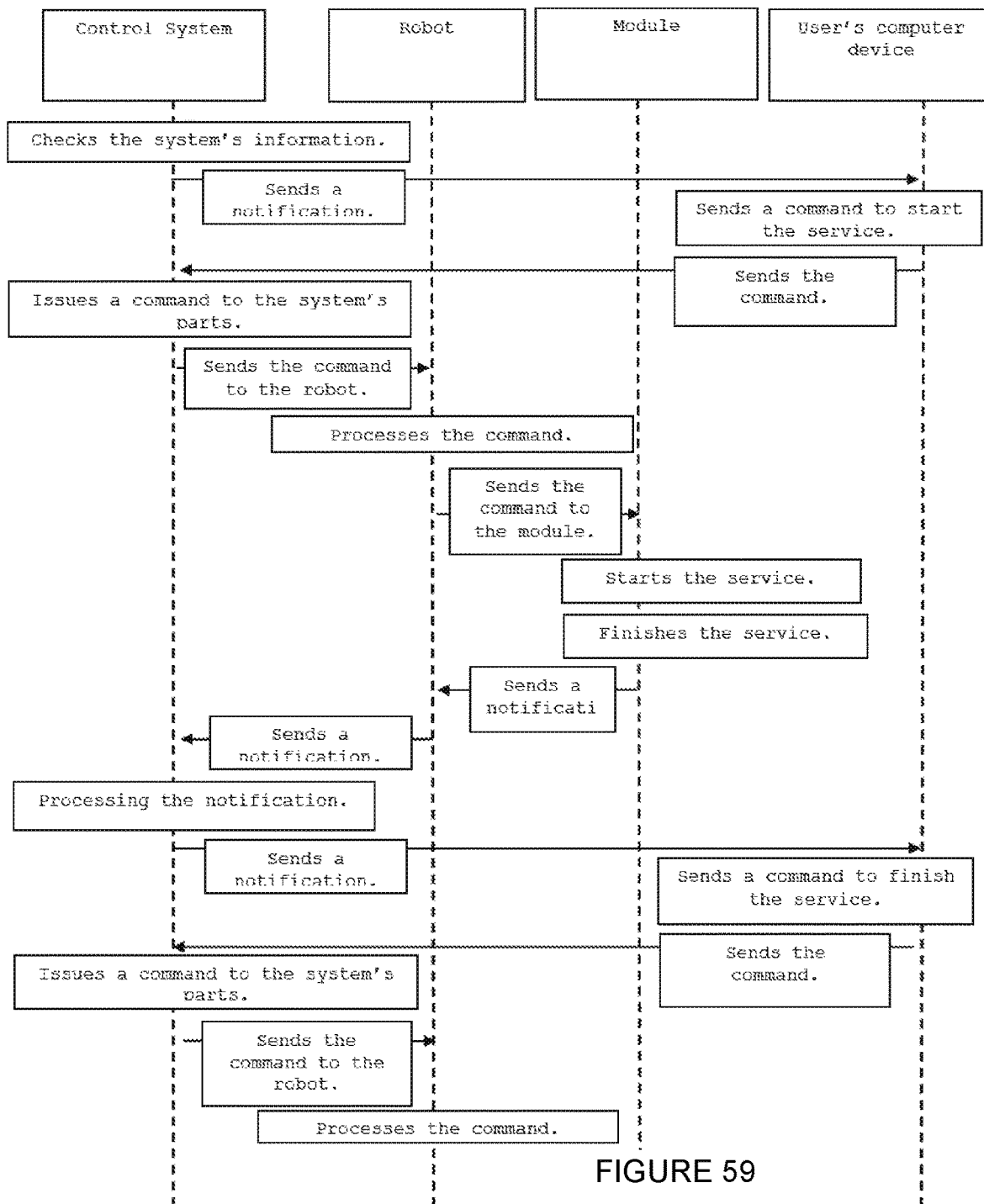

FIG. 59 is a simplified flowchart for a system that receives a command from a user's computer device to start a service and the system sends the command to the robot. The robot sends the command to the module to perform the service.

Figure 60:
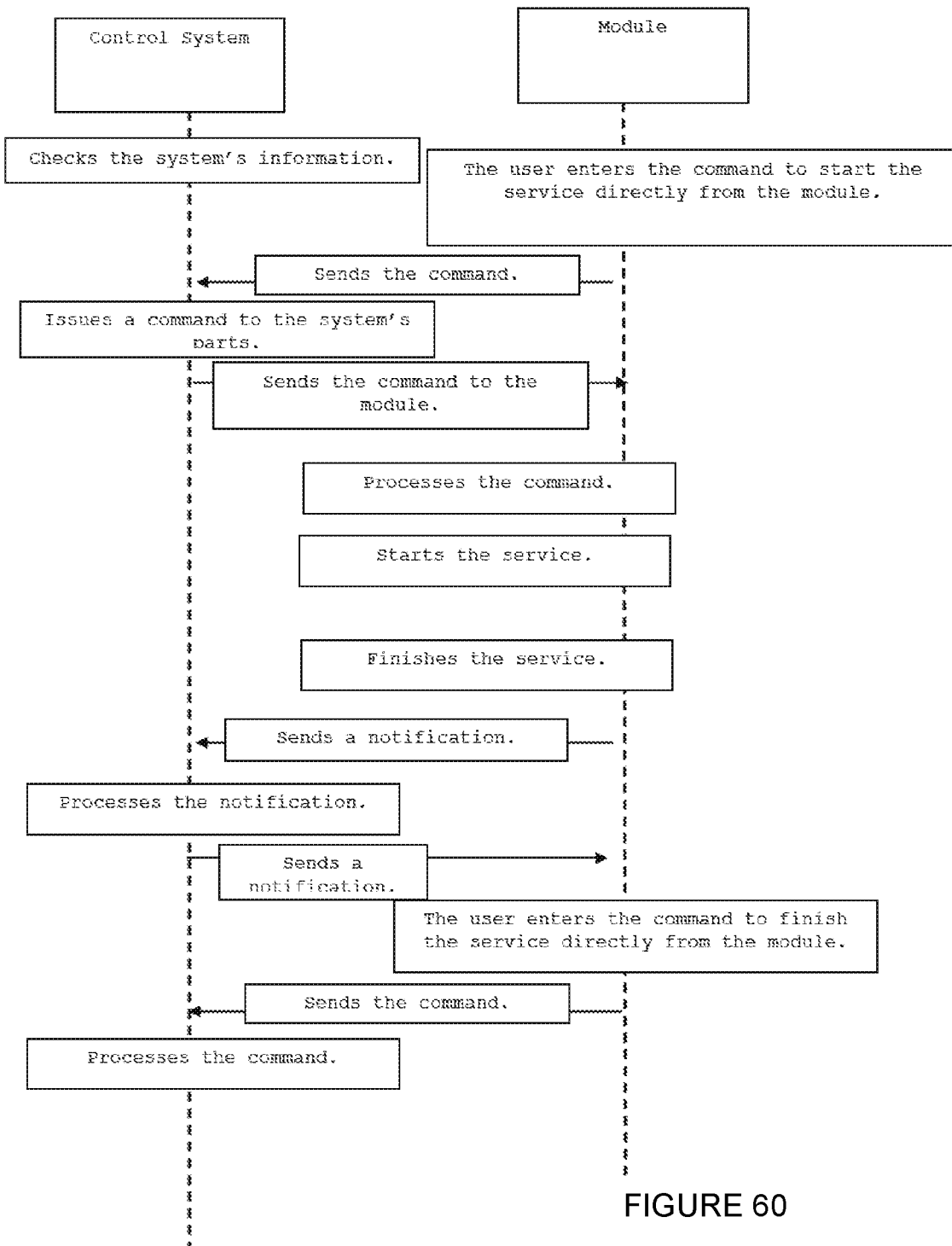

FIG. 60 is a simplified flowchart for a system where the module is configured to receive request for service from a user, directly. The request is received by the system and processed by the system. The module receives a command from the system to perform the services.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A robotic system, comprising:
    a robot; and
    a module coupled to the robot, an item disposed within the module, the module including a release door configured to be selectively opened and closed, wherein, when the release door is selectively opened, the item is dropped from the module;
    a station with a movable platform, the movable platform configured to move in and out of the station; and
    a receiver module disposed over the movable platform, the receiver module including a receiver door configured to be selectively opened and closed,
        wherein the robot is operatively positioned above the receiver module, when the movable platform is out of the station; and
        wherein the module release door is selectively opened when the receiver module receiver door is opened so as to receive the item into the receiver module.

2. The robotic system of claim 1, wherein the movable platform is selectively moved in to the station.

3. The robotic system of claim 1, wherein the robot is a unmanned aerial vehicle.

4. A robotic system, comprising:
    a robot; and
    a module coupled to the robot, an item disposed within the module, the module including a release door configured to be selectively opened and closed, wherein, when the release door is selectively opened, the item is dropped from the module;
    an another module, the another module including a receiver door, the receiver door configured to be selectively open and close,
        wherein the robot is operatively positioned above the another module; and
        wherein the module release door is selectively opened when the another module receiver door is open so as to receive the item into the another module.

5. The robotic system of claim 4, wherein the another module receiver door is closed after receipt of the item.

6. The robotic system of claim 5, wherein the another module including an attachment mechanism, the attachment mechanism configured to couple the another module to another robot, the another robot configured to selectively move the another module.

7. The robotic system of claim 6, wherein, the attachment mechanism is a mechanical attachment mechanism.

8. The robotic system of claim 6, wherein, the attachment mechanism is an electrical attachment mechanism.

9. The robotic system of claim 2, wherein the item is selectively retrieved from the receiver module.

10. The robotic system of claim 9, wherein the station further includes a preparing station configured to perform a plurality of operations on the retrieved item.

11. The robotic system of claim 10, wherein the preparing station includes a scanning device to scan the retrieved item.

12. The robotic system of claim 10, wherein the preparing station includes a washer to wash the retrieved item.

13. The robotic system of claim 10, wherein the preparing station includes a drier to dry the retrieved item.

14. The robotic system of claim 10, wherein the preparing station is configured to clean the retrieved item.

15. The robotic system of claim 5, further including another robot, the another robot including an attached extension module, wherein the another module including an attachment mechanism, the attached extension module of the another robot configured to couple to the attachment mechanism of the another module.

16. The robotic system of claim 15, wherein the attachment mechanism is a mechanical attachment mechanism.

17. The robotic system of claim 15, wherein the attachment mechanism is an electrical attachment mechanism.

* * * * *